(12) United States Patent
Cheng et al.

(10) Patent No.: US 10,536,252 B2
(45) Date of Patent: Jan. 14, 2020

(54) METHOD FOR SENDING AND RECEIVING INFORMATION, USER EQUIPMENT, AND BASE STATION

(71) Applicant: Huawei Technologies Co., Ltd., Shenzhen (CN)

(72) Inventors: Yan Cheng, Beijing (CN); Lixia Xue, Beijing (CN); Bingyu Qu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 95 days.

(21) Appl. No.: 15/797,906

(22) Filed: Oct. 30, 2017

(65) Prior Publication Data

US 2018/0062817 A1    Mar. 1, 2018

Related U.S. Application Data

(63) Continuation of application No. PCT/CN2015/077917, filed on Apr. 30, 2015.

(51) Int. Cl.
*H04W 4/00* (2018.01)
*H04L 5/00* (2006.01)
(Continued)

(52) U.S. Cl.
CPC .......... *H04L 5/0055* (2013.01); *H04L 1/1812* (2013.01); *H04L 1/1854* (2013.01);
(Continued)

(58) Field of Classification Search
None
See application file for complete search history.

(56) References Cited

U.S. PATENT DOCUMENTS

2012/0093040 A1* 4/2012 Wu ............... H04W 72/1268
370/279
2013/0039193 A1* 2/2013 Yin ............... H04W 72/0486
370/252

(Continued)

FOREIGN PATENT DOCUMENTS

CN    101374015 A    2/2009
CN    101414900 A    4/2009
(Continued)

OTHER PUBLICATIONS

"ACK/NACKs transmission in UpPTS," 3GPP TSG RAN WG1 meeting #51bis R1-080175, 3rd Generation Partnership Project, Valbonne, France (Jan. 14-18, 2008).

(Continued)

*Primary Examiner* — Clemence S Han
(74) *Attorney, Agent, or Firm* — Leydig, Voit & Mayer, Ltd.

(57) ABSTRACT

The present invention relates to the field of mobile communications technologies, and in particular, to a method for sending and receiving information. The user equipment in embodiments of the present invention may determine a frame structure of a serving cell, where in addition to an uplink subframe and a downlink subframe, the frame structure in the embodiments of the present invention further includes a first subframe, and the first subframe includes a first symbol used for downlink transmission, a first GP, and a second symbol used for uplink transmission. More symbols used for downlink transmission and more symbols used for uplink transmission than those in a frame structure in the prior art are introduced by introducing the first subframe, thereby improving downlink transmission and effectively reducing a value of k, that is, reducing a service delay in feeding back a HARQ-ACK.

20 Claims, 4 Drawing Sheets

(51) Int. Cl.
*H04L 27/26* (2006.01)
*H04L 1/18* (2006.01)
*H04L 5/14* (2006.01)

(52) U.S. Cl.
CPC .......... *H04L 1/1861* (2013.01); *H04L 5/0044* (2013.01); *H04L 5/1469* (2013.01); *H04L 27/26* (2013.01)

(56) References Cited

U.S. PATENT DOCUMENTS

| | | | | |
|---|---|---|---|---|
| 2013/0083736 A1* | 4/2013 | Yin | .................. | H04W 72/0446 370/329 |
| 2013/0194980 A1* | 8/2013 | Yin | ...................... | H04L 1/1607 370/280 |
| 2013/0286902 A1* | 10/2013 | Chen | ...................... | H04W 24/02 370/280 |
| 2014/0269539 A1* | 9/2014 | Yin | ...................... | H04L 5/0092 370/329 |
| 2014/0334351 A1* | 11/2014 | Yin | .......................... | H04L 5/14 370/280 |
| 2015/0043391 A1* | 2/2015 | Yin | ...................... | H04L 5/0092 370/280 |
| 2015/0264678 A1* | 9/2015 | Yin | ...................... | H04W 52/22 370/329 |
| 2016/0248553 A1 | 8/2016 | Shimezawa et al. | | |
| 2017/0346604 A1* | 11/2017 | Qu | ........................ | H04L 1/1861 |
| 2018/0069622 A1* | 3/2018 | Cheng | ...................... | H04B 7/26 |
| 2018/0102881 A1* | 4/2018 | Cheng | ................... | H04W 28/04 |

FOREIGN PATENT DOCUMENTS

| | | |
|---|---|---|
| CN | 101577690 A | 11/2009 |
| CN | 102158325 A | 8/2011 |
| CN | 102223214 A | 10/2011 |
| CN | 104067681 A | 9/2014 |
| CN | 104247314 A | 12/2014 |
| JP | 2015510700 A | 4/2015 |
| WO | 2009102182 A1 | 8/2009 |
| WO | 2013111607 A1 | 8/2013 |
| WO | 2015046358 A1 | 4/2015 |

OTHER PUBLICATIONS

Holma et al.,"LTE for UMTS OFDMA and SC-FDMA Based Radio Access," XP-002779151, John Wiley & Sons, UK (2009).
"ACK/NACKs transmission in UpPTS",3GPP TSG RAN WG1 meeting #51bis,Sevilla, Spain, R1-080175, 3rd Generation Partnership Project, Valbonne, France (Jan. 14-18, 2008).
"Special Subframe Design for Optimized TDD Type 2," TSG-RAN WG1 #51, R1-074822, Jeju, Korea, pp. 1-3, (Nov. 5-9, 2007).

* cited by examiner

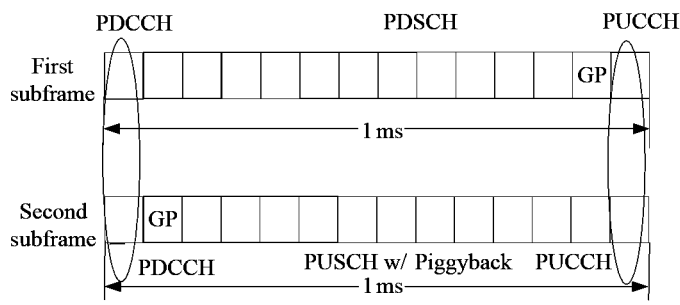

FIG. 1

User equipment determines a frame structure of a serving cell; where a radio frame corresponding to the frame structure includes at least one downlink subframe and at least one uplink subframe, and further includes at least one first subframe and/or at least one second subframe; the first subframe includes a first symbol used for downlink transmission, a first GP, and a second symbol used for uplink transmission, the second subframe includes a third symbol used for downlink transmission, a second GP, and a fourth symbol used for uplink transmission; in the first subframe, a quantity of first symbols used for downlink transmission is greater than a quantity of second symbols used for uplink transmission, and in the second subframe, a quantity of third symbols used for downlink transmission is less than a quantity of fourth symbols used for uplink transmission; the uplink transmission includes HARQ-ACK transmission, and the downlink transmission includes physical downlink control channel transmission ⎯ 201

The user equipment sends and receives information in the serving cell based on the frame structure ⎯ 202

FIG. 2

METHOD FOR SENDING AND RECEIVING INFORMATION, USER EQUIPMENT, AND BASE STATION

CROSS-REFERENCE TO RELATED APPLICATIONS

This application is a continuation of International Patent Application No. PCT/CN2015/077917, filed on Apr. 30, 2015, the disclosure of which is hereby incorporated by reference in its entirety.

TECHNICAL FIELD

The present invention relates to the field of mobile communications technologies, and in particular, to a method for sending and receiving information, user equipment, and a base station.

BACKGROUND

In an existing TDD (time division duplex) system, there are seven uplink-downlink configurations shown in Table 1.

TABLE 1

| Uplink-downlink configuration | Downlink-to-uplink switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, downlink-to-uplink switch-point periodicity indicates an uplink-downlink switch period, subframe number indicates a subframe number, D indicates a downlink subframe, U indicates an uplink subframe, and S indicates a special subframe. The special subframe includes three parts, that is, a DwPTS (downlink pilot timeslot), a GP (guard period), and an UpPTS (uplink pilot timeslot). The GP is mainly used as compensation for a downlink-to-uplink switch time and for an uplink and downlink transmission delay. Particularly, the DwPTS in the special subframe may be used to transmit downlink data. Therefore, sometimes, the special subframe may be considered as a downlink subframe.

It may be learned from Table 1 that in the prior art, for the seven uplink-downlink configurations, seven frame structures of a radio frame are provided in total.

In an LTE (Long Term Evolution) system, to support hybrid automatic repeat, UE (user equipment) needs to feed back a HARQ-ACK (hybrid automatic repeat request-acknowledgment) of PDSCH (physical downlink shared channel) transmission to a base station by using a PUCCH (physical uplink control channel) and a PUSCH (physical uplink shared channel). The HARQ-ACK may also be simply indicated as an ACK (acknowledgment)/NACK (negative acknowledgement). The UE needs to receive, by using a PHICH (physical hybrid-ARQ indicator channel), the HARQ-ACK corresponding to the PUSCH.

In the prior art, in an FDD (frequency division duplex) system, a HARQ-ACK corresponding to a PDSCH transmitted at a downlink subframe n−4 is to be fed back at an uplink subframe n. In a TDD system, a HARQ-ACK corresponding to a PDSCH transmitted at a downlink subframe n−k is to be fed back at an uplink subframe n, where k belongs to a set K. Referring to Table 2, Table 2 defines K for different uplink-downlink configurations of a cell in the TDD system.

TABLE 2

| UL-DL configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

In Table 2, UL-DL configuration indicates an uplink-downlink configuration, and subframe n indicates a subframe. There are no corresponding values of k under some subframes, that is, there are hyphens (-), which indicate that these subframes are not used to transmit a HARQ-ACK.

It may be learned from Table 2 that values of k in the HARQ-ACK timing set K of the existing TDD system are all relatively large, leading to a relatively large service delay. In another aspect, in most uplink-downlink configurations, HARQ-ACKs of multiple subframes need to be fed back at one uplink subframe, leading to a complex HARQ-ACK feedback mechanism and relatively poor HARQ-ACK feedback performance.

SUMMARY

Embodiments of the present invention provide a method for sending and receiving information, user equipment, and a base station, so as to resolve a technical problem of a relatively large service delay in feeding back a HARQ-ACK in a TDD system, and have backward-compatibility.

According to a first aspect, a method for sending and receiving information is provided, including:

determining, by user equipment, a frame structure of a serving cell; where a radio frame corresponding to the frame structure includes at least one downlink subframe and at least one uplink subframe, and further includes at least one first subframe and/or at least one second subframe; the first subframe includes a first symbol used for downlink transmission, a first GP, and a second symbol used for uplink transmission, and the second subframe includes a third symbol used for downlink transmission, a second GP, and a fourth symbol used for uplink transmission; in the first subframe, a quantity of first symbols used for downlink transmission is greater than a quantity of second symbols used for uplink transmission, and in the second subframe, a quantity of third symbols used for downlink transmission is less than a quantity of fourth symbols used for uplink transmission; the uplink transmission includes HARQ-ACK transmission, and the downlink transmission includes physical downlink control channel transmission; and sending and receiving, by the user equipment, information in the serving cell based on the frame structure.

With reference to the first aspect, in a first possible implementation of the first aspect, the radio frame includes 10 subframes, where a subframe 0, a subframe 4, a subframe 5, a subframe 8, and a subframe 9 are the downlink subframes, a subframe 2 and a subframe 7 are the uplink subframes, a subframe 1 and a subframe 6 are special subframes, and a subframe 3 is the first subframe; or the radio frame includes 10 subframes, where a subframe 0, a subframe 4, a subframe 5, and a subframe 9 are the downlink subframes, a subframe 2 and a subframe 7 are the uplink subframes, a subframe 1 and a subframe 6 are special subframes, and a subframe 3 and a subframe 8 are the first subframes; or the radio frame includes 10 subframes, where a subframe 0, a subframe 5, and a subframe 9 are the downlink subframes, a subframe 2 and a subframe 7 are the uplink subframes, a subframe 1 and a subframe 6 are special subframes, and a subframe 3, a subframe 4, and a subframe 8 are the first subframes; or the radio frame includes 10 subframes, where a subframe 0 and a subframe 5 are the downlink subframes, a subframe 2 and a subframe 7 are the uplink subframes, a subframe 1 and a subframe 6 are special subframes, and a subframe 3, a subframe 4, a subframe 8, and a subframe 9 are the first subframes; or the radio frame includes 10 subframes, where a subframe 5 is the downlink subframe, a subframe 2 and a subframe 7 are the uplink subframes, a subframe 1 and a subframe 6 are special subframes, and a subframe 0, a subframe 3, a subframe 4, a subframe 8, and a subframe 9 are the first subframes.

With reference to the first aspect, in a second possible implementation of the first aspect, the radio frame includes 10 subframes, where a subframe 3 and a subframe 5 are the downlink subframes, a subframe 2 and a subframe 9 are the uplink subframes, a subframe 1 and a subframe 6 are special subframes, and a subframe 0, a subframe 4, a subframe 7, and a subframe 8 are the first subframes; or the radio frame includes 10 subframes, where a subframe 5 is the downlink subframe, a subframe 2 is the uplink subframe, a subframe 6 is a special subframe, a subframe 0, a subframe 3, a subframe 4, a subframe 7, a subframe 8, and a subframe 9 are the first subframes, and a subframe 1 is the second subframe.

With reference to the first aspect, in a third possible implementation of the first aspect, the radio frame includes 10 subframes, where a subframe 5 is the downlink subframe, a subframe 2 and a subframe 9 are the uplink subframes, a subframe 1 and a subframe 6 are special subframes, and a subframe 0, a subframe 3, a subframe 4, a subframe 7, and a subframe 8 are the first subframes; or the radio frame includes 10 subframes, where a subframe 5 is the downlink subframe, a subframe 2 is the uplink subframe, a subframe 6 is a special subframe, a subframe 0, a subframe 3, a subframe 4, a subframe 7, a subframe 8, and a subframe 9 are the first subframes, and a subframe 1 is the second subframe.

With reference to the first aspect, in a fourth possible implementation of the first aspect, the radio frame includes 10 subframes, where a subframe 0, a subframe 4, a subframe 5, a subframe 8, and a subframe 9 are the downlink subframes, a subframe 2 and a subframe 7 are the uplink subframes, a subframe 1 and a subframe 6 are special subframes, and a subframe 3 is the first subframe; or the radio frame includes 10 subframes, where a subframe 0, a subframe 4, a subframe 5, and a subframe 9 are the downlink subframes, a subframe 2 and a subframe 7 are the uplink subframes, a subframe 1 and a subframe 6 are special subframes, and a subframe 3 and a subframe 8 are the first subframes; or the radio frame includes 10 subframes, where a subframe 4, a subframe 5, and a subframe 9 are the downlink subframes, a subframe 2 and a subframe 7 are the uplink subframes, a subframe 1 and a subframe 6 are special subframes, and a subframe 0, a subframe 3, and a subframe 8 are the first subframes.

With reference to the first aspect, in a fifth possible implementation of the first aspect, the radio frame includes 10 subframes, where a subframe 4, a subframe 5, and a subframe 8 are the downlink subframes, a subframe 2 and a subframe 3 are the uplink subframes, a subframe 1 and a subframe 6 are special subframes, and a subframe 0, a subframe 7, and a subframe 9 are the first subframes; or the radio frame includes 10 subframes, where a subframe 4 and a subframe 5 are the downlink subframes, a subframe 2 and a subframe 3 are the uplink subframes, a subframe 1 and a subframe 6 are special subframes, and a subframe 0, a subframe 7, a subframe 8, and a subframe 9 are the first subframes.

With reference to the first aspect, in a sixth possible implementation of the first aspect, the radio frame includes 10 subframes, where a subframe 0, a subframe 3, a subframe 5, a subframe 8, and a subframe 9 are the downlink subframes, a subframe 2 and a subframe 7 are the uplink subframes, a subframe 1 and a subframe 6 are special subframes, and a subframe 4 is the first subframe; or the radio frame includes 10 subframes, where a subframe 0, a subframe 3, a subframe 5, and a subframe 8 are the downlink subframes, a subframe 2 and a subframe 7 are the uplink subframes, a subframe 1 and a subframe 6 are special subframes, and a subframe 4 and a subframe 9 are the first subframes; or the radio frame includes 10 subframes, where a subframe 3, a subframe 5, and a subframe 8 are the downlink subframes, a subframe 2 and a subframe 7 are the uplink subframes, a subframe 1 and a subframe 6 are special subframes, and a subframe 0, a subframe 4, and a subframe 9 are the first subframes.

With reference to the first aspect, in a seventh possible implementation of the first aspect, the radio frame includes 10 subframes, where a subframe 3, a subframe 5, and a subframe 8 are the downlink subframes, a subframe 2 is the uplink subframe, a subframe 1 and a subframe 6 are special subframes, a subframe 0, a subframe 7, and a subframe 9 are the first subframes, and a subframe 4 is the second subframe; or the radio frame includes 10 subframes, where a subframe 3 and a subframe 5 are the downlink subframes, a subframe 2 is the uplink subframe, a subframe 1 and a subframe 6 are special subframes, a subframe 0, a subframe 4, a subframe 7, a subframe 8, and a subframe 9 are the first subframes, and a subframe 4 is the second subframe.

With reference to the first possible implementation or the second possible implementation of the first aspect, in an eighth possible implementation of the first aspect, the sending and receiving, by the user equipment, information in the serving cell based on the frame structure includes:

receiving, by the user equipment at a subframe n in the serving cell, a transmitted physical downlink shared channel, or a downlink control channel indicating downlink semi-persistent scheduling release, where n is an integer; and sending, by the user equipment at a subframe n+k, a HARQ-ACK response that is corresponding to the transmitted physical downlink shared channel or the downlink control channel of the serving cell at the subframe n, where k is an integer; where when the subframe n is the first subframe or a subframe n+4 is the first subframe, k is 4.

With reference to the first possible implementation or the third possible implementation of the first aspect, in a ninth possible implementation of the first aspect, the sending and receiving, by the user equipment, information in the serving cell based on the frame structure includes:

receiving, by the user equipment at a subframe n in the serving cell, a transmitted physical downlink shared channel, or a downlink control channel indicating downlink semi-persistent scheduling release, where n is an integer; and sending, by the user equipment at a subframe n+k, a HARQ-ACK response that is corresponding to the transmitted physical downlink shared channel or the downlink control channel of the serving cell at the subframe n, where k is an integer; where when the subframe n is the first subframe, k is 0.

With reference to the fourth possible implementation or the fifth possible implementation of the first aspect, in a tenth possible implementation of the first aspect, the sending and receiving, by the user equipment, information in the serving cell based on the frame structure includes:

receiving, by the user equipment at a subframe n in the serving cell, a transmitted physical downlink shared channel, or a downlink control channel indicating downlink semi-persistent scheduling release, where n is an integer; and sending, by the user equipment at a subframe n+k, a HARQ-ACK response that is corresponding to the transmitted physical downlink shared channel or the downlink control channel of the serving cell at the subframe n, where k is an integer; where when a subframe n+2 is the first subframe, k is 2; when the subframe n is the first subframe and a subframe n+2 is not the downlink subframe, k is 2; or when the subframe n is the first subframe and a subframe n+2 is the downlink subframe, k is 3.

With reference to the sixth possible implementation or the seventh possible implementation of the first aspect, in an eleventh possible implementation of the first aspect, the sending and receiving, by the user equipment, information in the serving cell based on the frame structure includes:

receiving, by the user equipment at a subframe n in the serving cell, a transmitted physical downlink shared channel, or a downlink control channel indicating downlink semi-persistent scheduling release, where n is an integer; and sending, by the user equipment at a subframe n+k, a HARQ-ACK response that is corresponding to the transmitted physical downlink shared channel or the downlink control channel of the serving cell at the subframe n, where k is an integer; where when a subframe n+1 is the first subframe, k is 1; when the subframe n is the first subframe and a subframe n+1 is not the downlink subframe, k is 1; or when the subframe n is the first subframe and a subframe n+1 is the downlink subframe, k is 2.

With reference to any one of the first possible implementation to the seventh possible implementation of the first aspect, in a twelfth possible implementation of the first aspect, the sending and receiving, by the user equipment, information in the serving cell based on the frame structure includes:

receiving, by the user equipment at a subframe i, a downlink control channel that schedules a physical uplink shared channel; and sending, by the user equipment at a subframe i+4 in the serving cell, the physical uplink shared channel scheduled by the downlink control channel, where i is an integer.

With reference to any one of the first possible implementation to the seventh possible implementation of the first aspect, in a thirteenth possible implementation of the first aspect, the sending and receiving, by the user equipment, information in the serving cell based on the frame structure includes:

sending, by the user equipment, a physical uplink shared channel at a subframe j in the serving cell; and receiving, by the user equipment at a subframe j+6, a HARQ-ACK corresponding to the physical uplink shared channel, where j is an integer.

With reference to any one of the first possible implementation to the seventh possible implementation of the first aspect, in a fourteenth possible implementation of the first aspect, the sending and receiving, by the user equipment, information in the serving cell based on the frame structure includes:

receiving, by the user equipment at a subframe h, a HARQ-ACK corresponding to a physical uplink shared channel; and sending, by the user equipment at a subframe h+4 in the serving cell, a physical uplink shared channel corresponding to the HARQ-ACK, where h is an integer.

With reference to the first possible implementation, the fourth possible implementation, the sixth possible implementation, or any one of the eighth possible implementation to the eleventh possible implementation of the first aspect, in a fifteenth possible implementation of the first aspect, the sending and receiving, by the user equipment, information in the serving cell based on the frame structure includes:

receiving, by the user equipment at a subframe i, a downlink control channel that schedules a physical uplink shared channel; and sending, by the user equipment at a subframe i+2 in the serving cell, the physical uplink shared channel scheduled by the downlink control channel, where i is an integer.

With reference to the first possible implementation, the fourth possible implementation, the sixth possible implementation, or any one of the eighth possible implementation to the eleventh possible implementation of the first aspect, in a sixteenth possible implementation of the first aspect, the sending and receiving, by the user equipment, information in the serving cell based on the frame structure includes:

sending, by the user equipment, a physical uplink shared channel at a subframe j in the serving cell; and receiving, by the user equipment at a subframe j+3, a HARQ-ACK corresponding to the physical uplink shared channel, where j is an integer.

With reference to the first possible implementation, the fourth possible implementation, the sixth possible implementation, or any one of the eighth possible implementation to the eleventh possible implementation of the first aspect, in a seventeenth possible implementation of the first aspect, the sending and receiving, by the user equipment, information in the serving cell based on the frame structure includes:

receiving, by the user equipment at a subframe h, a HARQ-ACK corresponding to a physical uplink shared channel; and sending, by the user equipment at a subframe h+2 in the serving cell, a physical uplink shared channel corresponding to the HARQ-ACK, where h is an integer.

According to a second aspect, a method for sending and receiving information is provided, including:

determining, by a base station, a frame structure of a serving cell; where a radio frame corresponding to the frame structure includes at least one downlink subframe and at least one uplink subframe, and further includes at least one first subframe and/or at least one second subframe; the first subframe includes a first symbol used for downlink transmission, a first GP, and a second symbol used for uplink transmission, and the second subframe includes a third symbol used for downlink transmission, a second GP, and a fourth symbol used for uplink transmission; in the first subframe, a quantity of first symbols used for downlink transmission is greater than a quantity of second symbols used for uplink transmission, and in the second subframe, a quantity of third symbols used for downlink transmission is less than a quantity of fourth symbols used for uplink transmission; the uplink transmission includes HARQ-ACK transmission, and the downlink transmission includes physical downlink control channel transmission; and sending and receiving, by the base station, information in the serving cell to and from user equipment based on the frame structure.

With reference to the second aspect, in a first possible implementation of the second aspect, the radio frame includes 10 subframes, where a subframe 0, a subframe 4, a subframe 5, a subframe 8, and a subframe 9 are the downlink subframes, a subframe 2 and a subframe 7 are the uplink subframes, a subframe 1 and a subframe 6 are special subframes, and a subframe 3 is the first subframe; or the radio frame includes 10 subframes, where a subframe 0, a subframe 4, a subframe 5, and a subframe 9 are the downlink subframes, a subframe 2 and a subframe 7 are the uplink subframes, a subframe 1 and a subframe 6 are special subframes, and a subframe 3 and a subframe 8 are the first subframes; or the radio frame includes 10 subframes, where a subframe 0, a subframe 5, and a subframe 9 are the downlink subframes, a subframe 2 and a subframe 7 are the uplink subframes, a subframe 1 and a subframe 6 are special subframes, and a subframe 3, a subframe 4, and a subframe 8 are the first subframes; or the radio frame includes 10 subframes, where a subframe 0 and a subframe 5 are the downlink subframes, a subframe 2 and a subframe 7 are the uplink subframes, a subframe 1 and a subframe 6 are special subframes, and a subframe 3, a subframe 4, a subframe 8, and a subframe 9 are the first subframes; or the radio frame includes 10 subframes, where a subframe 5 is the downlink subframe, a subframe 2 and a subframe 7 are the uplink subframes, a subframe 1 and a subframe 6 are special subframes, and a subframe 0, a subframe 3, a subframe 4, a subframe 8, and a subframe 9 are the first subframes.

With reference to the second aspect, in a second possible implementation of the second aspect, the radio frame includes 10 subframes, where a subframe 3 and a subframe 5 are the downlink subframes, a subframe 2 and a subframe 9 are the uplink subframes, a subframe 1 and a subframe 6 are special subframes, and a subframe 0, a subframe 4, a subframe 7, and a subframe 8 are the first subframes; or the radio frame includes 10 subframes, where a subframe 5 is the downlink subframe, a subframe 2 is the uplink subframe, a subframe 6 is a special subframe, a subframe 0, a subframe 3, a subframe 4, a subframe 7, a subframe 8, and a subframe 9 are the first subframes, and a subframe 1 is the second subframe.

With reference to the second aspect, in a third possible implementation of the second aspect, the radio frame includes 10 subframes, where a subframe 5 is the downlink subframe, a subframe 2 and a subframe 9 are the uplink subframes, a subframe 1 and a subframe 6 are special subframes, and a subframe 0, a subframe 3, a subframe 4, a subframe 7, and a subframe 8 are the first subframes; or the radio frame includes 10 subframes, where a subframe 5 is the downlink subframe, a subframe 2 is the uplink subframe, a subframe 6 is a special subframe, a subframe 0, a subframe 3, a subframe 4, a subframe 7, a subframe 8, and a subframe 9 are the first subframes, and a subframe 1 is the second subframe.

With reference to the second aspect, in a fourth possible implementation of the second aspect, the radio frame includes 10 subframes, where a subframe 0, a subframe 4, a subframe 5, a subframe 8, and a subframe 9 are the downlink subframes, a subframe 2 and a subframe 7 are the uplink subframes, a subframe 1 and a subframe 6 are special subframes, and a subframe 3 is the first subframe; or the radio frame includes 10 subframes, where a subframe 0, a subframe 4, a subframe 5, and a subframe 9 are the downlink subframes, a subframe 2 and a subframe 7 are the uplink subframes, a subframe 1 and a subframe 6 are special subframes, and a subframe 3 and a subframe 8 are the first subframes; or the radio frame includes 10 subframes, where a subframe 4, a subframe 5, and a subframe 9 are the downlink subframes, a subframe 2 and a subframe 7 are the uplink subframes, a subframe 1 and a subframe 6 are special subframes, and a subframe 0, a subframe 3, and a subframe 8 are the first subframes.

With reference to the second aspect, in a fifth possible implementation of the second aspect, the radio frame includes 10 subframes, where a subframe 4, a subframe 5, and a subframe 8 are the downlink subframes, a subframe 2 and a subframe 3 are the uplink subframes, a subframe 1 and a subframe 6 are special subframes, and a subframe 0, a subframe 7, and a subframe 9 are the first subframes; or the radio frame includes 10 subframes, where a subframe 4 and a subframe 5 are the downlink subframes, a subframe 2 and a subframe 3 are the uplink subframes, a subframe 1 and a subframe 6 are special subframes, and a subframe 0, a subframe 7, a subframe 8, and a subframe 9 are the first subframes.

With reference to the second aspect, in a sixth possible implementation of the second aspect, the radio frame includes 10 subframes, where a subframe 0, a subframe 3, a subframe 5, a subframe 8, and a subframe 9 are the downlink subframes, a subframe 2 and a subframe 7 are the uplink subframes, a subframe 1 and a subframe 6 are special subframes, and a subframe 4 is the first subframe; or the radio frame includes 10 subframes, where a subframe 0, a subframe 3, a subframe 5, and a subframe 8 are the downlink subframes, a subframe 2 and a subframe 7 are the uplink subframes, a subframe 1 and a subframe 6 are special subframes, and a subframe 4 and a subframe 9 are the first subframes; or the radio frame includes 10 subframes, where a subframe 3, a subframe 5, and a subframe 8 are the downlink subframes, a subframe 2 and a subframe 7 are the uplink subframes, a subframe 1 and a subframe 6 are special subframes, and a subframe 0, a subframe 4, and a subframe 9 are the first subframes.

With reference to the second aspect, in a seventh possible implementation of the second aspect, the radio frame includes 10 subframes, where a subframe 3, a subframe 5, and a subframe 8 are the downlink subframes, a subframe 2 is the uplink subframe, a subframe 1 and a subframe 6 are special subframes, a subframe 0, a subframe 7, and a subframe 9 are the first subframes, and a subframe 4 is the second subframe; or the radio frame includes 10 subframes, where a subframe 3 and a subframe 5 are the downlink subframes, a subframe 2 is the uplink subframe, a subframe 1 and a subframe 6 are special subframes, a subframe 0, a subframe 4, a subframe 7, a subframe 8, and a subframe 9 are the first subframes, and a subframe 4 is the second subframe.

With reference to the first possible implementation or the second possible implementation of the second aspect, in an eighth possible implementation of the second aspect, the sending and receiving, by the base station, information in the serving cell to and from user equipment based on the frame structure includes:

sending, by the base station to the user equipment at a subframe n in the serving cell, a transmitted physical downlink shared channel, or a downlink control channel indicating downlink semi-persistent scheduling release, where n is an integer; and receiving, by the base station at a subframe n+k, a HARQ-ACK response that is fed back by the user equipment and is corresponding to the transmitted physical downlink shared channel or the downlink control channel of the serving cell at the subframe n, where k is an integer; where when the subframe n is the first subframe or a subframe n+4 is the first subframe, k is 4.

With reference to the first possible implementation or the third possible implementation of the second aspect, in a ninth possible implementation of the second aspect, the sending and receiving, by the base station, information in the serving cell to and from user equipment based on the frame structure includes:

sending, by the base station to the user equipment at a subframe n in the serving cell, a transmitted physical downlink shared channel, or a downlink control channel indicating downlink semi-persistent scheduling release, where n is an integer; and receiving, by the base station at a subframe n+k, a HARQ-ACK response that is fed back by the user equipment and is corresponding to the transmitted physical downlink shared channel or the downlink control channel of the serving cell at the subframe n, where k is an integer; where when the subframe n is the first subframe, k is 0.

With reference to the fourth possible implementation or the fifth possible implementation of the second aspect, in a tenth possible implementation of the second aspect, the sending and receiving, by the base station, information in the serving cell to and from user equipment based on the frame structure includes:

sending, by the base station to the user equipment at a subframe n in the serving cell, a transmitted physical downlink shared channel, or a downlink control channel indicating downlink semi-persistent scheduling release, where n is an integer; and receiving, by the base station at a subframe n+k, a HARQ-ACK response that is fed back by the user equipment and is corresponding to the transmitted physical downlink shared channel or the downlink control channel of the serving cell at the subframe n, where k is an integer; where when a subframe n+2 is the first subframe, k is 2; when the subframe n is the first subframe and a subframe n+2 is not the downlink subframe, k is 2; or when the subframe n is the first subframe and a subframe n+2 is the downlink subframe, k is 3.

With reference to the sixth possible implementation or the seventh possible implementation of the second aspect, in an eleventh possible implementation of the second aspect, the sending and receiving, by the base station, information in the serving cell to and from user equipment based on the frame structure includes:

sending, by the base station to the user equipment at a subframe n in the serving cell, a transmitted physical downlink shared channel, or a downlink control channel indicating downlink semi-persistent scheduling release, where n is an integer; and receiving, by the base station at a subframe n+k, a HARQ-ACK response that is fed back by the user equipment and is corresponding to the transmitted physical downlink shared channel or the downlink control channel of the serving cell at the subframe n, where k is an integer; where when a subframe n+1 is the first subframe, k is 1; when the subframe n is the first subframe and a subframe n+1 is not the downlink subframe, k is 1; or when the subframe n is the first subframe and a subframe n+1 is the downlink subframe, k is 2.

With reference to any one of the first possible implementation to the seventh possible implementation of the second aspect, in a twelfth possible implementation of the second aspect, the sending and receiving, by the base station, information in the serving cell to and from user equipment based on the frame structure includes:

sending, by the base station to the user equipment at a subframe i, a downlink control channel that schedules a physical uplink shared channel; and receiving, by the base station at a subframe i+4 in the serving cell, the physical uplink shared channel scheduled by the downlink control channel, where i is an integer.

With reference to any one of the first possible implementation to the seventh possible implementation of the second aspect, in a thirteenth possible implementation of the second aspect, the sending and receiving, by the base station, information in the serving cell to and from user equipment based on the frame structure includes:

receiving, by the base station at a subframe j in the serving cell, a physical uplink shared channel sent by the user equipment; and sending, by the base station at a subframe j+6, a HARQ-ACK corresponding to the physical uplink shared channel, where j is an integer.

With reference to any one of the first possible implementation to the seventh possible implementation of the second aspect, in a fourteenth possible implementation of the second aspect, the sending and receiving, by the base station, information in the serving cell to and from user equipment based on the frame structure includes:

sending, by the base station at a subframe h, a HARQ-ACK corresponding to a physical uplink shared channel sent by the user equipment; and receiving, by the base station at a subframe h+4 in the serving cell, the retransmitted physical uplink shared channel, where h is an integer.

With reference to the first possible implementation, the fourth possible implementation, the sixth possible implementation, or any one of the eighth possible implementation to the eleventh possible implementation of the second aspect, in a fifteenth possible implementation of the second aspect, the sending and receiving, by the base station, information in the serving cell to and from user equipment based on the frame structure includes:

sending, by the base station to the user equipment at a subframe i, a downlink control channel that schedules a physical uplink shared channel; and receiving, by the base station at a subframe i+2 in the serving cell, the physical uplink shared channel scheduled by the downlink control channel, where i is an integer.

With reference to the first possible implementation, the fourth possible implementation, the sixth possible implementation, or any one of the eighth possible implementation to the eleventh possible implementation of the second aspect, in a sixteenth possible implementation of the second aspect, the sending and receiving, by the base station, information in the serving cell to and from user equipment based on the frame structure includes:

receiving, by the base station at a subframe j in the serving cell, a physical uplink shared channel sent by the user equipment; and sending, by the base station at a subframe j+3, a HARQ-ACK corresponding to the physical uplink shared channel, where j is an integer.

With reference to the first possible implementation, the fourth possible implementation, the sixth possible implementation, or any one of the eighth possible implementation to the eleventh possible implementation of the second aspect, in a seventeenth possible implementation of the second aspect, the sending and receiving, by the base station, information in the serving cell to and from user equipment based on the frame structure includes:

sending, by the base station at a subframe h, a HARQ-ACK corresponding to a physical uplink shared channel sent by the user equipment; and receiving, by the base station at a subframe h+2 in the serving cell, the retransmitted physical uplink shared channel, where h is an integer.

According to a third aspect, user equipment is provided, including:

a determining module, configured to determine a frame structure of a serving cell; where a radio frame corresponding to the frame structure includes at least one downlink subframe and at least one uplink subframe, and further includes at least one first subframe and/or at least one second subframe; the first subframe includes a first symbol used for downlink transmission, a first GP, and a second symbol used for uplink transmission, and the second subframe includes a third symbol used for downlink transmission, a second GP, and a fourth symbol used for uplink transmission; in the first subframe, a quantity of first symbols used for downlink transmission is greater than a quantity of second symbols used for uplink transmission, and in the second subframe, a quantity of third symbols used for downlink transmission is less than a quantity of fourth symbols used for uplink transmission; the uplink transmission includes HARQ-ACK transmission, and the downlink transmission includes physical downlink control channel transmission; and a transceiver module, configured to send and receive information in the serving cell based on the frame structure.

With reference to the third aspect, in a first possible implementation of the third aspect, the radio frame includes 10 subframes, where a subframe 0, a subframe 4, a subframe 5, a subframe 8, and a subframe 9 are the downlink subframes, a subframe 2 and a subframe 7 are the uplink subframes, a subframe 1 and a subframe 6 are special subframes, and a subframe 3 is the first subframe; or the radio frame includes 10 subframes, where a subframe 0, a subframe 4, a subframe 5, and a subframe 9 are the downlink subframes, a subframe 2 and a subframe 7 are the uplink subframes, a subframe 1 and a subframe 6 are special subframes, and a subframe 3 and a subframe 8 are the first subframes; or the radio frame includes 10 subframes, where a subframe 0, a subframe 5, and a subframe 9 are the downlink subframes, a subframe 2 and a subframe 7 are the uplink subframes, a subframe 1 and a subframe 6 are special subframes, and a subframe 3, a subframe 4, and a subframe 8 are the first subframes; or the radio frame includes 10 subframes, where a subframe 0 and a subframe 5 are the downlink subframes, a subframe 2 and a subframe 7 are the uplink subframes, a subframe 1 and a subframe 6 are special subframes, and a subframe 3, a subframe 4, a subframe 8, and a subframe 9 are the first subframes; or the radio frame includes 10 subframes, where a subframe 5 is the downlink subframe, a subframe 2 and a subframe 7 are the uplink subframes, a subframe 1 and a subframe 6 are special subframes, and a subframe 0, a subframe 3, a subframe 4, a subframe 8, and a subframe 9 are the first subframes.

With reference to the third aspect, in a second possible implementation of the third aspect, the radio frame includes 10 subframes, where a subframe 3 and a subframe 5 are the downlink subframes, a subframe 2 and a subframe 9 are the uplink subframes, a subframe 1 and a subframe 6 are special subframes, and a subframe 0, a subframe 4, a subframe 7, and a subframe 8 are the first subframes; or the radio frame includes 10 subframes, where a subframe 5 is the downlink subframe, a subframe 2 is the uplink subframe, a subframe 6 is a special subframe, a subframe 0, a subframe 3, a subframe 4, a subframe 7, a subframe 8, and a subframe 9 are the first subframes, and a subframe 1 is the second subframe.

With reference to the third aspect, in a third possible implementation of the third aspect, the radio frame includes 10 subframes, where a subframe 5 is the downlink subframe, a subframe 2 and a subframe 9 are the uplink subframes, a subframe 1 and a subframe 6 are special subframes, and a subframe 0, a subframe 3, a subframe 4, a subframe 7, and a subframe 8 are the first subframes; or the radio frame includes 10 subframes, where a subframe 5 is the downlink subframe, a subframe 2 is the uplink subframe, a subframe 6 is a special subframe, a subframe 0, a subframe 3, a subframe 4, a subframe 7, a subframe 8, and a subframe 9 are the first subframes, and a subframe 1 is the second subframe.

With reference to the third aspect, in a fourth possible implementation of the third aspect, the radio frame includes 10 subframes, where a subframe 0, a subframe 4, a subframe 5, a subframe 8, and a subframe 9 are the downlink subframes, a subframe 2 and a subframe 7 are the uplink subframes, a subframe 1 and a subframe 6 are special subframes, and a subframe 3 is the first subframe; or the radio frame includes 10 subframes, where a subframe 0, a subframe 4, a subframe 5, and a subframe 9 are the downlink subframes, a subframe 2 and a subframe 7 are the uplink subframes, a subframe 1 and a subframe 6 are special subframes, and a subframe 3 and a subframe 8 are the first subframes; or the radio frame includes 10 subframes, where a subframe 4, a subframe 5, and a subframe 9 are the downlink subframes, a subframe 2 and a subframe 7 are the uplink subframes, a subframe 1 and a subframe 6 are special subframes, and a subframe 0, a subframe 3, and a subframe 8 are the first subframes.

With reference to the third aspect, in a fifth possible implementation of the third aspect, the radio frame includes 10 subframes, where a subframe 4, a subframe 5, and a subframe 8 are the downlink subframes, a subframe 2 and a subframe 3 are the uplink subframes, a subframe 1 and a subframe 6 are special subframes, and a subframe 0, a subframe 7, and a subframe 9 are the first subframes; or the radio frame includes 10 subframes, where a subframe 4 and a subframe 5 are the downlink subframes, a subframe 2 and a subframe 3 are the uplink subframes, a subframe 1 and a subframe 6 are special subframes, and a subframe 0, a subframe 7, a subframe 8, and a subframe 9 are the first subframes.

With reference to the third aspect, in a sixth possible implementation of the third aspect, the radio frame includes 10 subframes, where a subframe 0, a subframe 3, a subframe 5, a subframe 8, and a subframe 9 are the downlink subframes, a subframe 2 and a subframe 7 are the uplink subframes, a subframe 1 and a subframe 6 are special subframes, and a subframe 4 is the first subframe; or the radio frame includes 10 subframes, where a subframe 0, a subframe 3, a subframe 5, and a subframe 8 are the downlink subframes, a subframe 2 and a subframe 7 are the uplink subframes, a subframe 1 and a subframe 6 are special subframes, and a subframe 4 and a subframe 9 are the first subframes; or the radio frame includes 10 subframes, where a subframe 3, a subframe 5, and a subframe 8 are the downlink subframes, a subframe 2 and a subframe 7 are the uplink subframes, a subframe 1 and a subframe 6 are special subframes, and a subframe 0, a subframe 4, and a subframe 9 are the first subframes.

With reference to the third aspect, in a seventh possible implementation of the third aspect, the radio frame includes 10 subframes, where a subframe 3, a subframe 5, and a subframe 8 are the downlink subframes, a subframe 2 is the uplink subframe, a subframe 1 and a subframe 6 are special subframes, a subframe 0, a subframe 7, and a subframe 9 are the first subframes, and a subframe 4 is the second subframe; or the radio frame includes 10 subframes, where a subframe 3 and a subframe 5 are the downlink subframes, a subframe 2 is the uplink subframe, a subframe 1 and a subframe 6 are special subframes, a subframe 0, a subframe 4, a subframe 7, a subframe 8, and a subframe 9 are the first subframes, and a subframe 4 is the second subframe.

With reference to the first possible implementation or the second possible implementation of the third aspect, in an eighth possible implementation of the third aspect, the transceiver module is specifically configured to:

receive, at a subframe n in the serving cell, a transmitted physical downlink shared channel, or a downlink control channel indicating downlink semi-persistent scheduling release, where n is an integer; and send, at a subframe n+k, a HARQ-ACK response that is corresponding to the transmitted physical downlink shared channel or the downlink control channel of the serving cell at the subframe n, where k is an integer; where when the subframe n is the first subframe or a subframe n+4 is the first subframe, k is 4.

With reference to the first possible implementation or the third possible implementation of the third aspect, in a ninth possible implementation of the third aspect, the transceiver module is specifically configured to:

receive, at a subframe n in the serving cell, a transmitted physical downlink shared channel, or a downlink control channel indicating downlink semi-persistent scheduling release, where n is an integer; and send, at a subframe n+k, a HARQ-ACK response that is corresponding to the transmitted physical downlink shared channel or the downlink control channel of the serving cell at the subframe n, where k is an integer; where when the subframe n is the first subframe, k is 0.

With reference to the fourth possible implementation or the fifth possible implementation of the third aspect, in a tenth possible implementation of the third aspect, the transceiver module is specifically configured to:

receive, at a subframe n in the serving cell, a transmitted physical downlink shared channel, or a downlink control channel indicating downlink semi-persistent scheduling release, where n is an integer; and send, at a subframe n+k, a HARQ-ACK response that is corresponding to the transmitted physical downlink shared channel or the downlink control channel of the serving cell at the subframe n, where k is an integer; where when a subframe n+2 is the first subframe, k is 2; when the subframe n is the first subframe and a subframe n+2 is not the downlink subframe, k is 2; or when the subframe n is the first subframe and a subframe n+2 is the downlink subframe, k is 3.

With reference to the sixth possible implementation or the seventh possible implementation of the third aspect, in an eleventh possible implementation of the third aspect, the transceiver module is specifically configured to:

receive, at a subframe n in the serving cell, a transmitted physical downlink shared channel, or a downlink control channel indicating downlink semi-persistent scheduling release, where n is an integer; and send, at a subframe n+k, a HARQ-ACK response that is corresponding to the transmitted physical downlink shared channel or the downlink control channel of the serving cell at the subframe n, where k is an integer; where when a subframe n+1 is the first subframe, k is 1; when the subframe n is the first subframe and a subframe n+1 is not the downlink subframe, k is 1; or when the subframe n is the first subframe and a subframe n+1 is the downlink subframe, k is 2.

With reference to any one of the first possible implementation to the seventh possible implementation of the third aspect, in a twelfth possible implementation of the third aspect, the transceiver module is specifically configured to:

receive, at a subframe i, a downlink control channel that schedules a physical uplink shared channel; and send, at a subframe i+4 in the serving cell, the physical uplink shared channel scheduled by the downlink control channel, where i is an integer.

With reference to any one of the first possible implementation to the seventh possible implementation of the third aspect, in a thirteenth possible implementation of the third aspect, the transceiver module is specifically configured to:

send a physical uplink shared channel at a subframe j in the serving cell; and receive, at a subframe j+6, a HARQ-ACK corresponding to the physical uplink shared channel, where j is an integer.

With reference to any one of the first possible implementation to the seventh possible implementation of the third aspect, in a fourteenth possible implementation of the third aspect, the transceiver module is specifically configured to:

receive, at a subframe h, a HARQ-ACK corresponding to a physical uplink shared channel; and send, at a subframe h+4 in the serving cell, a physical uplink shared channel corresponding to the HARQ-ACK, where h is an integer.

With reference to the first possible implementation, the fourth possible implementation, the sixth possible implementation, or any one of the eighth possible implementation to the eleventh possible implementation of the third aspect, in a fifteenth possible implementation of the third aspect, the transceiver module is specifically configured to:

receive, at a subframe i, a downlink control channel that schedules a physical uplink shared channel; and send, at a subframe i+2 in the serving cell, the physical uplink shared channel scheduled by the downlink control channel, where i is an integer.

With reference to the first possible implementation, the fourth possible implementation, the sixth possible implementation, or any one of the eighth possible implementation to the eleventh possible implementation of the third aspect, in a sixteenth possible implementation of the third aspect, the transceiver module is specifically configured to:

send a physical uplink shared channel at a subframe j in the serving cell; and receive, at a subframe j+3, a HARQ-ACK corresponding to the physical uplink shared channel, where j is an integer.

With reference to the first possible implementation, the fourth possible implementation, the sixth possible implementation, or any one of the eighth possible implementation to the eleventh possible implementation of the third aspect, in a seventeenth possible implementation of the third aspect, the transceiver module is specifically configured to:

receive, at a subframe h, a HARQ-ACK corresponding to a physical uplink shared channel; and send, at a subframe h+2 in the serving cell, a physical uplink shared channel corresponding to the HARQ-ACK, where h is an integer.

According to a fourth aspect, a base station is provided, including:

a determining module, configured to determine a frame structure of a serving cell;

where a radio frame corresponding to the frame structure includes at least one downlink subframe and at least one uplink subframe, and further includes at least one first subframe and/or at least one second subframe; the first subframe includes a first symbol used for downlink transmission, a first GP, and a second symbol used for uplink transmission, and the second subframe includes a third symbol used for downlink transmission, a second GP, and a fourth symbol used for uplink transmission; in the first subframe, a quantity of first symbols used for downlink transmission is greater than a quantity of second symbols used for uplink transmission, and in the second subframe, a quantity of third symbols used for downlink transmission is less than a quantity of fourth symbols used for uplink transmission; the uplink transmission includes HARQ-ACK transmission, and the downlink transmission includes physical downlink control channel transmission; and a transceiver module, configured to send and receive information in the serving cell to and from user equipment based on the frame structure.

With reference to the fourth aspect, in a first possible implementation of the fourth aspect, the radio frame includes 10 subframes, where a subframe 0, a subframe 4, a subframe 5, a subframe 8, and a subframe 9 are the downlink subframes, a subframe 2 and a subframe 7 are the uplink subframes, a subframe 1 and a subframe 6 are special subframes, and a subframe 3 is the first subframe; or the radio frame includes 10 subframes, where a subframe 0, a subframe 4, a subframe 5, and a subframe 9 are the downlink subframes, a subframe 2 and a subframe 7 are the uplink subframes, a subframe 1 and a subframe 6 are special subframes, and a subframe 3 and a subframe 8 are the first subframes; or the radio frame includes 10 subframes, where a subframe 0, a subframe 5, and a subframe 9 are the downlink subframes, a subframe 2 and a subframe 7 are the uplink subframes, a subframe 1 and a subframe 6 are special subframes, and a subframe 3, a subframe 4, and a subframe 8 are the first subframes; or the radio frame includes 10 subframes, where a subframe 0 and a subframe 5 are the downlink subframes, a subframe 2 and a subframe 7 are the uplink subframes, a subframe 1 and a subframe 6 are special subframes, and a subframe 3, a subframe 4, a subframe 8, and a subframe 9 are the first subframes; or the radio frame includes 10 subframes, where a subframe 5 is the downlink subframe, a subframe 2 and a subframe 7 are the uplink subframes, a subframe 1 and a subframe 6 are special subframes, and a subframe 0, a subframe 3, a subframe 4, a subframe 8, and a subframe 9 are the first subframes.

With reference to the fourth aspect, in a second possible implementation of the fourth aspect, the radio frame includes 10 subframes, where a subframe 3 and a subframe 5 are the downlink subframes, a subframe 2 and a subframe 9 are the uplink subframes, a subframe 1 and a subframe 6 are special subframes, and a subframe 0, a subframe 4, a subframe 7, and a subframe 8 are the first subframes; or the radio frame includes 10 subframes, where a subframe 5 is the downlink subframe, a subframe 2 is the uplink subframe, a subframe 6 is a special subframe, a subframe 0, a subframe 3, a subframe 4, a subframe 7, a subframe 8, and a subframe 9 are the first subframes, and a subframe 1 is the second subframe.

With reference to the fourth aspect, in a third possible implementation of the fourth aspect, the radio frame includes 10 subframes, where a subframe 5 is the downlink subframe, a subframe 2 and a subframe 9 are the uplink subframes, a subframe 1 and a subframe 6 are special subframes, and a subframe 0, a subframe 3, a subframe 4, a subframe 7, and a subframe 8 are the first subframes; or the radio frame includes 10 subframes, where a subframe 5 is the downlink subframe, a subframe 2 is the uplink subframe, a subframe 6 is a special subframe, a subframe 0, a subframe 3, a subframe 4, a subframe 7, a subframe 8, and a subframe 9 are the first subframes, and a subframe 1 is the second subframe.

With reference to the fourth aspect, in a fourth possible implementation of the fourth aspect, the radio frame includes 10 subframes, where a subframe 0, a subframe 4, a subframe 5, a subframe 8, and a subframe 9 are the downlink subframes, a subframe 2 and a subframe 7 are the uplink subframes, a subframe 1 and a subframe 6 are special subframes, and a subframe 3 is the first subframe; or the radio frame includes 10 subframes, where a subframe 0, a subframe 4, a subframe 5, and a subframe 9 are the downlink subframes, a subframe 2 and a subframe 7 are the uplink subframes, a subframe 1 and a subframe 6 are special subframes, and a subframe 3 and a subframe 8 are the first subframes; or the radio frame includes 10 subframes, where a subframe 4, a subframe 5, and a subframe 9 are the downlink subframes, a subframe 2 and a subframe 7 are the uplink subframes, a subframe 1 and a subframe 6 are special subframes, and a subframe 0, a subframe 3, and a subframe 8 are the first subframes.

With reference to the fourth aspect, in a fifth possible implementation of the fourth aspect, the radio frame includes 10 subframes, where a subframe 4, a subframe 5, and a subframe 8 are the downlink subframes, a subframe 2 and a subframe 3 are the uplink subframes, a subframe 1 and a subframe 6 are special subframes, and a subframe 0, a subframe 7, and a subframe 9 are the first subframes; or the radio frame includes 10 subframes, where a subframe 4 and a subframe 5 are the downlink subframes, a subframe 2 and a subframe 3 are the uplink subframes, a subframe 1 and a subframe 6 are special subframes, and a subframe 0, a subframe 7, a subframe 8, and a subframe 9 are the first subframes.

With reference to the fourth aspect, in a sixth possible implementation of the fourth aspect, the radio frame includes 10 subframes, where a subframe 0, a subframe 3, a subframe 5, a subframe 8, and a subframe 9 are the downlink subframes, a subframe 2 and a subframe 7 are the uplink subframes, a subframe 1 and a subframe 6 are special subframes, and a subframe 4 is the first subframe; or the radio frame includes 10 subframes, where a subframe 0, a subframe 3, a subframe 5, and a subframe 8 are the downlink subframes, a subframe 2 and a subframe 7 are the uplink subframes, a subframe 1 and a subframe 6 are special subframes, and a subframe 4 and a subframe 9 are the first subframes; or the radio frame includes 10 subframes, where a subframe 3, a subframe 5, and a subframe 8 are the downlink subframes, a subframe 2 and a subframe 7 are the uplink subframes, a subframe 1 and a subframe 6 are special subframes, and a subframe 0, a subframe 4, and a subframe 9 are the first subframes.

With reference to the fourth aspect, in a seventh possible implementation of the fourth aspect, the radio frame includes 10 subframes, where a subframe 3, a subframe 5, and a subframe 8 are the downlink subframes, a subframe 2 is the uplink subframe, a subframe 1 and a subframe 6 are special subframes, a subframe 0, a subframe 7, and a subframe 9 are the first subframes, and a subframe 4 is the second subframe; or the radio frame includes 10 subframes, where a subframe 3 and a subframe 5 are the downlink subframes, a subframe 2 is the uplink subframe, a subframe 1 and a subframe 6 are special subframes, a subframe 0, a subframe 4, a subframe 7, a subframe 8, and a subframe 9 are the first subframes, and a subframe 4 is the second subframe.

With reference to the first possible implementation or the second possible implementation of the fourth aspect, in an eighth possible implementation of the fourth aspect, the transceiver module is specifically configured to:

send, to the user equipment at a subframe n in the serving cell, a transmitted physical downlink shared channel, or a downlink control channel indicating downlink semi-persistent scheduling release, where n is an integer; and receive, at a subframe n+k, a HARQ-ACK response that is fed back by the user equipment and is corresponding to the transmitted physical downlink shared channel or the downlink control channel of the serving cell at the subframe n, where k is an integer; where when the subframe n is the first subframe or a subframe n+4 is the first subframe, k is 4.

With reference to the first possible implementation or the third possible implementation of the fourth aspect, in a ninth possible implementation of the fourth aspect, the transceiver module is specifically configured to:

send, to the user equipment at a subframe n in the serving cell, a transmitted physical downlink shared channel, or a downlink control channel indicating downlink semi-persistent scheduling release, where n is an integer; and receive, at a subframe n+k, a HARQ-ACK response that is fed back by the user equipment and is corresponding to the transmitted physical downlink shared channel or the downlink control channel of the serving cell at the subframe n, where k is an integer; where when the subframe n is the first subframe, k is 0.

With reference to the fourth possible implementation or the fifth possible implementation of the fourth aspect, in a tenth possible implementation of the fourth aspect, the transceiver module is specifically configured to:

send, to the user equipment at a subframe n in the serving cell, a transmitted physical downlink shared channel, or a downlink control channel indicating downlink semi-persistent scheduling release, where n is an integer; and receive, at a subframe n+k, a HARQ-ACK response that is fed back by the user equipment and is corresponding to the transmitted physical downlink shared channel or the downlink control channel of the serving cell at the subframe n, where k is an integer; where when a subframe n+2 is the first subframe, k is 2; when the subframe n is the first subframe and a subframe n+2 is not the downlink subframe, k is 2; or when the subframe n is the first subframe and a subframe n+2 is the downlink subframe, k is 3.

According to the sixth possible implementation or the seventh possible implementation of the fourth aspect, in an eleventh possible implementation of the fourth aspect, the transceiver module is specifically configured to:

send, to the user equipment at a subframe n in the serving cell, a transmitted physical downlink shared channel, or a downlink control channel indicating downlink semi-persistent scheduling release, where n is an integer; and receive, at a subframe n+k, a HARQ-ACK response that is fed back by the user equipment and is corresponding to the transmitted physical downlink shared channel or the downlink control channel of the serving cell at the subframe n, where k is an integer; where when a subframe n+1 is the first subframe, k is 1; when the subframe n is the first subframe and a subframe n+1 is not the downlink subframe, k is 1; or when the subframe n is the first subframe and a subframe n+1 is the downlink subframe, k is 2.

With reference to any one of the first possible implementation to the seventh possible implementation of the fourth aspect, in a twelfth possible implementation of the fourth aspect, the transceiver module is specifically configured to:

send, to the user equipment at a subframe i, a downlink control channel that schedules a physical uplink shared channel; and receive, at a subframe i+4 in the serving cell, the physical uplink shared channel scheduled by the downlink control channel, where i is an integer.

With reference to any one of the first possible implementation to the seventh possible implementation of the fourth aspect, in a thirteenth possible implementation of the fourth aspect, the transceiver module is specifically configured to:

receive, at a subframe j in the serving cell, a physical uplink shared channel sent by the user equipment; and send, at a subframe j+6, a HARQ-ACK corresponding to the physical uplink shared channel, where j is an integer.

With reference to any one of the first possible implementation to the seventh possible implementation of the fourth aspect, in a fourteenth possible implementation of the fourth aspect, the transceiver module is specifically configured to:

send, at a subframe h, a HARQ-ACK corresponding to a physical uplink shared channel sent by the user equipment; and receive, at a subframe h+4 in the serving cell, the retransmitted physical uplink shared channel, where h is an integer.

With reference to the first possible implementation, the fourth possible implementation, the sixth possible implementation, or any one of the eighth possible implementation to the eleventh possible implementation of the fourth aspect, in a fifteenth possible implementation of the fourth aspect, the transceiver module is specifically configured to:

send, to the user equipment at a subframe i, a downlink control channel that schedules a physical uplink shared channel; and receive, at a subframe i+2 in the serving cell, the physical uplink shared channel scheduled by the downlink control channel, where i is an integer.

With reference to the first possible implementation, the fourth possible implementation, the sixth possible implementation, or any one of the eighth possible implementation to the eleventh possible implementation of the fourth aspect, in a sixteenth possible implementation of the fourth aspect, the transceiver module is specifically configured to:

receive, at a subframe j in the serving cell, a physical uplink shared channel sent by the user equipment; and send, at a subframe j+3, a HARQ-ACK corresponding to the physical uplink shared channel, where j is an integer.

With reference to the first possible implementation, the fourth possible implementation, the sixth possible implementation, or any one of the eighth possible implementation to the eleventh possible implementation of the fourth aspect, in a seventeenth possible implementation of the fourth aspect, the transceiver module is specifically configured to:

send, at a subframe h, a HARQ-ACK corresponding to a physical uplink shared channel sent by the user equipment; and receive, at a subframe h+2 in the serving cell, the retransmitted physical uplink shared channel, where h is an integer.

According to a fifth aspect, user equipment is provided, including a memory, a processor, and a transceiver, where the memory and the transceiver are separately connected to the processor;

the memory is configured to store an instruction;

the processor is configured to execute the instruction to determine a frame structure of a serving cell; where a radio frame corresponding to the frame structure includes at least one downlink subframe and at least one uplink subframe, and further includes at least one first subframe and/or at least one second subframe; the first subframe includes a first symbol used for downlink transmission, a first GP, and a second symbol used for uplink transmission, and the second subframe includes a third symbol used for downlink transmission, a second GP, and a fourth symbol used for uplink transmission; in the first subframe, a quantity of first symbols used for downlink transmission is greater than a quantity of second symbols used for uplink transmission, and in the second subframe, a quantity of third symbols used for downlink transmission is less than a quantity of fourth symbols used for uplink transmission; the uplink transmission includes HARQ-ACK transmission, and the downlink transmission includes physical downlink control channel transmission; and the transceiver is configured to send and receive information in the serving cell based on the frame structure.

With reference to the fifth aspect, in a first possible implementation of the fifth aspect, the radio frame includes 10 subframes, where a subframe 0, a subframe 4, a subframe 5, a subframe 8, and a subframe 9 are the downlink subframes, a subframe 2 and a subframe 7 are the uplink subframes, a subframe 1 and a subframe 6 are special subframes, and a subframe 3 is the first subframe; or the radio frame includes 10 subframes, where a subframe 0, a subframe 4, a subframe 5, and a subframe 9 are the downlink subframes, a subframe 2 and a subframe 7 are the uplink subframes, a subframe 1 and a subframe 6 are special subframes, and a subframe 3 and a subframe 8 are the first subframes; or the radio frame includes 10 subframes, where a subframe 0, a subframe 5, and a subframe 9 are the downlink subframes, a subframe 2 and a subframe 7 are the uplink subframes, a subframe 1 and a subframe 6 are special subframes, and a subframe 3, a subframe 4, and a subframe 8 are the first subframes; or the radio frame includes 10 subframes, where a subframe 0 and a subframe 5 are the downlink subframes, a subframe 2 and a subframe 7 are the uplink subframes, a subframe 1 and a subframe 6 are special subframes, and a subframe 3, a subframe 4, a subframe 8, and a subframe 9 are the first subframes; or the radio frame includes 10 subframes, where a subframe 5 is the downlink subframe, a subframe 2 and a subframe 7 are the uplink subframes, a subframe 1 and a subframe 6 are special subframes, and a subframe 0, a subframe 3, a subframe 4, a subframe 8, and a subframe 9 are the first subframes.

With reference to the fifth aspect, in a second possible implementation of the fifth aspect, the radio frame includes 10 subframes, where a subframe 3 and a subframe 5 are the downlink subframes, a subframe 2 and a subframe 9 are the uplink subframes, a subframe 1 and a subframe 6 are special subframes, and a subframe 0, a subframe 4, a subframe 7, and a subframe 8 are the first subframes; or the radio frame includes 10 subframes, where a subframe 5 is the downlink subframe, a subframe 2 is the uplink subframe, a subframe 6 is a special subframe, a subframe 0, a subframe 3, a subframe 4, a subframe 7, a subframe 8, and a subframe 9 are the first subframes, and a subframe 1 is the second subframe.

With reference to the fifth aspect, in a third possible implementation of the fifth aspect, the radio frame includes 10 subframes, where a subframe 5 is the downlink subframe, a subframe 2 and a subframe 9 are the uplink subframes, a subframe 1 and a subframe 6 are special subframes, and a subframe 0, a subframe 3, a subframe 4, a subframe 7, and a subframe 8 are the first subframes; or the radio frame includes 10 subframes, where a subframe 5 is the downlink subframe, a subframe 2 is the uplink subframe, a subframe 6 is a special subframe, a subframe 0, a subframe 3, a subframe 4, a subframe 7, a subframe 8, and a subframe 9 are the first subframes, and a subframe 1 is the second subframe.

With reference to the fifth aspect, in a fourth possible implementation of the fifth aspect, the radio frame includes 10 subframes, where a subframe 0, a subframe 4, a subframe 5, a subframe 8, and a subframe 9 are the downlink subframes, a subframe 2 and a subframe 7 are the uplink subframes, a subframe 1 and a subframe 6 are special subframes, and a subframe 3 is the first subframe; or the radio frame includes 10 subframes, where a subframe 0, a subframe 4, a subframe 5, and a subframe 9 are the downlink subframes, a subframe 2 and a subframe 7 are the uplink subframes, a subframe 1 and a subframe 6 are special subframes, and a subframe 3 and a subframe 8 are the first subframes; or the radio frame includes 10 subframes, where a subframe 4, a subframe 5, and a subframe 9 are the downlink subframes, a subframe 2 and a subframe 7 are the uplink subframes, a subframe 1 and a subframe 6 are special subframes, and a subframe 0, a subframe 3, and a subframe 8 are the first subframes.

With reference to the fifth aspect, in a fifth possible implementation of the fifth aspect, the radio frame includes 10 subframes, where a subframe 4, a subframe 5, and a subframe 8 are the downlink subframes, a subframe 2 and a subframe 3 are the uplink subframes, a subframe 1 and a subframe 6 are special subframes, and a subframe 0, a subframe 7, and a subframe 9 are the first subframes; or the radio frame includes 10 subframes, where a subframe 4 and a subframe 5 are the downlink subframes, a subframe 2 and a subframe 3 are the uplink subframes, a subframe 1 and a subframe 6 are special subframes, and a subframe 0, a subframe 7, a subframe 8, and a subframe 9 are the first subframes.

With reference to the fifth aspect, in a sixth possible implementation of the fifth aspect, the radio frame includes 10 subframes, where a subframe 0, a subframe 3, a subframe 5, a subframe 8, and a subframe 9 are the downlink subframes, a subframe 2 and a subframe 7 are the uplink subframes, a subframe 1 and a subframe 6 are special subframes, and a subframe 4 is the first subframe; or the radio frame includes 10 subframes, where a subframe 0, a subframe 3, a subframe 5, and a subframe 8 are the downlink subframes, a subframe 2 and a subframe 7 are the uplink subframes, a subframe 1 and a subframe 6 are special subframes, and a subframe 4 and a subframe 9 are the first subframes; or the radio frame includes 10 subframes, where a subframe 3, a subframe 5, and a subframe 8 are the downlink subframes, a subframe 2 and a subframe 7 are the uplink subframes, a subframe 1 and a subframe 6 are special subframes, and a subframe 0, a subframe 4, and a subframe 9 are the first subframes.

With reference to the fifth aspect, in a seventh possible implementation of the fifth aspect, the radio frame includes 10 subframes, where a subframe 3, a subframe 5, and a subframe 8 are the downlink subframes, a subframe 2 is the uplink subframe, a subframe 1 and a subframe 6 are special subframes, a subframe 0, a subframe 7, and a subframe 9 are the first subframes, and a subframe 4 is the second subframe; or the radio frame includes 10 subframes, where a subframe 3 and a subframe 5 are the downlink subframes, a subframe 2 is the uplink subframe, a subframe 1 and a subframe 6 are special subframes, a subframe 0, a subframe 4, a subframe 7, a subframe 8, and a subframe 9 are the first subframes, and a subframe 4 is the second subframe.

With reference to the first possible implementation or the second possible implementation of the fifth aspect, in an eighth possible implementation of the fifth aspect, the transceiver is specifically configured to:

receive, at a subframe n in the serving cell, a transmitted physical downlink shared channel, or a downlink control channel indicating downlink semi-persistent scheduling release, where n is an integer; and send, at a subframe n+k, a HARQ-ACK response that is corresponding to the transmitted physical downlink shared channel or the downlink control channel of the serving cell at the subframe n, where k is an integer; where when the subframe n is the first subframe or a subframe n+4 is the first subframe, k is 4.

With reference to the first possible implementation or the third possible implementation of the fifth aspect, in a ninth possible implementation of the fifth aspect, the transceiver is specifically configured to:

receive, at a subframe n in the serving cell, a transmitted physical downlink shared channel, or a downlink control channel indicating downlink semi-persistent scheduling release, where n is an integer; and send, at a subframe n+k, a HARQ-ACK response that is corresponding to the transmitted physical downlink shared channel or the downlink control channel of the serving cell at the subframe n, where k is an integer; where when the subframe n is the first subframe, k is 0.

With reference to the fourth possible implementation or the fifth possible implementation of the fifth aspect, in a tenth possible implementation of the fifth aspect, the transceiver is specifically configured to:

receive, at a subframe n in the serving cell, a transmitted physical downlink shared channel, or a downlink control channel indicating downlink semi-persistent scheduling release, where n is an integer; and send, at a subframe n+k, a HARQ-ACK response that is corresponding to the transmitted physical downlink shared channel or the downlink control channel of the serving cell at the subframe n, where k is an integer; where when a subframe n+2 is the first subframe, k is 2; when the subframe n is the first subframe and a subframe n+2 is not the downlink subframe, k is 2; or when the subframe n is the first subframe and a subframe n+2 is the downlink subframe, k is 3.

With reference to the sixth possible implementation or the seventh possible implementation of the fifth aspect, in an eleventh possible implementation of the fifth aspect, the transceiver is specifically configured to:

receive, at a subframe n in the serving cell, a transmitted physical downlink shared channel, or a downlink control channel indicating downlink semi-persistent scheduling release, where n is an integer; and send, at a subframe n+k, a HARQ-ACK response that is corresponding to the transmitted physical downlink shared channel or the downlink control channel of the serving cell at the subframe n, where k is an integer; where when a subframe n+1 is the first subframe, k is 1; when the subframe n is the first subframe and a subframe n+1 is not the downlink subframe, k is 1; or when the subframe n is the first subframe and a subframe n+1 is the downlink subframe, k is 2.

With reference to any one of the first possible implementation to the seventh possible implementation of the fifth aspect, in a twelfth possible implementation of the fifth aspect, the transceiver is specifically configured to:

receive, at a subframe i, a downlink control channel that schedules a physical uplink shared channel; and send, at a subframe i+4 in the serving cell, the physical uplink shared channel scheduled by the downlink control channel, where i is an integer.

With reference to any one of the first possible implementation to the seventh possible implementation of the fifth aspect, in a thirteenth possible implementation of the fifth aspect, the transceiver is specifically configured to:

send a physical uplink shared channel at a subframe j in the serving cell; and receive, at a subframe j+6, a HARQ-ACK corresponding to the physical uplink shared channel, where j is an integer.

With reference to any one of the first possible implementation to the seventh possible implementation of the fifth aspect, in a fourteenth possible implementation of the fifth aspect, the transceiver is specifically configured to:

receive, at a subframe h, a HARQ-ACK corresponding to a physical uplink shared channel; and send, at a subframe h+4 in the serving cell, a physical uplink shared channel corresponding to the HARQ-ACK, where h is an integer.

With reference to the first possible implementation, the fourth possible implementation, the sixth possible implementation, or any one of the eighth possible implementation to the eleventh possible implementation of the fifth aspect, in a fifteenth possible implementation of the fifth aspect, the transceiver is specifically configured to:

receive, at a subframe i, a downlink control channel that schedules a physical uplink shared channel; and send, at a subframe i+2 in the serving cell, the physical uplink shared channel scheduled by the downlink control channel, where i is an integer.

With reference to the first possible implementation, the fourth possible implementation, the sixth possible implementation, or any one of the eighth possible implementation to the eleventh possible implementation of the fifth aspect, in a sixteenth possible implementation of the fifth aspect, the transceiver is specifically configured to:

send a physical uplink shared channel at a subframe j in the serving cell; and receive, at a subframe j+3, a HARQ-ACK corresponding to the physical uplink shared channel, where j is an integer.

With reference to the first possible implementation, the fourth possible implementation, the sixth possible implementation, or any one of the eighth possible implementation to the eleventh possible implementation of the fifth aspect, in a seventeenth possible implementation of the fifth aspect, the transceiver is specifically configured to:

receive, at a subframe h, a HARQ-ACK corresponding to a physical uplink shared channel; and send, at a subframe h+2 in the serving cell, a physical uplink shared channel corresponding to the HARQ-ACK, where h is an integer.

According to a sixth aspect, a base station is provided, including a memory, a processor, and a transceiver, where the memory and the transceiver are separately connected to the processor;

the memory is configured to store an instruction;

the processor is configured to execute the instruction to determine a frame structure of a serving cell; where a radio frame based on the frame structure includes at least one downlink subframe and at least one uplink subframe, and further includes at least one first subframe and/or at least one second subframe; the first subframe includes a first symbol used for downlink transmission, a first GP, and a second symbol used for uplink transmission, and the second subframe includes a third symbol used for downlink transmission, a second GP, and a fourth symbol used for uplink transmission; in the first subframe, a quantity of first symbols used for downlink transmission is greater than a quantity of second symbols used for uplink transmission, and in the second subframe, a quantity of third symbols used for downlink transmission is less than a quantity of fourth symbols used for uplink transmission; the uplink transmission includes HARQ-ACK transmission, and the downlink transmission includes physical downlink control channel transmission; and the transceiver is configured to send and receive information in the serving cell to and from user equipment based on the frame structure.

With reference to the sixth aspect, in a first possible implementation of the sixth aspect, the radio frame includes 10 subframes, where a subframe 0, a subframe 4, a subframe 5, a subframe 8, and a subframe 9 are the downlink subframes, a subframe 2 and a subframe 7 are the uplink subframes, a subframe 1 and a subframe 6 are special subframes, and a subframe 3 is the first subframe; or the radio frame includes 10 subframes, where a subframe 0, a subframe 4, a subframe 5, and a subframe 9 are the downlink subframes, a subframe 2 and a subframe 7 are the uplink subframes, a subframe 1 and a subframe 6 are special subframes, and a subframe 3 and a subframe 8 are the first subframes; or the radio frame includes 10 subframes, where a subframe 0, a subframe 5, and a subframe 9 are the downlink subframes, a subframe 2 and a subframe 7 are the uplink subframes, a subframe 1 and a subframe 6 are special subframes, and a subframe 3, a subframe 4, and a subframe 8 are the first subframes; or the radio frame includes 10 subframes, where a subframe 0 and a subframe 5 are the downlink subframes, a subframe 2 and a subframe 7 are the uplink subframes, a subframe 1 and a subframe 6 are special subframes, and a subframe 3, a subframe 4, a subframe 8, and a subframe 9 are the first subframes; or the radio frame includes 10 subframes, where a subframe 5 is the downlink subframe, a subframe 2 and a subframe 7 are the uplink subframes, a subframe 1 and a subframe 6 are special subframes, and a subframe 0, a subframe 3, a subframe 4, a subframe 8, and a subframe 9 are the first subframes.

With reference to the sixth aspect, in a second possible implementation of the sixth aspect, the radio frame includes 10 subframes, where a subframe 3 and a subframe 5 are the downlink subframes, a subframe 2 and a subframe 9 are the uplink subframes, a subframe 1 and a subframe 6 are special subframes, and a subframe 0, a subframe 4, a subframe 7, and a subframe 8 are the first subframes; or the radio frame includes 10 subframes, where a subframe 5 is the downlink subframe, a subframe 2 is the uplink subframe, a subframe 6 is a special subframe, a subframe 0, a subframe 3, a subframe 4, a subframe 7, a subframe 8, and a subframe 9 are the first subframes, and a subframe 1 is the second subframe.

With reference to the sixth aspect, in a third possible implementation of the sixth aspect, the radio frame includes 10 subframes, where a subframe 5 is the downlink subframe, a subframe 2 and a subframe 9 are the uplink subframes, a subframe 1 and a subframe 6 are special subframes, and a subframe 0, a subframe 3, a subframe 4, a subframe 7, and a subframe 8 are the first subframes; or the radio frame includes 10 subframes, where a subframe 5 is the downlink subframe, a subframe 2 is the uplink subframe, a subframe 6 is a special subframe, a subframe 0, a subframe 3, a subframe 4, a subframe 7, a subframe 8, and a subframe 9 are the first subframes, and a subframe 1 is the second subframe.

With reference to the sixth aspect, in a fourth possible implementation of the sixth aspect, the radio frame includes 10 subframes, where a subframe 0, a subframe 4, a subframe 5, a subframe 8, and a subframe 9 are the downlink subframes, a subframe 2 and a subframe 7 are the uplink subframes, a subframe 1 and a subframe 6 are special subframes, and a subframe 3 is the first subframe; or the radio frame includes 10 subframes, where a subframe 0, a subframe 4, a subframe 5, and a subframe 9 are the downlink subframes, a subframe 2 and a subframe 7 are the uplink subframes, a subframe 1 and a subframe 6 are special subframes, and a subframe 3 and a subframe 8 are the first subframes; or the radio frame includes 10 subframes, where a subframe 4, a subframe 5, and a subframe 9 are the downlink subframes, a subframe 2 and a subframe 7 are the uplink subframes, a subframe 1 and a subframe 6 are special subframes, and a subframe 0, a subframe 3, and a subframe 8 are the first subframes.

With reference to the sixth aspect, in a fifth possible implementation of the sixth aspect, the radio frame includes 10 subframes, where a subframe 4, a subframe 5, and a subframe 8 are the downlink subframes, a subframe 2 and a subframe 3 are the uplink subframes, a subframe 1 and a subframe 6 are special subframes, and a subframe 0, a subframe 7, and a subframe 9 are the first subframes; or the radio frame includes 10 subframes, where a subframe 4 and a subframe 5 are the downlink subframes, a subframe 2 and a subframe 3 are the uplink subframes, a subframe 1 and a subframe 6 are special subframes, and a subframe 0, a subframe 7, a subframe 8, and a subframe 9 are the first subframes.

With reference to the sixth aspect, in a sixth possible implementation of the sixth aspect, the radio frame includes 10 subframes, where a subframe 0, a subframe 3, a subframe 5, a subframe 8, and a subframe 9 are the downlink subframes, a subframe 2 and a subframe 7 are the uplink subframes, a subframe 1 and a subframe 6 are special subframes, and a subframe 4 is the first subframe; or the radio frame includes 10 subframes, where a subframe 0, a subframe 3, a subframe 5, and a subframe 8 are the downlink subframes, a subframe 2 and a subframe 7 are the uplink subframes, a subframe 1 and a subframe 6 are special subframes, and a subframe 4 and a subframe 9 are the first subframes; or the radio frame includes 10 subframes, where a subframe 3, a subframe 5, and a subframe 8 are the downlink subframes, a subframe 2 and a subframe 7 are the uplink subframes, a subframe 1 and a subframe 6 are special subframes, and a subframe 0, a subframe 4, and a subframe 9 are the first subframes.

With reference to the sixth aspect, in a seventh possible implementation of the sixth aspect, the radio frame includes 10 subframes, where a subframe 3, a subframe 5, and a subframe 8 are the downlink subframes, a subframe 2 is the uplink subframe, a subframe 1 and a subframe 6 are special subframes, a subframe 0, a subframe 7, and a subframe 9 are the first subframes, and a subframe 4 is the second subframe; or the radio frame includes 10 subframes, where a subframe 3 and a subframe 5 are the downlink subframes, a subframe 2 is the uplink subframe, a subframe 1 and a subframe 6 are special subframes, a subframe 0, a subframe 4, a subframe 7, a subframe 8, and a subframe 9 are the first subframes, and a subframe 4 is the second subframe.

With reference to the first possible implementation or the second possible implementation of the sixth aspect, in an eighth possible implementation of the sixth aspect, the transceiver is specifically configured to:

send, to the user equipment at a subframe n in the serving cell, a transmitted physical downlink shared channel, or a downlink control channel indicating downlink semi-persistent scheduling release, where n is an integer; and receive, at a subframe n+k, a HARQ-ACK response that is fed back by the user equipment and is corresponding to the transmitted physical downlink shared channel or the downlink control channel of the serving cell at the subframe n, where k is an integer; where when the subframe n is the first subframe or a subframe n+4 is the first subframe, k is 4.

With reference to the first possible implementation or the third possible implementation of the sixth aspect, in a ninth possible implementation of the sixth aspect, the transceiver is specifically configured to:

send, to the user equipment at a subframe n in the serving cell, a transmitted physical downlink shared channel, or a downlink control channel indicating downlink semi-persistent scheduling release, where n is an integer; and receive, at a subframe n+k, a HARQ-ACK response that is fed back by the user equipment and is corresponding to the transmitted physical downlink shared channel or the downlink control channel of the serving cell at the subframe n, where k is an integer; where when the subframe n is the first subframe, k is 0.

With reference to the fourth possible implementation or the fifth possible implementation of the sixth aspect, in a tenth possible implementation of the sixth aspect, the transceiver is specifically configured to:

send, to the user equipment at a subframe n in the serving cell, a transmitted physical downlink shared channel, or a downlink control channel indicating downlink semi-persistent scheduling release, where n is an integer; and receive, at a subframe n+k, a HARQ-ACK response that is fed back by the user equipment and is corresponding to the transmitted physical downlink shared channel or the downlink control channel of the serving cell at the subframe n, where k is an integer; where when a subframe n+2 is the first subframe, k is 2; when the subframe n is the first subframe and a subframe n+2 is not the downlink subframe, k is 2; or when the subframe n is the first subframe and a subframe n+2 is the downlink subframe, k is 3.

With reference to the sixth possible implementation or the seventh possible implementation of the sixth aspect, in an eleventh possible implementation of the sixth aspect, the transceiver is specifically configured to:

send, to the user equipment at a subframe n in the serving cell, a transmitted physical downlink shared channel, or a downlink control channel indicating downlink semi-persistent scheduling release, where n is an integer; and receive, at a subframe n+k, a HARQ-ACK response that is fed back by the user equipment and is corresponding to the transmitted physical downlink shared channel or the downlink control channel of the serving cell at the subframe n, where k is an integer; where when a subframe n+1 is the first subframe, k is 1; when the subframe n is the first subframe and a subframe n+1 is not the downlink subframe, k is 1; or when the subframe n is the first subframe and a subframe n+1 is the downlink subframe, k is 2.

With reference to any one of the first possible implementation to the seventh possible implementation of the sixth aspect, in a twelfth possible implementation of the sixth aspect, the transceiver is specifically configured to:

send, to the user equipment at a subframe i, a downlink control channel that schedules a physical uplink shared channel; and receive, at a subframe i+4 in the serving cell, the physical uplink shared channel scheduled by the downlink control channel, where i is an integer.

With reference to any one of the first possible implementation to the seventh possible implementation of the sixth aspect, in a thirteenth possible implementation of the sixth aspect, the transceiver is specifically configured to:

receive, at a subframe j in the serving cell, a physical uplink shared channel sent by the user equipment; and send, at a subframe j+6, a HARQ-ACK corresponding to the physical uplink shared channel, where j is an integer.

With reference to any one of the first possible implementation to the seventh possible implementation of the sixth aspect, in a fourteenth possible implementation of the sixth aspect, the transceiver is specifically configured to:

send, at a subframe h, a HARQ-ACK corresponding to a physical uplink shared channel sent by the user equipment; and receive, at a subframe h+4 in the serving cell, the retransmitted physical uplink shared channel, where h is an integer.

With reference to the first possible implementation, the fourth possible implementation, the sixth possible implementation, or any one of the eighth possible implementation to the eleventh possible implementation of the sixth aspect, in a fifteenth possible implementation of the sixth aspect, the transceiver is specifically configured to:

send, to the user equipment at a subframe i, a downlink control channel that schedules a physical uplink shared channel; and receive, at a subframe i+2 in the serving cell, the physical uplink shared channel scheduled by the downlink control channel, where i is an integer.

With reference to the first possible implementation, the fourth possible implementation, the sixth possible implementation, or any one of the eighth possible implementation to the eleventh possible implementation of the sixth aspect, in a sixteenth possible implementation of the sixth aspect, the transceiver is specifically configured to:

receive, at a subframe j in the serving cell, a physical uplink shared channel sent by the user equipment; and send, at a subframe j+3, a HARQ-ACK corresponding to the physical uplink shared channel, where j is an integer.

With reference to the first possible implementation, the fourth possible implementation, the sixth possible implementation, or any one of the eighth possible implementation to the eleventh possible implementation of the sixth aspect, in a seventeenth possible implementation of the sixth aspect, the transceiver is specifically configured to:

send, at a subframe h, a HARQ-ACK corresponding to a physical uplink shared channel sent by the user equipment; and receive, at a subframe h+2 in the serving cell, the retransmitted physical uplink shared channel, where h is an integer.

In various aspects provided in the present invention, that user equipment determines a frame structure of a serving cell may be: learning the frame structure of the serving cell from locally stored information; or may be: obtaining the frame structure of the serving cell by means of parsing; or may be: learning the frame structure of the serving cell according to an instruction; or may be: learning the frame structure of the serving cell according to a specification in a protocol or a standard; or the like. The present invention imposes no limitation on a manner in which the user equipment determines the frame structure of the serving cell.

Likewise, that a base station determines a frame structure of a serving cell may be: learning the frame structure of the serving cell from locally stored information; or may be: obtaining the frame structure of the serving cell by means of parsing; or may be: learning the frame structure of the serving cell according to an instruction; or may be: learning the frame structure of the serving cell according to a specification in a protocol or a standard, or the like. The present invention imposes no limitation on a manner in which the base station determines the frame structure of the serving cell.

In the various aspects provided in the present invention, a radio frame corresponding to the frame structure may be described as a radio frame indicated by the frame structure, or may be described as a radio frame having the frame structure.

In the various aspects provided in the present invention, that the user equipment sends and receives the information in the serving cell based on the determined frame structure may be described as follows: the user equipment sends and receives the information in the serving cell based on a radio frame corresponding to the frame structure; or may be described as follows: the user equipment sends and receives the information in the serving cell by using the radio frame.

Likewise, that the base station sends and receives the information in the serving cell to and from the user equipment based on the determined frame structure may be described as follows: the base station sends and receives the information in the serving cell to and from the user equipment based on a radio frame corresponding to the frame structure; or may be described as follows: the base station sends and receives the information in the serving cell to and from the user equipment by using the radio frame.

In the embodiments of the present invention, user equipment may determine a frame structure of a serving cell, where in addition to an uplink subframe and a downlink subframe, the frame structure in the embodiments of the present invention further includes a first subframe, and the first subframe includes a first symbol used for downlink transmission, a first GP, and a second symbol used for uplink transmission. More symbols used for uplink transmission than those in a frame structure in the prior art are introduced by introducing the first subframe, and the symbols used for uplink transmission may be used for a HARQ-ACK feedback, thereby improving downlink transmission and effectively reducing a value of k, that is, reducing a service delay.

In addition, the first subframe introduced in the embodiments of the present invention may be used to transmit a HARQ-ACK, and the first subframe replaces some existing subframes in Table 1, and it is possible that the some existing subframes cannot be used to transmit the HARQ-ACK. Therefore, after the technical solutions in the embodiments of the present invention are used, more subframes can be used to transmit the HARQ-ACK, so as to minimize a quantity of HARQ-ACKs that need to be fed back at one uplink subframe, thereby simplifying a HARQ-ACK feedback mechanism and improving HARQ-ACK feedback performance.

BRIEF DESCRIPTION OF DRAWINGS

FIG. 1 is a schematic structural diagram of a first subframe and a second subframe according to an embodiment of the present invention;

FIG. 2 is a main flowchart of a first method for sending and receiving information according to an embodiment of the present invention;

DESCRIPTION OF EMBODIMENTS

Figure 3:
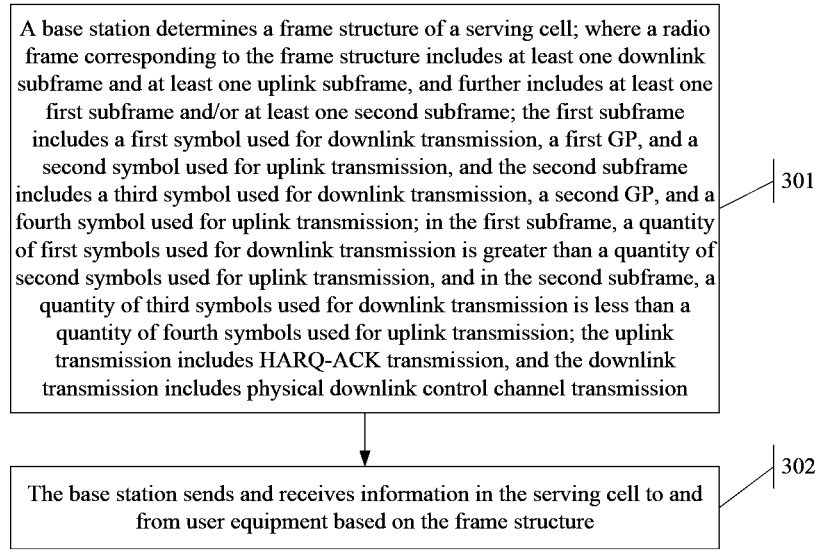
FIG. 3 is a main flowchart of a second method for sending and receiving information according to an embodiment of the present invention.

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

This specification describes various aspects with reference to user equipment and/or a base station.

The user equipment may be a wireless terminal or a wired terminal. The wireless terminal may be a device that provides a user with voice and/or data connectivity, a handheld device with a wireless connection function, or another processing device connected to a wireless modem. The wireless terminal may communicate with one or more core networks through a radio access network (such as a RAN (Radio Access Network)). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges voice and/or data with the radio access network. For example, it may be a device such as a PCS (personal communication service) phone, a cordless telephone set, a SIP (Session Initiation Protocol) phone, a WLL (wireless local loop) station, or a PDA (personal digital assistant). The wireless terminal may also be referred to as a system, a subscriber unit (Subscriber Unit), a subscriber station (Subscriber Station), a mobile station (Mobile Station), a mobile station (Mobile), a remote station (Remote Station), an AP (access point), a remote terminal (Remote Terminal), an access terminal (Access Terminal), a user terminal (User Terminal), a user agent (User Agent), or a user device (User Device).

The base station (for example, an access point) may be a device that communicates with a wireless terminal by using one or more sectors on an air interface in an access network. The base station may be configured to mutually convert a received over-the-air frame and an IP (Internet Protocol) packet and serve as a router between the wireless terminal and a remaining part of the access network. The remaining part of the access network may include an IP network. The base station may further coordinate attribute management of the air interface. For example, the base station may be an evolved NodeB (NodeB, eNB, or e-NodeB) in LTE, which is not limited in this application.

A length of each subframe in a frame structure of a serving cell is not limited in all embodiments of the present invention, and is preferably 1 ms.

The present invention provides two concepts: "first subframe" and "second subframe", and all the embodiments of the present invention impose no limitation on specific structures of the first subframe and the second subframe. The first subframe includes a first symbol used for downlink transmission, a first GP (guard period), and a second symbol used for uplink transmission, and the second subframe includes a third symbol used for downlink transmission, a second GP, and a fourth symbol used for uplink transmission. In the first subframe, a quantity of first symbols used for downlink transmission is greater than a quantity of second symbols used for uplink transmission, and in the second subframe, a quantity of third symbols used for downlink transmission is less than a quantity of fourth symbols used for uplink transmission. In addition, a symbol used for downlink transmission may be an OFDM (orthogonal frequency division multiplexing) symbol, and a symbol used for uplink transmission may be an SC-FDMA (single carrier frequency division multiple access) symbol. In the first subframe, the symbol used for uplink transmission may be used to transmit only a PUCCH and/or an SRS (sounding reference signal). In the second subframe, the symbol used for downlink transmission may be used to transmit only a PDCCH (physical downlink control channel) and/or a downlink reference signal.

For example, referring to FIG. 1, FIG. 1 separately provides possible structures of the first subframe and the second subframe when a subframe length is 1 ms.

In the subframe structures shown in FIG. 1, the first subframe includes 12 first symbols used for downlink transmission, a first GP of a length of one symbol, and one second symbol used for uplink transmission; the second subframe includes one third symbol used for downlink transmission, a second GP of a length of one symbol, and 12 fourth symbols used for uplink transmission.

In all the embodiments of the present invention, a serving cell (serving cell) corresponding to the user equipment may be a serving cell configured by a network side device for the user equipment, may be a serving cell serving the user equipment, or may be a serving cell accessed by the user equipment.

The serving cell in all the embodiments of the present invention may be referred to as a carrier (component carrier). In the embodiments of the present invention, a serving cell of the user equipment may be a primary serving cell (Primary serving cell) or a secondary serving cell (secondary serving cell) of the user equipment.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "I" in this specification generally indicates an "or" relationship between the associated objects.

The following further describes the embodiments of the present invention in detail with reference to this specification.

Referring to FIG. 2, an embodiment of the present invention provides a method for sending and receiving information, and a main procedure of the method is described as follows.

Step 201: User equipment determines a frame structure of a serving cell; where a radio frame corresponding to the frame structure includes at least one downlink subframe and at least one uplink subframe, and further includes at least one first subframe and/or at least one second subframe; the first subframe includes a first symbol used for downlink transmission, a first GP, and a second symbol used for uplink transmission, and the second subframe includes a third symbol used for downlink transmission, a second GP, and a fourth symbol used for uplink transmission; in the first subframe, a quantity of first symbols used for downlink transmission is greater than a quantity of second symbols used for uplink transmission, and in the second subframe, a quantity of third symbols used for downlink transmission is less than a quantity of fourth symbols used for uplink transmission; the uplink transmission includes HARQ-ACK transmission, and the downlink transmission includes physical downlink control channel transmission.

That is, in this embodiment of the present invention, a radio frame may include at least one downlink subframe, at least one uplink subframe, and at least one first subframe, or a radio frame may include at least one downlink subframe, at least one uplink subframe, and at least one second subframe, or a radio frame may include at least one downlink subframe, at least one uplink subframe, at least one first subframe, and at least one second subframe.

Optionally, in this embodiment of the present invention, in addition to at least one downlink subframe, at least one uplink subframe, and at least one first subframe and/or at least one second subframe, a radio frame based on the frame structure may include at least one special subframe.

It should be noted that in all embodiments of the present invention, assuming that an uplink-downlink ratio of the serving cell is X:Y, it may indicate that in the frame structure of the serving cell, a ratio of a quantity of subframes used for uplink transmission to a quantity of subframes used for downlink transmission is X:Y. The subframe used for uplink transmission includes the uplink subframe and the second subframe provided in this embodiment of the present invention, and the subframe used for downlink transmission includes the downlink subframe, the special subframe, and the first subframe provided in this embodiment of the present invention. Assuming that the uplink-downlink ratio of the serving cell is X:Y, it may also indicate that in a radio frame corresponding to the frame structure of the serving cell, a quantity of subframes used for uplink transmission is X, and a quantity of subframes used for downlink transmission is Y.

A frame structure corresponding to an uplink-downlink configuration 2 in Table 1 is used as an example. In the frame structure corresponding to the uplink-downlink configuration 2, subframes used for uplink transmission are a subframe 2 and a subframe 7, and subframes used for downlink transmission are a subframe 0, a subframe 1, a subframe 3, a subframe 4, a subframe 5, a subframe 6, a subframe 8, and a subframe 9. In this case, an uplink-downlink ratio is 2:8.

In this embodiment of the present invention, multiple different frame structures are provided, and the frame structure determined by the user equipment may be one of the multiple different frame structures. In addition, the frame structure varies according to an uplink-downlink ratio of the serving cell. The following separately describes the multiple frame structures provided in this embodiment of the present invention.

When the uplink-downlink ratio of the serving cell is 2:8, the following describes 19 frame structures.

Frame Structure 1:

The radio frame includes 10 subframes, where a subframe 0, a subframe 4, a subframe 5, a subframe 8, and a subframe 9 are the downlink subframes, a subframe 2 and a subframe 7 are the uplink subframes, a subframe 1 and a subframe 6 are the special subframes, and a subframe 3 is the first subframe.

In this frame structure, seven subframes including the subframe 0, the subframe 1, the subframe 4, the subframe 5, the subframe 6, the subframe 8, and the subframe 9 may be used to support downlink transmission of legacy (legacy) user equipment (for example, user equipment that supports only LTE Release 12 and an earlier release), and the subframe 2 and the subframe 7 may be used to support uplink transmission of the legacy user equipment. Therefore, the frame structure is backward-compatible.

Frame Structure 2:

The radio frame includes 10 subframes, where a subframe 0, a subframe 4, a subframe 5, and a subframe 9 are the downlink subframes, a subframe 2 and a subframe 7 are the uplink subframes, a subframe 1 and a subframe 6 are the special subframes, and a subframe 3 and a subframe 8 are the first subframes.

In this frame structure, six subframes including the subframe 0, the subframe 1, the subframe 4, the subframe 5, the subframe 6, and the subframe 9 may be used to support downlink transmission of legacy (legacy) user equipment (for example, user equipment that supports only LTE Release 12 and an earlier release), and the subframe 2 and the subframe 7 may be used to support uplink transmission of the legacy user equipment. Therefore, the frame structure is backward-compatible.

Frame Structure 3:

The radio frame includes 10 subframes, where a subframe 0, a subframe 5, and a subframe 9 are the downlink subframes, a subframe 2 and a subframe 7 are the uplink subframes, a subframe 1 and a subframe 6 are the special subframes, and a subframe 3, a subframe 4, and a subframe 8 are the first subframes.

In this frame structure, five subframes including the subframe 0, the subframe 1, the subframe 5, the subframe 6, and the subframe 9 may be used to support downlink transmission of legacy (legacy) user equipment (for example, user equipment that supports only LTE Release 12 and an earlier release), and the subframe 2 and the subframe 7 may be used to support uplink transmission of the legacy user equipment. Therefore, the frame structure is backward-compatible.

Frame Structure 4:

The radio frame includes 10 subframes, where a subframe 0 and a subframe 5 are the downlink subframes, a subframe 2 and a subframe 7 are the uplink subframes, a subframe 1 and a subframe 6 are the special subframes, and a subframe 3, a subframe 4, a subframe 8, and a subframe 9 are the first subframes.

In this frame structure, four subframes including the subframe 0, the subframe 1, the subframe 5, and the subframe 6 may be used to support downlink transmission of legacy (legacy) user equipment (for example, user equipment that supports only LTE Release 12 and an earlier release), and the subframe 2 and the subframe 7 may be used to support uplink transmission of the legacy user equipment. Therefore, the frame structure is backward-compatible.

Frame Structure 5:

The radio frame includes 10 subframes, where a subframe 5 is the downlink subframe, a subframe 2 and a subframe 7 are the uplink subframes, a subframe 1 and a subframe 6 are the special subframes, and a subframe 0, a subframe 3, a subframe 4, a subframe 8, and a subframe 9 are the first subframes.

In this frame structure, three subframes including the subframe 1, the subframe 5, and the subframe 6 may be used to support downlink transmission of legacy (legacy) user equipment (for example, user equipment that supports only LTE Release 12 and an earlier release), and the subframe 2 and the subframe 7 may be used to support uplink transmission of the legacy user equipment. Therefore, the frame structure is backward-compatible.

Frame Structure 6:

The radio frame includes 10 subframes, where a subframe 3 and a subframe 5 are the downlink subframes, a subframe 2 and a subframe 9 are the uplink subframes, a subframe 1 and a subframe 6 are the special subframes, and a subframe 0, a subframe 4, a subframe 7, and a subframe 8 are the first subframes.

In this frame structure, two subframes including the subframe 5 and the subframe 6 may be used to support downlink transmission of legacy (legacy) user equipment (for example, user equipment that supports only LTE Release 12 and an earlier release), and the subframe 2 may be used to support uplink transmission of the legacy user equipment. Therefore, the frame structure is backward-compatible.

Frame Structure 7:

The radio frame includes 10 subframes, where a subframe 5 is the downlink subframe, a subframe 2 is the uplink subframe, a subframe 6 is the special subframe, a subframe 0, a subframe 3, a subframe 4, a subframe 7, a subframe 8, and a subframe 9 are the first subframes, and a subframe 1 is the second subframe.

In this frame structure, two subframes including the subframe 5 and the subframe 6 may be used to support downlink transmission of legacy (legacy) user equipment (for example, user equipment that supports only LTE Release 12 and an earlier release), and the subframe 2 may be used to support uplink transmission of the legacy user equipment. Therefore, the frame structure is backward-compatible.

Frame Structure 8:

The radio frame includes 10 subframes, where a subframe 5 is the downlink subframe, a subframe 2 and a subframe 9 are the uplink subframes, a subframe 1 and a subframe 6 are the special subframes, and a subframe 0, a subframe 3, a subframe 4, a subframe 7, and a subframe 8 are the first subframes.

In this frame structure, two subframes including the subframe 5 and the subframe 6 may be used to support downlink transmission of legacy (legacy) user equipment (for example, user equipment that supports only LTE Release 12 and an earlier release), and the subframe 2 may be used to support uplink transmission of the legacy user equipment. Therefore, the frame structure is backward-compatible.

Frame Structure 9:

The radio frame includes 10 subframes, where a subframe 5 is the downlink subframe, a subframe 2 is the uplink subframe, a subframe 6 is the special subframe, a subframe 0, a subframe 3, a subframe 4, a subframe 7, a subframe 8, and a subframe 9 are the first subframes, and a subframe 1 is the second subframe.

In this frame structure, two subframes including the subframe 5 and the subframe 6 may be used to support downlink transmission of legacy (legacy) user equipment (for example, user equipment that supports only LTE Release 12 and an earlier release), and the subframe 2 may be used to support uplink transmission of the legacy user equipment. Therefore, the frame structure is backward-compatible.

Frame Structure 10:

The radio frame includes 10 subframes, where a subframe 0, a subframe 4, a subframe 5, a subframe 8, and a subframe 9 are the downlink subframes, a subframe 2 and a subframe 7 are the uplink subframes, a subframe 1 and a subframe 6 are the special subframes, and a subframe 3 is the first subframe.

In this frame structure, seven subframes including the subframe 0, the subframe 1, the subframe 4, the subframe 5, the subframe 6, the subframe 8, and the subframe 9 may be used to support downlink transmission of legacy (legacy) user equipment (for example, user equipment that supports only LTE Release 12 and an earlier release), and the subframe 2 and the subframe 7 may be used to support uplink transmission of the legacy user equipment. Therefore, the frame structure is backward-compatible.

Frame Structure 11:

The radio frame includes 10 subframes, where a subframe 0, a subframe 4, a subframe 5, and a subframe 9 are the downlink subframes, a subframe 2 and a subframe 7 are the uplink subframes, a subframe 1 and a subframe 6 are the special subframes, and a subframe 3 and a subframe 8 are the first subframes.

In this frame structure, six subframes including the subframe 0, the subframe 1, the subframe 4, the subframe 5, the subframe 6, and the subframe 9 may be used to support downlink transmission of legacy (legacy) user equipment (for example, user equipment that supports only LTE Release 12 and an earlier release), and the subframe 2 and the subframe 7 may be used to support uplink transmission of the legacy user equipment. Therefore, the frame structure is backward-compatible.

Frame Structure 12:

The radio frame includes 10 subframes, where a subframe 4, a subframe 5, and a subframe 9 are the downlink subframes, a subframe 2 and a subframe 7 are the uplink subframes, a subframe 1 and a subframe 6 are the special subframes, and a subframe 0, a subframe 3, and a subframe 8 are the first subframes.

In this frame structure, five subframes including the subframe 1, the subframe 4, the subframe 5, the subframe 6, and the subframe 9 may be used to support downlink transmission of legacy (legacy) user equipment (for example, user equipment that supports only LTE Release 12 and an earlier release), and the subframe 2 and the subframe 7 may be used to support uplink transmission of the legacy user equipment. Therefore, the frame structure is backward-compatible.

Frame Structure 13:

The radio frame includes 10 subframes, where a subframe 4, a subframe 5, and a subframe 8 are the downlink subframes, a subframe 2 and a subframe 3 are the uplink subframes, a subframe 1 and a subframe 6 are the special subframes, and a subframe 0, a subframe 7, and a subframe 9 are the first subframes.

In this frame structure, four subframes including the subframe 4, the subframe 5, the subframe 6, and the subframe 8 may be used to support downlink transmission of legacy (legacy) user equipment (for example, user equipment that supports only LTE Release 12 and an earlier release), and the subframe 2 may be used to support uplink transmission of the legacy user equipment. Therefore, the frame structure is backward-compatible.

Frame Structure 14:

The radio frame includes 10 subframes, where a subframe 4 and a subframe 5 are the downlink subframes, a subframe 2 and a subframe 3 are the uplink subframes, a subframe 1 and a subframe 6 are the special subframes, and a subframe 0, a subframe 7, a subframe 8, and a subframe 9 are the first subframes.

In this frame structure, three subframes including the subframe 4, the subframe 5, and the subframe 6 may be used to support downlink transmission of legacy (legacy) user equipment (for example, user equipment that supports only LTE Release 12 and an earlier release), and the subframe 2 may be used to support uplink transmission of the legacy user equipment. Therefore, the frame structure is backward-compatible.

Frame Structure 15:

The radio frame includes 10 subframes, where a subframe 0, a subframe 3, a subframe 5, a subframe 8, and a subframe 9 are the downlink subframes, a subframe 2 and a subframe 7 are the uplink subframes, a subframe 1 and a subframe 6 are the special subframes, and a subframe 4 is the first subframe.

In this frame structure, seven subframes including the subframe 0, the subframe 1, the subframe 3, the subframe 5, the subframe 6, the subframe 8, and the subframe 9 may be used to support downlink transmission of legacy (legacy) user equipment (for example, user equipment that supports only LTE Release 12 and an earlier release), and the subframe 2 and the subframe 7 may be used to support uplink transmission of the legacy user equipment. Therefore, the frame structure is backward-compatible.

Frame Structure 16:

The radio frame includes 10 subframes, where a subframe 0, a subframe 3, a subframe 5, and a subframe 8 are the downlink subframes, a subframe 2 and a subframe 7 are the uplink subframes, a subframe 1 and a subframe 6 are the special subframes, and a subframe 4 and a subframe 9 are the first subframes.

In this frame structure, six subframes including the subframe 0, the subframe 1, the subframe 3, the subframe 5, the subframe 6, and the subframe 8 may be used to support downlink transmission of legacy (legacy) user equipment (for example, user equipment that supports only LTE Release 12 and an earlier release), and the subframe 2 and the subframe 7 may be used to support uplink transmission of the legacy user equipment. Therefore, the frame structure is backward-compatible.

Frame Structure 17:

The radio frame includes 10 subframes, where a subframe 3, a subframe 5, and a subframe 8 are the downlink subframes, a subframe 2 and a subframe 7 are the uplink subframes, a subframe 1 and a subframe 6 are the special subframes, and a subframe 0, a subframe 4, and a subframe 9 are the first subframes.

In this frame structure, five subframes including the subframe 1, the subframe 3, the subframe 5, the subframe 6, and the subframe 8 may be used to support downlink transmission of legacy (legacy) user equipment (for example, user equipment that supports only LTE Release 12 and an earlier release), and the subframe 2 and the subframe 7 may be used to support uplink transmission of the legacy user equipment. Therefore, the frame structure is backward-compatible.

Frame Structure 18:

The radio frame includes 10 subframes, where a subframe 3, a subframe 5, and a subframe 8 are the downlink subframes, a subframe 2 is the uplink subframe, a subframe 1 and a subframe 6 are the special subframes, a subframe 0, a subframe 7, and a subframe 9 are the first subframes, and a subframe 4 is the second subframe.

In this frame structure, three subframes including the subframe 5, the subframe 6, and the subframe 8 may be used to support downlink transmission of legacy (legacy) user equipment (for example, user equipment that supports only LTE Release 12 and an earlier release), and the subframe 2 may be used to support uplink transmission of the legacy user equipment. Therefore, the frame structure is backward-compatible.

Frame Structure 19:

The radio frame includes 10 subframes, where a subframe 3 and a subframe 5 are the downlink subframes, a subframe 2 is the uplink subframe, a subframe 1 and a subframe 6 are the special subframes, a subframe 0, a subframe 4, a subframe 7, a subframe 8, and a subframe 9 are the first subframes, and a subframe 4 is the second subframe.

In this frame structure, two subframes including the subframe 5 and the subframe 6 may be used to support downlink transmission of legacy (legacy) user equipment (for example, user equipment that supports only LTE Release 12 and an earlier release), and the subframe 2 may be used to support uplink transmission of the legacy user equipment. Therefore, the frame structure is backward-compatible.

In the foregoing 19 frame structures, different frame structures support backward-compatibility to different extents (that is, support the legacy user equipment, for example, support user equipment that supports only LTE Release 12 and an earlier release), and a corresponding frame structure may be used according to a quantity of legacy user equipments. When the frame structure of the serving cell is one of the foregoing 19 frame structures, indication signaling may be sent to the legacy user equipment, so that the legacy user equipment considers that an uplink-downlink configuration of the serving cell is an uplink-downlink configuration 2.

For example, for legacy user equipment, in the frame structure 1, the frame structure 10, and the frame structure 15, seven subframes can be used for downlink transmission; in the frame structure 2, the frame structure 11, and the frame structure 16, six subframes can be used for downlink transmission; in the frame structure 3, the frame structure 12, and the frame structure 17, five subframes can be used for downlink transmission; in the frame structure 4 and the frame structure 13, four subframes can be used for downlink transmission; in the frame structure 5, the frame structure 14, and the frame structure 18, three subframes can be used for downlink transmission; in the frame structure 6, the frame structure 8, and the frame structure 19, two subframes can be used for downlink transmission; in the frame structure 7 and the frame structure 9, one subframe can be used for downlink transmission.

In the foregoing various frame structures, as more first subframes or second subframes are introduced, delays of more subframes are reduced, thereby better alleviating load of feeding back a HARQ-ACK at each subframe, simplifying a HARQ-ACK feedback mechanism, and improving HARQ-ACK performance.

When the uplink-downlink ratio of the serving cell is 6:4, the following describes four frame structures.

Frame Structure 20:

The radio frame includes 10 subframes, where a subframe 0 and a subframe 5 are the downlink subframes, a subframe 3, a subframe 7, a subframe 8, a subframe 4, and a subframe 9 are the uplink subframes, a subframe 1 and a subframe 6 are the special subframes, and a subframe 2 is the second subframe.

Frame Structure 21:

The radio frame includes 10 subframes, where a subframe 0 and a subframe 5 are the downlink subframes, a subframe 3, a subframe 4, a subframe 8, and a subframe 9 are the uplink subframes, a subframe 1 and a subframe 6 are the special subframes, and a subframe 2 and a subframe 7 are the second subframes.

Frame Structure 22:

The radio frame includes 10 subframes, where a subframe 0 and a subframe 5 are the downlink subframes, a subframe 3, a subframe 8, and a subframe 9 are the uplink subframes, a subframe 1 and a subframe 6 are the special subframes, and a subframe 2, a subframe 4, and a subframe 7 are the second subframes.

Frame Structure 23:

The radio frame includes 10 subframes, where a subframe 0 and a subframe 5 are the downlink subframes, a subframe 3 and a subframe 8 are the uplink subframes, a subframe 1 and a subframe 6 are the special subframes, and a subframe 2, a subframe 4, a subframe 7, and a subframe 9 are the second subframes.

In the foregoing frame structure 20 to frame structure 23, uplink subframes are gradually replaced with second subframes, so that shorter HARQ timing can be used for more uplink transmission, that is, a value of k can be reduced, and an uplink transmission delay is gradually reduced. When the frame structure of the serving cell is one of the foregoing frame structure 20 to frame structure 23, indication signaling may be sent to the legacy user equipment, so that the legacy user equipment considers that an uplink-downlink configuration of the serving cell is an uplink-downlink configuration 0.

When the uplink-downlink ratio of the serving cell is 3:7, the following describes four frame structures.

Frame Structure 24:

The radio frame includes 10 subframes, where a subframe 0, a subframe 5, a subframe 6, a subframe 7, and a subframe 8 are the downlink subframes, a subframe 2, a subframe 3, and a subframe 4 are the uplink subframes, a subframe 1 is the special subframe, and a subframe 9 is the first subframe.

Frame Structure 25:

The radio frame includes 10 subframes, where a subframe 0, a subframe 5, a subframe 6, and a subframe 7 are the downlink subframes, a subframe 2, a subframe 3, and a subframe 4 are the uplink subframes, a subframe 1 is the special subframe, and a subframe 8 and a subframe 9 are the first subframes.

Frame Structure 26:

The radio frame includes 10 subframes, where a subframe 0, a subframe 5, and a subframe 6 are the downlink subframes, a subframe 2, a subframe 3, and a subframe 4 are the uplink subframes, a subframe 1 is the special subframe, and a subframe 7, a subframe 8, and a subframe 9 are the first subframes.

Frame Structure 27:

The radio frame includes 10 subframes, where a subframe 5 and a subframe 6 are the downlink subframes, a subframe 2, a subframe 3, and a subframe 4 are the uplink subframes, a subframe 1 is the special subframe, and a subframe 0, a subframe 7, a subframe 8, and a subframe 9 are the first subframes.

In the foregoing frame structure 24 to frame structure 27, shorter HARQ timing can be gradually used for uplink transmission of some subframes by introducing a first subframe, so that delays of the some subframes are gradually reduced, and a downlink data transmission delay is reduced. In addition, load of feeding back a HARQ-ACK at each subframe is better alleviated, thereby simplifying a HARQ-ACK feedback mechanism, and improving HARQ-ACK performance. When the frame structure of the serving cell is one of the foregoing frame structure 24 to frame structure 27, indication signaling may be sent to the legacy user equipment, so that the legacy user equipment considers that an uplink-downlink configuration of the serving cell is an uplink-downlink configuration 3.

When the uplink-downlink ratio of the serving cell is 2:8 and SIB (system information block) 1 signaling received by the user equipment indicates that the uplink-downlink configuration of the serving cell is an uplink-downlink configuration 4 (for example, the uplink-downlink configuration 4 in Table 1), the following describes five frame structures.

Frame Structure 28:

The radio frame includes 10 subframes, where a subframe 0, a subframe 4, a subframe 5, a subframe 6, a subframe 7, and a subframe 8 are the downlink subframes, a subframe 2 and a subframe 3 are the uplink subframes, a subframe 1 is the special subframe, and a subframe 9 is the first subframe.

Frame Structure 29:

The radio frame includes 10 subframes, where a subframe 0, a subframe 4, a subframe 5, a subframe 6, and a subframe 7 are the downlink subframes, a subframe 2 and a subframe 3 are the uplink subframes, a subframe 1 is the special subframe, and a subframe 8 and a subframe 9 are the first subframes.

Frame Structure 30:

The radio frame includes 10 subframes, where a subframe 0, a subframe 4, a subframe 5, and a subframe 6 are the downlink subframes, a subframe 2 and a subframe 3 are the uplink subframes, a subframe 1 is the special subframe, and a subframe 7, a subframe 8, and a subframe 9 are the first subframes.

Frame Structure 31:

The radio frame includes 10 subframes, where a subframe 0, a subframe 4, and a subframe 5 are the downlink subframes, a subframe 2 and a subframe 3 are the uplink subframes, a subframe 1 is the special subframe, and a subframe 6, a subframe 7, a subframe 8, and a subframe 9 are the first subframes.

Frame Structure 32:

The radio frame includes 10 subframes, where a subframe 4 and a subframe 5 are the downlink subframes, a subframe 2 and a subframe 3 are the uplink subframes, a subframe 1 is the special subframe, and a subframe 0, a subframe 6, a subframe 7, a subframe 8, and a subframe 9 are the first subframes.

In the foregoing frame structure 28 to frame structure 32, shorter HARQ timing can be gradually used for uplink transmission of some subframes by introducing a first subframe, so that delays of the some subframes are gradually improved, and a downlink data transmission delay is reduced. In addition, load of feeding back a HARQ-ACK at each subframe is better alleviated, thereby simplifying a HARQ-ACK feedback mechanism, and improving HARQ-ACK performance. When the frame structure of the serving cell is one of the foregoing frame structure 28 to frame structure 32, indication signaling may be sent to the legacy user equipment, so that the legacy user equipment considers that an uplink-downlink configuration of the serving cell is an uplink-downlink configuration 4.

When the uplink-downlink ratio of the serving cell is 1:9, the following describes six frame structures.

Frame Structure 33:

The radio frame includes 10 subframes, where a subframe 0, a subframe 3, a subframe 4, a subframe 5, a subframe 6, a subframe 7, and a subframe 8 are the downlink subframes, a subframe 2 is the uplink subframe, a subframe 1 is the special subframe, and a subframe 9 is the first subframe.

Frame Structure 34:

The radio frame includes 10 subframes, where a subframe 0, a subframe 4, a subframe 5, a subframe 6, a subframe 7, and a subframe 8 are the downlink subframes, a subframe 2 is the uplink subframe, a subframe 1 is the special subframe, and a subframe 3 and a subframe 9 are the first subframes.

Frame Structure 35:

The radio frame includes 10 subframes, where a subframe 0, a subframe 4, a subframe 5, a subframe 6, and a subframe 8 are the downlink subframes, a subframe 2 is the uplink subframe, a subframe 1 is the special subframe, and a subframe 3, a subframe 7, and a subframe 9 are the first subframes.

Frame Structure 36:

The radio frame includes 10 subframes, where a subframe 0, a subframe 4, a subframe 5, and a subframe 6 are the downlink subframes, a subframe 2 is the uplink subframe, a subframe 1 is the special subframe, and a subframe 3, a subframe 7, a subframe 8, and a subframe 9 are the first subframes.

Frame Structure 37:

The radio frame includes 10 subframes, where a subframe 0, a subframe 4, and a subframe 5 are the downlink subframes, a subframe 2 is the uplink subframe, a subframe 1 is the special subframe, and a subframe 3, a subframe 6, a subframe 7, a subframe 8, and a subframe 9 are the first subframes.

Frame Structure 38:

The radio frame includes 10 subframes, where a subframe 4 and a subframe 5 are the downlink subframes, a subframe 2 is the uplink subframe, a subframe 1 is the special subframe, and a subframe 0, a subframe 3, a subframe 6, a subframe 7, a subframe 8, and a subframe 9 are the first subframes.

In the foregoing frame structure 33 to frame structure 38, shorter HARQ timing can be gradually used for uplink transmission of some subframes by introducing a first subframe, so that delays of the some subframes are gradually improved, and a downlink data transmission delay is reduced. In addition, load of feeding back a HARQ-ACK at each subframe is better alleviated, thereby simplifying a HARQ-ACK feedback mechanism, and improving HARQ-ACK performance. When the frame structure of the serving cell is one of the foregoing frame structure 33 to frame structure 38, indication signaling may be sent to the legacy user equipment, so that the legacy user equipment considers that an uplink-downlink configuration of the serving cell is an uplink-downlink configuration 5.

When the uplink-downlink ratio of the serving cell is 5:5, the following describes two frame structures.

Frame Structure 39:

The radio frame includes 10 subframes, where a subframe 0, and a subframe 5 are the downlink subframes, a subframe 2, a subframe 3, a subframe 7, a subframe 8, and a subframe 9 are the uplink subframes, a subframe 1 and a subframe 6 are the special subframes, and a subframe 4 is the second subframe.

Frame Structure 40:

The radio frame includes 10 subframes, where a subframe 0, a subframe 5, and a subframe 9 are the downlink subframes, a subframe 3, a subframe 7, a subframe 8, and a subframe 9 are the uplink subframes, a subframe 1 and a subframe 6 are the special subframes, and a subframe 4 and a subframe 2 are the second subframes.

In the foregoing frame structure 39 and frame structure 40, uplink subframes are gradually replaced with second subframes, so that shorter HARQ timing can be used for more uplink transmission, and an uplink transmission delay is gradually improved. When the frame structure of the serving cell is one of the foregoing frame structure 39 or frame structure 40, indication signaling may be sent to the legacy user equipment, so that the legacy user equipment considers that an uplink-downlink configuration of the serving cell is an uplink-downlink configuration 6.

Optionally, in this embodiment of the present invention, the determining, by user equipment, a frame structure of a serving cell, for example, may be:

determining, by the user equipment, an uplink-downlink configuration or an uplink-downlink ratio of the serving cell; and determining, by the user equipment, the frame structure of the serving cell according to the determined uplink-downlink configuration or uplink-downlink ratio.

For example, if the user equipment determines that the uplink-downlink ratio of the serving cell is 2:8, the frame structure of the serving cell that is determined by the user equipment may be one of the foregoing frame structure 1 to frame structure 19.

Alternatively, optionally, in this embodiment of the present invention, the determining, by user equipment, a frame structure of a serving cell may further be: determining, by the user equipment, the frame structure of the serving cell according to received higher layer signaling.

For example, the user equipment may store one or more of the foregoing frame structures, and the higher layer signaling may indicate a frame structure index or an uplink-downlink configuration of the serving cell (for example, for the foregoing frame structure 1, an index is 7, and for the foregoing frame structure 20, an index is 26). The user equipment may determine, in the stored frame structures, the frame structure of the serving cell according to the frame structure index or the uplink-downlink configuration. The frame structure of the serving cell that is determined by the user equipment may be one of the foregoing frame structure 1 to frame structure 40.

In this embodiment of the present invention, the higher layer signaling may be, for example, RRC (radio resource control) signaling, or certainly, may be other possible higher layer signaling.

Alternatively, optionally, in this embodiment of the present invention, the determining, by user equipment, a frame structure of a serving cell may further be:

determining, by the user equipment, an uplink-downlink configuration of the serving cell according to received SIB1 signaling; determining, based on the uplink-downlink configuration and Table 1, a frame structure corresponding to the uplink-downlink configuration; and determining, according to higher layer signaling, types of some subframes in the frame structure corresponding to the uplink-downlink configuration.

For example, the higher layer signaling may indicate the frame structure of the serving cell in a bitmap (bitmap) form. For example, the higher layer signaling includes 20 bits, and every 5 bits respectively indicate types of several particular subframes in a radio frame. Specifically, the higher layer signaling may carry a description to indicate types of subframes that are indicated by bits, or the user equipment needs to learn in advance types of subframes that are indicated by bits. For example, in 20 bits included in the higher layer signaling, every 5 bits are respectively used to indicate types of a subframe 0, a subframe 3, a subframe 4, a subframe 8, and a subframe 9 according to a sequence. For example, "0" is used to indicate that a type of a subframe is a downlink subframe, and "1" is used to indicate that a type of a subframe is a first subframe. Certainly, another indication manner may exist.

For example, the user equipment determines, according to the received SIB1 signaling, that the uplink-downlink configuration of the serving cell is an uplink-downlink configuration 0, that is, an uplink-downlink configuration 0 in Table 1; and determines, based on the uplink-downlink configuration and Table 1, the frame structure corresponding to the uplink-downlink configuration, that is, a frame structure corresponding to the uplink-downlink configuration 0. Then it is determined, according to the higher layer signaling, that in the frame structure corresponding to the uplink-downlink configuration, a type of a subframe 0 is the downlink subframe, a type of a subframe 3 is the uplink subframe, a type of a subframe 4 is the second subframe, a type of a subframe 8 is the uplink subframe, and a type of a subframe 9 is the second subframe. Therefore, the user equipment may determine that the frame structure corresponding to the serving cell is the foregoing frame structure 23.

Alternatively, optionally, in this embodiment of the present invention, the determining, by user equipment, a frame structure of a serving cell in this step may further be: determining, by the user equipment, the frame structure of the serving cell according to the received SIB1 signaling and MBSFN (Multimedia Broadcast multicast service Single Frequency Network) configuration information. Specifically, the user equipment first determines the uplink-downlink configuration of the serving cell according to the SIB1 signaling; determines, based on the uplink-downlink configuration and Table 1, the frame structure corresponding to the uplink-downlink configuration; then determines an MBSFN subframe according to the MBSFN configuration information; and replaces an MBSFN subframe in the frame structure corresponding to the uplink-downlink configuration with the first subframe, to obtain the frame structure of the serving cell.

The foregoing lists several possible manners in which the user equipment determines the frame structure of the serving cell. The foregoing manners are merely used as examples but are not intend to limit the present invention.

In this embodiment of the present invention, if the user equipment is the legacy user equipment, the user equipment may determine the frame structure of the serving cell according to the uplink-downlink configuration of the serving cell that is indicated by the SIB1 signaling. Specifically, the user equipment may determine the frame structure of the serving cell according to Table 1 and the uplink-downlink configuration of the serving cell that is indicated by the SIB1 signaling. For example, if the SIB1 signaling received by the user equipment indicates that the uplink-downlink configuration of the serving cell is an uplink-downlink configuration 2, that is, an uplink-downlink ratio is 2:8, the user equipment determines that the frame structure of the serving cell is as follows: A radio frame includes 10 subframes, where a subframe 0, a subframe 3, a subframe 4, a subframe 5, a subframe 8, and a subframe 9 are the downlink subframes, a subframe 2 and a subframe 7 are the uplink subframes, and a subframe 1 and a subframe 6 are the special subframes. The special subframe is a special subframe in a frame structure type 2 in LTE Release 8, that is, the user equipment considers that the determined frame structure of the serving cell is a frame structure corresponding to the uplink-downlink configuration 2 in the frame structure type 2 in LTE Release 8. It should be noted that the frame structure of the serving cell is actually the frame structure previously defined in the embodiments of the present invention and is inconsistent with the frame structure corresponding to the uplink-downlink configuration 2 in the frame structure type 2 in LTE Release 8. Herein, only the legacy user equipment is allowed to consider that the frame structure of the serving cell is the frame structure corresponding to the uplink-downlink configuration 2 in the frame structure type 2 in LTE Release 8, so that the method in this embodiment of the present invention can be applied to user equipment of each release.

In this embodiment of the present invention, in an aspect, an uplink-downlink configuration of a serving cell is configured to an existing uplink-downlink configuration, for example, an uplink-downlink configuration 2, for legacy user equipment, so that the user equipment transmits information according to a frame structure in LTE Release 8 and HARQ timing. In another aspect, in a frame structure of a serving cell, subframes of a particular order of magnitude are reserved, according to a quantity of users of legacy user equipments, for UE that supports only LTE Release 12 and an earlier release to transmit information, thereby ensuring desirable support for backward compatibility. In a third aspect, a subframe 0 is changed as much as possible to a first subframe; for example, the first 12 symbols in a first subframe are downlink transmission symbols, so that a physical layer measurement behavior of legacy user equipment at the subframe 0 is not affected. In a fourth aspect, a special subframe is changed as much as possible to a second subframe, and when the special subframe is the second subframe, a special subframe ratio may be indicated as a special subframe configuration 0 or a special subframe ratio 5, so that physical layer measurement of legacy user equipment at a subframe 1 and a subframe 6 is not affected. According to the foregoing several aspects, a new frame structure proposed in this embodiment of the present invention can maintain backward compatibility.

In addition, the first subframe and the second subframe are introduced in this embodiment of the present invention, so that delays of the some subframes are improved, and load of feeding back a HARQ-ACK at each subframe is alleviated, thereby simplifying a HARQ-ACK feedback mechanism, and improving HARQ-ACK performance.

Step 202: The user equipment sends and receives information in the serving cell based on the frame structure.

Optionally, in this embodiment of the present invention, the user equipment may send and receive the information in the serving cell based on the determined frame structure in different manners Examples are described below.

Example 1 (preferably applicable when the frame structure determined in step 201 is one of the foregoing frame structure 1 to frame structure 7):

The sending and receiving, by the user equipment, information in the serving cell based on the frame structure includes:

receiving, by the user equipment at a subframe n in the serving cell, a transmitted physical downlink shared channel, or a downlink control channel indicating downlink semi-persistent scheduling release, where n is an integer; and sending, by the user equipment at a subframe n+k, a HARQ-ACK response that is corresponding to the transmitted physical downlink shared channel or the downlink control channel of the serving cell at the subframe n, where k is an integer; where when the subframe n is the first subframe or a subframe n+4 is the first subframe, k is 4; or when neither the subframe n nor a subframe n+4 is the first subframe, k is determined according to uplink HARQ timing in LTE Release 12 and an earlier release, that is, determined according to a manner in the prior art.

For example, for the foregoing frame structure 4, if the subframe n is a subframe 1 or a subframe 6 in a radio frame, k is determined according to uplink HARQ timing (that is, Table 2) in LTE Release 12 and an earlier release, and it may be determined that a value of k is 6. However, if the subframe n is a subframe 0, a subframe 3, a subframe 4, a subframe 5, a subframe 8, or a subframe 9 in a radio frame, it is determined, according to a manner in this embodiment of the present invention, that k is 4.

It may be learned according to Table 2 that, according to uplink HARQ timing in LTE Release 12 and an earlier release, values of k corresponding to most subframes are greater than 4. By introducing a first subframe in this embodiment of the present invention, values of k corresponding to more subframes are equal to 4, so that a delay is reduced. In addition, because a HARQ-ACK can also be fed back at the first subframe, compared with the prior art, load of feeding back a HARQ-ACK at a subframe is alleviated, thereby improving HARQ-ACK performance. The foregoing frame structure 4 is still used as an example. If values of k are all determined according to uplink HARQ timing in LTE Release 12 and an earlier release, that is, according to a manner in the prior art, values of k are all greater than 4 except that values of k corresponding to a subframe 3 and a subframe 8 are 4. However, after the solutions in this embodiment of the present invention are used, values of k corresponding to a subframe 0, a subframe 4, a subframe 5, and a subframe 9 are also 4, so that delays corresponding to these subframes are reduced. In addition, after the solutions in this embodiment of the present invention are used, HARQ-ACKs of two subframes need to be separately fed back at only an uplink subframe 2 and an uplink subframe 7, and a HARQ-ACK of only one subframe needs to be fed back at each remaining subframe. Compared with a solution in the prior art in which HARQ-ACKs of four subframes need to be separately fed back at an uplink subframe 2 and an uplink subframe 7, HARQ-ACK feedback load is alleviated, a HARQ-ACK feedback mechanism is simplified, and HARQ-ACK performance is improved.

Example 2 (preferably applicable when the frame structure determined in step 201 is one of the foregoing frame structure 1 to frame structure 5, or frame structure 8 or frame structure 9):

The sending and receiving, by the user equipment, information in the serving cell based on the frame structure includes:

receiving, by the user equipment at a subframe n in the serving cell, a transmitted physical downlink shared channel, or a downlink control channel indicating downlink semi-persistent scheduling release, where n is an integer; and sending, by the user equipment at a subframe n+k, a HARQ-ACK response that is corresponding to the transmitted physical downlink shared channel or the downlink control channel of the serving cell at the subframe n, where k is an integer; where when the subframe n is the first subframe, k is 0; or when the subframe n is not the first subframe, k is determined according to uplink HARQ timing in LTE Release 12 and an earlier release, that is, determined according to a manner in the prior art.

For example, for the foregoing frame structure 4, if the subframe n is a subframe 0 or a subframe 5 in a radio frame, k is determined according to uplink HARQ timing (that is, Table 2) in LTE Release 12 and an earlier release, and it may be determined that a value of k is 7; if the subframe n is a subframe 1 or a subframe 6 in a radio frame, k is determined according to uplink HARQ timing (that is, Table 2) in LTE Release 12 and an earlier release, and it may be determined that a value of k is 6; if the subframe n is a subframe 3, a subframe 4, a subframe 8, or a subframe 9 in a radio frame, it is determined, according to a manner in this embodiment of the present invention, that k is 0.

It may be learned according to Table 2 that, according to uplink HARQ timing in LTE Release 12 and an earlier release, values of k corresponding to most subframes are greater than 4. By introducing a first subframe in this embodiment of the present invention, values of k corresponding to more subframes are equal to 0, so that a delay is reduced. In addition, because a HARQ-ACK can also be fed back at the first subframe, compared with existing timing, load of feeding back a HARQ-ACK at a subframe is alleviated, thereby improving HARQ-ACK performance. The foregoing frame structure 4 is still used as an example. If values of k are all determined according to uplink HARQ timing in LTE Release 12 and an earlier release, the values of k are all greater than 4. However, after the solutions in this embodiment of the present invention are used, values of k corresponding to a subframe 3, a subframe 4, a subframe 8, and a subframe 9 are 0, so that delays corresponding to these subframes are improved. In addition, in this embodiment of the present invention, HARQ-ACKs of two subframes need to be separately fed back at only an uplink subframe 2 and an uplink subframe 7, and a HARQ-ACK of only one subframe needs to be fed back at each remaining subframe. Compared with a solution in the prior art in which HARQ-ACKs of four subframes need to be separately fed back at an uplink subframe 2 and an uplink subframe 7, HARQ-ACK feedback load is alleviated, a HARQ-ACK feedback mechanism is simplified, and HARQ-ACK performance is improved.

Example 3 (preferably applicable when the frame structure determined in step 201 is one of the foregoing frame structure 10 to frame structure 14):

The sending and receiving, by the user equipment, information in the serving cell based on the frame structure includes:

receiving, by the user equipment at a subframe n in the serving cell, a transmitted physical downlink shared channel, or a downlink control channel indicating downlink semi-persistent scheduling release, where n is an integer; and sending, by the user equipment at a subframe n+k, a HARQ-ACK response that is corresponding to the transmitted physical downlink shared channel or the downlink control channel of the serving cell at the subframe n, where k is an integer; where when a subframe n+2 is the first subframe, k is 2; when the subframe n is the first subframe and a subframe n+2 is not the downlink subframe, k is 2; when the subframe n is the first subframe and a subframe n+2 is the downlink subframe, k is 3; or when none of the foregoing conditions is met, k is determined according to uplink HARQ timing in LTE Release 12 and an earlier release, that is, determined according to a manner in the prior art.

For example, for the foregoing frame structure 12, if the subframe n is a subframe 4, a subframe 5, or a subframe 9 in a radio frame, a value of k is determined according to uplink HARQ timing (that is, Table 2) in LTE Release 12 and an earlier release, and it may be determined that the value of k is respectively 8, 7, or 8; if the subframe n is a subframe 0, a subframe 1, a subframe 6, or a subframe 8 in a radio frame, it is determined, according to a manner in this embodiment of the present invention, that k is 2; or if the subframe n is a subframe 3 in a radio frame, it is determined, according to a manner in this embodiment of the present invention, that k is 3.

It may be learned according to Table 2 that, according to uplink HARQ timing in LTE Release 12 and an earlier release, values of k corresponding to most subframes are greater than 4. By introducing a first subframe in this embodiment of the present invention, values of k corresponding to more subframes are less than 4, so that a delay is reduced. In addition, because a HARQ-ACK can also be fed back at the first subframe, compared with existing timing, load of feeding back a HARQ-ACK at a subframe is alleviated, thereby improving HARQ-ACK performance.

Example 4 (preferably applicable when the frame structure determined in step 201 is one of the foregoing frame structure 15 to frame structure 19):

The sending and receiving, by the user equipment, information in the serving cell based on the frame structure includes:

receiving, by the user equipment at a subframe n in the serving cell, a transmitted physical downlink shared channel, or a downlink control channel indicating downlink semi-persistent scheduling release, where n is an integer; and sending, by the user equipment at a subframe n+k, a HARQ-ACK response that is corresponding to the transmitted physical downlink shared channel or the downlink control channel of the serving cell at the subframe n, where k is an integer; where when a subframe n+1 is the first subframe, k is 1; when the subframe n is the first subframe and a subframe n+1 is not the downlink subframe, k is 1; when the subframe n is the first subframe and a subframe n+1 is the downlink subframe, k is 2; or when none of the foregoing conditions is met, k is determined according to uplink HARQ timing in LTE Release 12 and an earlier release, that is, determined according to a manner in the prior art.

It may be learned according to Table 2 that, according to uplink HARQ timing in LTE Release 12 and an earlier release, values of k corresponding to most subframes are greater than 4. By introducing a first subframe in this embodiment of the present invention, values of k corresponding to more subframes are less than 4, so that a delay is reduced. In addition, because a HARQ-ACK can also be fed back at the first subframe, compared with existing timing, load of feeding back a HARQ-ACK at a subframe is alleviated, thereby improving HARQ-ACK performance.

Example 5 (preferably applicable when the frame structure determined in step 201 is one of the foregoing frame structure 1 to frame structure 40):

The sending and receiving, by the user equipment, information in the serving cell based on the frame structure includes:

receiving, by the user equipment at a subframe i, a downlink control channel that schedules a physical uplink shared channel; and sending, by the user equipment at a subframe i+4 in the serving cell, the physical uplink shared channel scheduled by the downlink control channel, where i is an integer.

The sending and receiving, by the user equipment, information in the serving cell based on the frame structure includes:

sending, by the user equipment, a physical uplink shared channel at a subframe j in the serving cell; and receiving, by the user equipment at a subframe j+6, a HARQ-ACK corresponding to the physical uplink shared channel, where j is an integer.

The sending and receiving, by the user equipment, information in the serving cell based on the frame structure includes:

receiving, by the user equipment at a subframe h, a HARQ-ACK corresponding to a physical uplink shared channel; and sending, by the user equipment at a subframe h+4 in the serving cell, a physical uplink shared channel corresponding to the HARQ-ACK, where h is an integer.

The three transmission processes in example 5 may be independent of each other, or there is a relationship between the first transmission process and the second transmission process, or there is a relationship between the second transmission process and the third transmission process, or there is a relationship between the first transmission process, the second transmission process, and the third transmission process.

For example, if there is a relationship between the first transmission process and the second transmission process, j=i+4; if there is a relationship between the second transmission process and the third transmission process, h=j+6.

By introducing a first subframe, or a first subframe and a second subframe in this embodiment of the present invention, values of k corresponding to more subframes are relatively small, so that a delay is reduced as much as possible. In addition, because a HARQ-ACK can also be fed back at the first subframe and the second subframe, compared with existing timing, load of feeding back a HARQ-ACK at a subframe is alleviated, thereby improving HARQ-ACK performance.

Example 6 (preferably applicable when the frame structure determined in step 201 is one of the foregoing frame structure 1 to frame structure 5, frame structure 10 to frame structure 12, frame structure 15 to frame structure 17, frame structure 23, or frame structure 40):

The sending and receiving, by the user equipment, information in the serving cell based on the frame structure includes:

receiving, by the user equipment at a subframe i, a downlink control channel that schedules a physical uplink shared channel; and sending, by the user equipment at a subframe i+2 in the serving cell, the physical uplink shared channel scheduled by the downlink control channel, where i is an integer.

The sending and receiving, by the user equipment, information in the serving cell based on the frame structure includes:

sending, by the user equipment, a physical uplink shared channel at a subframe j in the serving cell; and receiving, by the user equipment at a subframe j+3, a HARQ-ACK corresponding to the physical uplink shared channel, where j is an integer.

The sending and receiving, by the user equipment, information in the serving cell based on the frame structure includes:

receiving, by the user equipment at a subframe h, a HARQ-ACK corresponding to a physical uplink shared channel; and sending, by the user equipment at a subframe h+2 in the serving cell, a physical uplink shared channel corresponding to the HARQ-ACK, where h is an integer.

The three transmission processes in example 6 may be independent of each other, or there is a relationship between the first transmission process and the second transmission process, or there is a relationship between the second transmission process and the third transmission process, or there is a relationship between the first transmission process, the second transmission process, and the third transmission process.

For example, if there is a relationship between the first transmission process and the second transmission process, j=i+2; if there is a relationship between the second transmission process and the third transmission process, h=j+3.

By introducing a first subframe, or a first subframe and a second subframe in this embodiment of the present invention, values of k corresponding to more subframes are relatively small, so that a delay is reduced as much as possible. In addition, because a HARQ-ACK can also be fed back at the first subframe and the second subframe, compared with existing timing, load of feeding back a HARQ-ACK at a subframe is alleviated, thereby improving HARQ-ACK performance.

Example 7 (preferably applicable when the frame structure determined in step 201 is one of the foregoing frame structure 23, frame structure 27, frame structure 32, frame structure 38, or frame structure 40):

The sending and receiving, by the user equipment, information in the serving cell based on the frame structure includes:

receiving, by the user equipment at a subframe n in the serving cell, a transmitted physical downlink shared channel, or a downlink control channel indicating downlink semi-persistent scheduling release, where n is an integer; and sending, by the user equipment at a subframe n+2, a HARQ-ACK response that is corresponding to the transmitted physical downlink shared channel or the downlink control channel of the serving cell at the subframe n.

By introducing a first subframe or a second subframe in this embodiment of the present invention, values of k corresponding to more subframes are less than 4, so that a delay is reduced. In addition, because a HARQ-ACK can also be fed back at the first subframe and the second subframe, compared with existing timing, load of feeding back a HARQ-ACK at a subframe is alleviated, thereby improving HARQ-ACK performance.

If the user equipment is user equipment corresponding to LTE Release 12 and an earlier release, or if the user equipment supports only LTE Release 12 and an earlier release, that the user equipment transmits information in the serving cell based on the frame structure according to HARQ timing in LTE Release 8 may be specifically: the user equipment transmits information in the serving cell based on the frame structure according to HARQ timing corresponding to the uplink-downlink configuration 0 in the frame structure type 2 in LTE Release 8. Details are as follows.

Optionally, the user equipment may send and receive the information in the serving cell based on the frame structure in step 201 according to the following uplink HARQ timing:

receiving, by the user equipment at a subframe n−k in the serving cell, a transmitted physical downlink shared channel, or a downlink control channel indicating downlink semi-persistent scheduling release, where n is an integer, k is a positive integer, k belongs to a set K, and values of K are shown in Table 2; and sending, by the user equipment at a subframe n, a HARQ-ACK response that is corresponding to the transmitted physical downlink shared channel or the downlink control channel of the serving cell at the subframe n−k.

Optionally, the user equipment may send and receive the information in the serving cell based on the frame structure in step 201 according to the following uplink HARQ timing:

receiving, by the user equipment at a subframe i, a downlink control channel that schedules a physical uplink shared channel; and sending, by the user equipment at a subframe i+4 in the serving cell, the physical uplink shared channel scheduled by the downlink control channel, where i is an integer.

Optionally, the user equipment may send and receive the information in the serving cell based on the frame structure in step 201 according to the following uplink HARQ timing:

sending, by the user equipment, a physical uplink shared channel at a subframe j in the serving cell; and receiving, by the user equipment at a subframe j+6, a HARQ-ACK corresponding to the physical uplink shared channel, where j is an integer.

Optionally, the user equipment may send and receive the information in the serving cell based on the frame structure in step 201 according to the following uplink HARQ timing:

receiving, by the user equipment at a subframe h, a HARQ-ACK corresponding to a physical uplink shared channel; and sending, by the user equipment at a subframe h+4 in the serving cell, a physical uplink shared channel corresponding to the HARQ-ACK, where h is an integer.

It may be learned according to Table 2 that, according to uplink HARQ timing in LTE Release 12 and an earlier release, values of k corresponding to most subframes are greater than 4. By introducing a first subframe in this embodiment of the present invention, values of k corresponding to more subframes are less than or equal to 4, so that a delay is reduced. In addition, because a HARQ-ACK can also be fed back at the first subframe, compared with existing HARQ timing, load of feeding back a HARQ-ACK at a subframe is alleviated, thereby improving HARQ-ACK performance. In addition, the frame structure allows user equipment that supports only LTE Release 12 and an earlier release to transmit information according to HARQ timing corresponding to the uplink-downlink configuration 0 in the frame structure type 2 in LTE Release 8, so that backward compatibility is maintained.

In this embodiment of the present invention, in an aspect, an uplink-downlink configuration of a serving cell is configured to an existing uplink-downlink configuration, for example, an uplink-downlink configuration 2, for legacy user equipment, so that the user equipment transmits information according to a frame structure in LTE Release 8 and HARQ timing. In another aspect, in a frame structure of a serving cell, subframes of a particular order of magnitude are reserved, according to a quantity of users of legacy user equipments, for UE that supports only LTE Release 12 and an earlier release to transmit information, thereby ensuring desirable support for backward compatibility. In a third aspect, a subframe 0 is changed as much as possible to a first subframe, and the first 12 symbols in a first subframe are downlink transmission symbols, so that a physical layer measurement behavior of legacy user equipment at the subframe 0 is not affected. In a fourth aspect, a special subframe is changed as much as possible to a second subframe, and when the special subframe is the second subframe, a special subframe ratio may be indicated as a special subframe configuration 0 or a special subframe ratio 5, so that physical layer measurement of legacy user equipment at a subframe 1 and a subframe 6 is not affected. According to the foregoing several aspects, a new frame structure provided in this embodiment of the present invention can maintain backward compatibility. In addition, the first subframe and the second subframe are introduced, so that delays of the some subframes are improved, and load of feeding back a HARQ-ACK at each subframe is alleviated, thereby simplifying a HARQ-ACK feedback mechanism, and improving HARQ-ACK performance.

Referring to FIG. 3, based on a same invention conception, an embodiment of the present invention provides another method for sending and receiving information. The method is a method that is implemented on a base station side and that is corresponding to the method shown in FIG. 2, and a main procedure of the method is described as follows:

Step 301: A base station determines a frame structure of a serving cell; where a radio frame corresponding to the frame structure includes at least one downlink subframe and at least one uplink subframe, and further includes at least one first subframe and/or at least one second subframe; the first subframe includes a first symbol used for downlink transmission, a first GP, and a second symbol used for uplink transmission, and the second subframe includes a third symbol used for downlink transmission, a second GP, and a fourth symbol used for uplink transmission; in the first subframe, a quantity of first symbols used for downlink transmission is greater than a quantity of second symbols used for uplink transmission, and in the second subframe, a quantity of third symbols used for downlink transmission is less than a quantity of fourth symbols used for uplink transmission; the uplink transmission includes HARQ-ACK transmission, and the downlink transmission includes physical downlink control channel transmission.

Step 302: The base station sends and receives information in the serving cell to and from user equipment based on the frame structure.

In this step, the sending and receiving, by the base station, information in the serving cell to and from user equipment based on the frame structure is: sending, by the base station, the information in the serving cell to the user equipment based on the frame structure, and/or receiving, by the base station in the serving cell based on the frame structure, the information sent by the user equipment. The sending and receiving, by the base station, information in the serving cell to and from user equipment based on the frame structure may be described as: transmitting, by the base station, the information in the serving cell with the user equipment based on the frame structure.

Optionally, in this embodiment of the present invention, the frame structure of the serving cell may be one of the frame structure 1 to frame structure 40 in the procedure shown in FIG. 2, and details are not described herein.

Optionally, in this embodiment of the present invention, the determining, by a base station, a frame structure of a serving cell, for example, may be:

determining, by the base station, an uplink-downlink configuration or an uplink-downlink ratio of the serving cell; and determining, by the base station, the frame structure of the serving cell according to the determined uplink-downlink configuration or uplink-downlink ratio.

For example, if the base station determines that the uplink-downlink ratio of the serving cell is 2:8, the base station may determine that the frame structure of the serving cell is one of the frame structure 1 to frame structure 19.

Optionally, in this embodiment of the present invention, not only the base station needs to determine the frame structure of the serving cell, but the user equipment also needs to determine the frame structure of the serving cell. Then, the base station may send higher layer signaling to the user equipment, to indicate the frame structure of the serving cell to the user equipment by using the higher layer signaling, and the user equipment may determine the frame structure of the serving cell by using the received higher layer signaling.

For example, the user equipment may store one or more of the foregoing frame structures, and the higher layer signaling may indicate a frame structure index of the serving cell (for example, for the foregoing frame structure 1, an index is 7, and for the foregoing frame structure 20, an index is 26). The user equipment may determine, in the stored frame structures, the frame structure of the serving cell according to the frame structure index. The frame structure of the serving cell that is determined by the user equipment may be one of the foregoing frame structure 1 to frame structure 40.

In this embodiment of the present invention, the higher layer signaling may be, for example, RRC signaling, or certainly, may be other possible higher layer signaling.

Alternatively, optionally, in this embodiment of the present invention, the base station may send SIB1 signaling and the higher layer signaling to the user equipment, to indicate the frame structure of the serving cell. For example, the user equipment may determine the uplink-downlink configuration of the serving cell according to the received SIB1 signaling; determine, based on the uplink-downlink configuration and Table 1, a frame structure corresponding to the uplink-downlink configuration; and then determine, according to the received higher layer signaling, types of some subframes in the frame structure corresponding to the uplink-downlink configuration.

For example, the higher layer signaling may indicate the frame structure of the serving cell in a bitmap form. For example, the higher layer signaling includes 20 bits, and every 5 bits respectively indicate types of several particular subframes in a radio frame. Specifically, the higher layer signaling may carry a description to indicate types of subframes that are indicated by bits, or the user equipment needs to learn in advance types of subframes that are indicated by bits. For example, in 20 bits included in the higher layer signaling, every 5 bits are respectively used to indicate types of a subframe 0, a subframe 3, a subframe 4, a subframe 8, and a subframe 9 according to a sequence. For example, "0" is used to indicate that a type of a subframe is a downlink subframe, and "1" is used to indicate that a type of a subframe is a first subframe. Certainly, another indication manner may exist.

For example, the user equipment determines, according to the received SIB1 signaling, that the uplink-downlink configuration of the serving cell is an uplink-downlink configuration 0; and determines, based on the uplink-downlink configuration and Table 1, the frame structure corresponding to the uplink-downlink configuration, that is, a frame structure corresponding to the uplink-downlink configuration 0. Then it is determined, according to the higher layer signaling, that in the frame structure corresponding to the uplink-downlink configuration, a type of a subframe 0 is the downlink subframe, a type of a subframe 3 is the uplink subframe, a type of a subframe 4 is the second subframe, a type of a subframe 8 is the uplink subframe, and a type of a subframe 9 is the second subframe. Therefore, the user equipment may determine that the frame structure corresponding to the serving cell is the foregoing frame structure 23.

Alternatively, optionally, in this embodiment of the present invention, the base station may send SIB1 signaling and MBSFN configuration information to the user equipment, to indicate the frame structure of the serving cell. Then, the user equipment may determine the frame structure of the serving cell according to the received SIB1 signaling and MBSFN configuration information. Specifically, the user equipment first determines the uplink-downlink configuration of the serving cell according to the SIB1 signaling; determines, based on the uplink-downlink configuration and Table 1, the frame structure corresponding to the uplink-downlink configuration; then determines an MBSFN subframe according to the MBSFN configuration information; and replaces an MBSFN subframe in the frame structure corresponding to the uplink-downlink configuration with the first subframe, to obtain the frame structure of the serving cell.

The foregoing lists several possible manners in which the base station and the user equipment determine the frame structure of the serving cell. The foregoing manners are merely used as examples but are not intend to limit the present invention.

Optionally, in this embodiment of the present invention, the base station may send and receive the information in the serving cell to and from the user equipment based on the determined frame structure in different manners Examples are described below.

Example 1 (preferably applicable when the frame structure determined in step 301 is one of the foregoing frame structure 1 to frame structure 7):

Optionally, in this embodiment of the present invention, the sending and receiving, by the base station, information in the serving cell to and from user equipment based on the frame structure in step 302 includes:

sending, by the base station to the user equipment at a subframe n in the serving cell, a transmitted physical downlink shared channel, or a downlink control channel indicating downlink semi-persistent scheduling release, where n is an integer; and receiving, by the base station at a subframe n+k, a HARQ-ACK response that is fed back by the user equipment and is corresponding to the transmitted physical downlink shared channel or the downlink control channel of the serving cell at the subframe n, where k is an integer; where when the subframe n is the first subframe or a subframe n+4 is the first subframe, k is 4; or when neither the subframe n nor a subframe n+4 is the first subframe, k is determined according to uplink HARQ timing in LTE Release 12 and an earlier release, that is, determined according to a manner in the prior art.

Example 2 (preferably applicable when the frame structure determined in step 301 is one of the foregoing frame structure 1 to frame structure 5, or frame structure 8 or frame structure 9):

Optionally, in this embodiment of the present invention, the sending and receiving, by the base station, information in the serving cell to and from user equipment based on the frame structure in step 302 includes:

sending, by the base station to the user equipment at a subframe n in the serving cell, a transmitted physical downlink shared channel, or a downlink control channel indicating downlink semi-persistent scheduling release, where n is an integer; and receiving, by the base station at a subframe n+k, a HARQ-ACK response that is fed back by the user equipment and is corresponding to the transmitted physical downlink shared channel or the downlink control channel of the serving cell at the subframe n, where k is an integer; where when the subframe n is the first subframe, k is 0; or when the subframe n is not the first subframe, k is determined according to uplink HARQ timing in LTE Release 12 and an earlier release, that is, determined according to a manner in the prior art.

Example 3 (preferably applicable when the frame structure determined in step 301 is one of the foregoing frame structure 10 to frame structure 14):

Optionally, in this embodiment of the present invention, the sending and receiving, by the base station, information in the serving cell to and from user equipment based on the frame structure in step 302 includes:

sending, by the base station to the user equipment at a subframe n in the serving cell, a transmitted physical downlink shared channel, or a downlink control channel indicating downlink semi-persistent scheduling release, where n is an integer; and receiving, by the base station at a subframe n+k, a HARQ-ACK response that is fed back by the user equipment and is corresponding to the transmitted physical downlink shared channel or the downlink control channel of the serving cell at the subframe n, where k is an integer; where when a subframe n+2 is the first subframe, k is 2; when the subframe n is the first subframe and a subframe n+2 is not the downlink subframe, k is 2; when the subframe n is the first subframe and a subframe n+2 is the downlink subframe, k is 3; or when none of the foregoing conditions is met, k is determined according to uplink HARQ timing in LTE Release 12 and an earlier release, that is, determined according to a manner in the prior art.

Example 4 (preferably applicable when the frame structure determined in step 301 is one of the foregoing frame structure 15 to frame structure 19):

Optionally, in this embodiment of the present invention, the sending and receiving, by the base station, information in the serving cell to and from user equipment based on the frame structure in step 302 includes:

sending, by the base station to the user equipment at a subframe n in the serving cell, a transmitted physical downlink shared channel, or a downlink control channel indicating downlink semi-persistent scheduling release, where n is an integer; and receiving, by the base station at a subframe n+k, a HARQ-ACK response that is fed back by the user equipment and is corresponding to the transmitted physical downlink shared channel or the downlink control channel of the serving cell at the subframe n, where k is an integer; where when a subframe n+1 is the first subframe, k is 1; when the subframe n is the first subframe and a subframe n+1 is not the downlink subframe, k is 1; when the subframe n is the first subframe and a subframe n+1 is the downlink subframe, k is 2; or when none of the foregoing conditions is met, k is determined according to uplink HARQ timing in LTE Release 12 and an earlier release, that is, determined according to a manner in the prior art.

Example 5 (preferably applicable when the frame structure determined in step 301 is one of the foregoing frame structure 1 to frame structure 40):

Optionally, in this embodiment of the present invention, the sending and receiving, by the base station, information in the serving cell to and from user equipment based on the frame structure in step 302 includes:

sending, by the base station to the user equipment at a subframe i, a downlink control channel that schedules a physical uplink shared channel; and receiving, by the base station at a subframe i+4 in the serving cell, the physical uplink shared channel scheduled by the downlink control channel, where i is an integer.

Optionally, in this embodiment of the present invention, the sending and receiving, by the base station, information in the serving cell to and from user equipment based on the frame structure in step 302 includes:

receiving, by the base station at a subframe j in the serving cell, a physical uplink shared channel sent by the user equipment; and sending, by the base station at a subframe j+6, a HARQ-ACK corresponding to the physical uplink shared channel, where j is an integer.

Optionally, in this embodiment of the present invention, the sending and receiving, by the base station, information in the serving cell to and from user equipment based on the frame structure in step 302 includes:

sending, by the base station at a subframe h, a HARQ-ACK corresponding to a physical uplink shared channel sent by the user equipment; and receiving, by the base station at a subframe h+4 in the serving cell, the retransmitted physical uplink shared channel, where h is an integer.

The three transmission processes in example 5 may be independent of each other, or there is a relationship between the first transmission process and the second transmission process, or there is a relationship between the second transmission process and the third transmission process, or there is a relationship between the first transmission process, the second transmission process, and the third transmission process.

For example, if there is a relationship between the first transmission process and the second transmission process, j=i+4; if there is a relationship between the second transmission process and the third transmission process, h=j+6.

Example 6 (preferably applicable when the frame structure determined in step 301 is one of the foregoing frame structure 1 to frame structure 5, frame structure 10 to frame structure 12, frame structure 15 to frame structure 17, frame structure 23, or frame structure 40):

Optionally, in this embodiment of the present invention, the sending and receiving, by the base station, information in the serving cell to and from user equipment based on the frame structure in step 302 includes:

sending, by the base station to the user equipment at a subframe i, a downlink control channel that schedules a physical uplink shared channel; and receiving, by the base station at a subframe i+2 in the serving cell, the physical uplink shared channel scheduled by the downlink control channel, where i is an integer.

Optionally, in this embodiment of the present invention, the sending and receiving, by the base station, information in the serving cell to and from user equipment based on the frame structure in step 302 includes:

receiving, by the base station at a subframe j in the serving cell, a physical uplink shared channel sent by the user equipment; and sending, by the base station at a subframe j+3, a HARQ-ACK corresponding to the physical uplink shared channel, where j is an integer.

Optionally, in this embodiment of the present invention, the sending and receiving, by the base station, information in the serving cell to and from user equipment based on the frame structure in step 302 includes:

sending, by the base station at a subframe h, a HARQ-ACK corresponding to a physical uplink shared channel sent by the user equipment; and receiving, by the base station at a subframe h+2 in the serving cell, the retransmitted physical uplink shared channel, where h is an integer.

The three transmission processes in example 6 may be independent of each other, or there is a relationship between the first transmission process and the second transmission process, or there is a relationship between the second transmission process and the third transmission process, or there is a relationship between the first transmission process, the second transmission process, and the third transmission process.

For example, if there is a relationship between the first transmission process and the second transmission process, j=i+2; if there is a relationship between the second transmission process and the third transmission process, h=j+3.

Example 7 (preferably applicable when the frame structure determined in step 301 is one of the foregoing frame structure 23, frame structure 27, frame structure 32, frame structure 38, or frame structure 40):

The sending and receiving, by the base station, information in the serving cell to and from user equipment based on the frame structure includes:

sending, by the base station to the user equipment at a subframe n in the serving cell, a transmitted physical downlink shared channel, or a downlink control channel indicating downlink semi-persistent scheduling release, where n is an integer; and receiving, by the base station at a subframe n+2, a HARQ-ACK response that is fed back by the user equipment and is corresponding to the transmitted physical downlink shared channel or the downlink control channel of the serving cell at the subframe n.

If the base station sends information to legacy user equipment or receives information sent by user equipment that supports only LTE Release 12 and an earlier release, in step 302, that the base station sends and receives the information in the serving cell to and from the user equipment based on the frame structure determined in step 301 is: the base station sends and receives the information in the serving cell based on the frame structure according to HARQ timing in LTE Release 8. Details are as follows.

Optionally, the base station may send and receive the information in the serving cell to and from the user equipment based on the frame structure determined in step 301 according to the following uplink HARQ timing:

sending, by the base station to the user equipment at a subframe n−k in the serving cell, a transmitted physical downlink shared channel, or a downlink control channel indicating downlink semi-persistent scheduling release, where n is an integer, k is a positive integer, k belongs to a set K, and values of K are shown in Table 2; and receiving, by the base station at a subframe n, a HARQ-ACK response that is fed back by the user equipment and is corresponding to the transmitted physical downlink shared channel or the downlink control channel of the serving cell at the subframe n−k.

Optionally, the base station may send and receive the information in the serving cell to and from the user equipment based on the frame structure determined in step 301 according to the following downlink HARQ timing:

sending, by the base station to the user equipment at a subframe i, a downlink control channel that schedules a physical uplink shared channel; and receiving, by the base station at a subframe i+4 in the serving cell, the physical uplink shared channel scheduled by the downlink control channel and fed back by the user equipment, where i is an integer.

Optionally, the base station may send and receive the information in the serving cell to and from the user equipment based on the frame structure determined in step 301 according to the following uplink HARQ timing:

receiving, by the base station at a subframe j in the serving cell, a physical uplink shared channel sent by the user equipment; and sending, by the base station to the user equipment at a subframe j+6, a HARQ-ACK corresponding to the physical uplink shared channel, where j is an integer.

Optionally, the base station may send and receive the information in the serving cell to and from the user equipment based on the frame structure determined in step 301 according to the following uplink HARQ timing:

sending, by the base station to the user equipment at a subframe h, a HARQ-ACK corresponding to a physical uplink shared channel; and receiving, by the base station at a subframe h+4 in the serving cell, a physical uplink shared channel that is fed back by the user equipment and is corresponding to the HARQ-ACK, where h is an integer.

The procedure in FIG. 3 is a procedure corresponding to the procedure in FIG. 2. Therefore, for content that is not described in detail in the procedure in FIG. 3, refer to corresponding description in the procedure in FIG. 2.

In this embodiment of the present invention, in an aspect, an uplink-downlink configuration of a serving cell is configured to an existing uplink-downlink configuration, for example, an uplink-downlink configuration 2, for legacy user equipment, so that the user equipment transmits information according to a frame structure in LTE Release 8 and HARQ timing. In another aspect, in a frame structure of a serving cell, subframes of a particular order of magnitude are reserved, according to a quantity of users of legacy user equipments, for UE that supports only LTE Release 12 and an earlier release to transmit information, thereby ensuring desirable support for backward compatibility. In a third aspect, a subframe 0 is changed as much as possible to a first subframe, and the first 12 symbols in a first subframe are downlink transmission symbols, so that a physical layer measurement behavior, at the subframe 0, of corresponding user equipment that supports only LTE Release 12 and an earlier release is not affected. In a fourth aspect, a special subframe is changed as much as possible to a second subframe, and when the special subframe is the second subframe, a special subframe ratio may be indicated as a special subframe configuration 0 or a special subframe ratio 5, so that physical layer measurement of legacy user equipment at a subframe 1 and a subframe 6 is not affected. According to the foregoing several aspects, a new frame structure provided in this embodiment of the present invention can maintain backward compatibility. In addition, the first subframe and the second subframe are introduced, so that delays of the some subframes are improved, and load of feeding back a HARQ-ACK at each subframe is alleviated, thereby simplifying a HARQ-ACK feedback mechanism, and improving HARQ-ACK performance.

Figure 4:
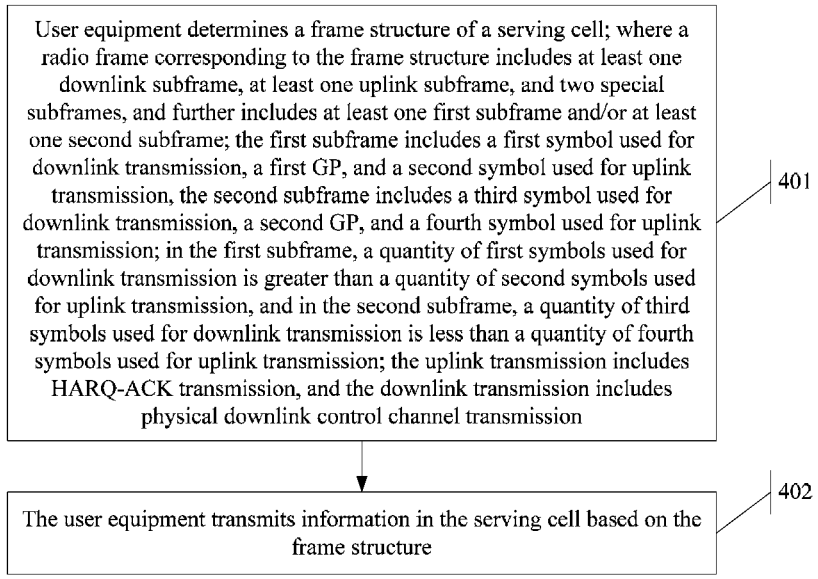
FIG. 4 is a main flowchart of a third method for sending and receiving information according to an embodiment of the present invention.

Referring to FIG. 4, an embodiment of the present invention further provides a method for sending and receiving information, and a main procedure of the method is described as follows.

Step 401: User equipment determines a frame structure of a serving cell; where a radio frame corresponding to the frame structure includes at least one downlink subframe, at least one uplink subframe, and two special subframes, and further includes at least one first subframe and/or at least one second subframe; the first subframe includes a first symbol used for downlink transmission, a first GP, and a second symbol used for uplink transmission, and the second subframe includes a third symbol used for downlink transmission, a second GP, and a fourth symbol used for uplink transmission; in the first subframe, a quantity of first symbols used for downlink transmission is greater than a quantity of second symbols used for uplink transmission, and in the second subframe, a quantity of third symbols used for downlink transmission is less than a quantity of fourth symbols used for uplink transmission; the uplink transmission includes HARQ-ACK transmission, and the downlink transmission includes physical downlink control channel transmission.

In this step, the user equipment determines the frame structure of the serving cell, where the frame structure may be as follows.

Frame Structure 41:

The radio frame includes 10 subframes, where a subframe 0, a subframe 3, a subframe 5, and a subframe 8 are the downlink subframes, a subframe 2 and a subframe 7 are the uplink subframes, a subframe 1 and a subframe 6 are the special subframes, and a subframe 4 and a subframe 9 are the second subframes.

In step 401 in this embodiment of the present invention, in this frame structure 41, six subframes including the subframe 0, the subframe 1, the subframe 3, the subframe 5, the subframe 6, and the subframe 8 may be used to support downlink transmission of legacy (legacy) user equipment (for example, user equipment that supports only LTE Release 12 and an earlier release), and the subframe 2 and the subframe 7 may be used to support uplink transmission of the legacy user equipment. Therefore, the frame structure is backward-compatible.

Alternatively:

Frame Structure 42:

The radio frame includes 10 subframes, where a subframe 0, a subframe 5, and a subframe 8 are the downlink subframes, a subframe 2, a subframe 4, and a subframe 7 are the uplink subframes, a subframe 1 and a subframe 6 are the special subframes, and a subframe 3 and a subframe 9 are the first subframes.

Alternatively:

Frame Structure 43:

The radio frame includes 10 subframes, where a subframe 0, a subframe 5, and a subframe 8 are the downlink subframes, a subframe 2, a subframe 4, and a subframe 7 are the uplink subframes, a subframe 1 and a subframe 6 are the special subframes, and a subframe 3 and a subframe 9 are the second subframes.

Alternatively:

Frame Structure 44:

The radio frame includes 10 subframes, where a subframe 0, a subframe 5, and a subframe 8 are the downlink subframes, a subframe 2, a subframe 4, and a subframe 7 are the uplink subframes, a subframe 1 and a subframe 6 are the special subframes, a subframe 3 is the second subframe, and a subframe 9 is the first subframe.

In the frame structure 42 to frame structure 44, five subframes including the subframe 0, the subframe 1, the subframe 5, the subframe 6, and the subframe 8 may be used to support downlink transmission of legacy (legacy) user equipment (for example, user equipment that supports only LTE Release 12 and an earlier release), and the subframe 2 and the subframe 7 may be used to support uplink transmission of the legacy user equipment. Therefore, the frame structure 42 to frame structure 44 are backward-compatible. In addition, uplink-downlink configurations corresponding to all frame structures in the frame structure 42 to frame structure 44 are inconsistent, and a corresponding frame structure can be used according to an actual status of an uplink and downlink service, to implement better adaptation to a service status.

Alternatively:

Frame Structure 45:

The radio frame includes 10 subframes, where a subframe 0 and a subframe 5 are the downlink subframes, a subframe 2 and a subframe 7 are the uplink subframes, a subframe 1 and a subframe 6 are the special subframes, and a subframe 3, a subframe 4, a subframe 8, and a subframe 9 are the first subframes.

Alternatively:

Frame Structure 46:

The radio frame includes 10 subframes, where a subframe 0 and a subframe 5 are the downlink subframes, a subframe 2 and a subframe 7 are the uplink subframes, a subframe 1 and a subframe 6 are the special subframes, a subframe 4, a subframe 8, and a subframe 9 are the first subframes, and a subframe 3 is the second subframe.

Alternatively:

Frame Structure 47:

The radio frame includes 10 subframes, where a subframe 0 and a subframe 5 are the downlink subframes, a subframe 2 and a subframe 7 are the uplink subframes, a subframe 1 and a subframe 6 are the special subframes, a subframe 4 and a subframe 9 are the first subframes, and a subframe 3 and a subframe 8 are the second subframes.

Alternatively:

Frame Structure 48:

The radio frame includes 10 subframes, where a subframe 0 and a subframe 5 are the downlink subframes, a subframe 2 and a subframe 7 are the uplink subframes, a subframe 1 and a subframe 6 are the special subframes, a subframe 9 is the first subframe, and a subframe 3, a subframe 4, and a subframe 8 are the second subframes.

Alternatively:

Frame Structure 49:

The radio frame includes 10 subframes, where a subframe 0 and a subframe 5 are the downlink subframes, a subframe 2 and a subframe 7 are the uplink subframes, a subframe 1 and a subframe 6 are the special subframes, and a subframe 3, a subframe 4, a subframe 8, and a subframe 9 are the second subframes.

In the frame structure 45 to frame structure 49, four subframes including the subframe 0, the subframe 1, the subframe 5, and the subframe 6 may be used to support downlink transmission of legacy (legacy) user equipment (for example, user equipment that supports only LTE Release 12 and an earlier release), and the subframe 2 and the subframe 7 may be used to support uplink transmission of the legacy user equipment. Therefore, the frame structure 45 to frame structure 49 are backward-compatible. In addition, uplink-downlink configurations corresponding to all frame structures in the frame structure 45 to frame structure 49 are inconsistent, and a corresponding frame structure can be used according to an actual status of an uplink and downlink service, to implement better adaptation to a service status.

Alternatively:

Frame Structure 50:

The radio frame includes 10 subframes, where a subframe 0, a subframe 5, and a subframe 8 are the downlink subframes, a subframe 2 and a subframe 4 are the uplink subframes, a subframe 1 and a subframe 6 are the special subframes, and a subframe 3, a subframe 7, and a subframe 9 are the first subframes.

Alternatively:

Frame Structure 51:

The radio frame includes 10 subframes, where a subframe 0, a subframe 5, and a subframe 8 are the downlink subframes, a subframe 2 and a subframe 4 are the uplink subframes, a subframe 1 and a subframe 6 are the special subframes, a subframe 3 and a subframe 7 are the first subframes, and a subframe 9 is the second subframe.

Alternatively:

Frame Structure 52:

The radio frame includes 10 subframes, where a subframe 0, a subframe 5, and a subframe 8 are the downlink subframes, a subframe 2, a subframe 3, and a subframe 4 are the uplink subframes, a subframe 1 and a subframe 6 are the special subframes, and a subframe 7 and a subframe 9 are the first subframes.

Alternatively:

Frame Structure 53:

The radio frame includes 10 subframes, where a subframe 0, a subframe 5, and a subframe 8 are the downlink subframes, a subframe 2, a subframe 3, and a subframe 4 are the uplink subframes, a subframe 1 and a subframe 6 are the special subframes, a subframe 7 is the first subframe, and a subframe 9 is the second subframe.

In the frame structure 50 to frame structure 53, three subframes including the subframe 5, the subframe 6, and the subframe 8 may be used to support downlink transmission of legacy (legacy) user equipment (for example, user equipment that supports only LTE Release 12 and an earlier release), and the subframe 2 may be used to support uplink transmission of the legacy user equipment. Therefore, the frame structure 50 to frame structure 53 are backward-compatible. In addition, uplink-downlink configurations corresponding to all frame structures in the frame structure 50 to frame structure 53 are inconsistent, and a corresponding frame structure can be used according to an actual status of an uplink and downlink service, to implement better adaptation to a service status.

Alternatively:

Frame Structure 54:

The radio frame includes 10 subframes, where a subframe 0 and a subframe 5 are the downlink subframes, a subframe 2 is the uplink subframe, a subframe 1 and a subframe 6 are the special subframes, and a subframe 3, a subframe 4, a subframe 7, a subframe 8, and a subframe 9 are the first subframes.

Alternatively:

Frame Structure 55:

The radio frame includes 10 subframes, where a subframe 0, a subframe 3, and a subframe 5 are the downlink subframes, a subframe 2 and a subframe 9 are the uplink subframes, a subframe 1 and a subframe 6 are the special subframes, and a subframe 4, a subframe 7, and a subframe 8 are the first subframes.

Alternatively:

Frame Structure 56:

The radio frame includes 10 subframes, where a subframe 0 and a subframe 5 are the downlink subframes, a subframe 2, a subframe 4, and a subframe 9 are the uplink subframes, a subframe 1 and a subframe 6 are the special subframes, and a subframe 3, a subframe 7, and a subframe 8 are the first subframes.

Alternatively:

Frame Structure 57:

The radio frame includes 10 subframes, where a subframe 0 and a subframe 5 are the downlink subframes, a subframe 2 and a subframe 3 are the uplink subframes, a subframe 1 and a subframe 6 are the special subframes, a subframe 4 and a subframe 7 are the first subframes, and a subframe 8 and a subframe 9 are the second subframes.

Alternatively:

Frame Structure 58:

The radio frame includes 10 subframes, where a subframe 0 and a subframe 5 are the downlink subframes, a subframe 2 and a subframe 3 are the uplink subframes, a subframe 1 and a subframe 6 are the special subframes, a subframe 7 is the first subframe, and a subframe 4, a subframe 8, and a subframe 9 are the second subframes.

In the frame structure 54 to frame structure 58, two subframes including the subframe 5 and the subframe 6 may be used to support downlink transmission of legacy (legacy) user equipment (for example, user equipment that supports only LTE Release 12 and an earlier release), and the subframe 2 may be used to support uplink transmission of the legacy user equipment. Therefore, the frame structure 54 to frame structure 58 are backward-compatible. In addition, uplink-downlink configurations corresponding to all frame structures in the frame structure 54 to frame structure 58 are inconsistent, and a corresponding frame structure can be used according to an actual status of an uplink and downlink service, to implement better adaptation to a service status.

Alternatively:

Frame Structure 59:

The radio frame includes 10 subframes, where a subframe 5 is the downlink subframe, a subframe 2 and a subframe 7 are the uplink subframes, a subframe 1 and a subframe 6 are the special subframes, and a subframe 0, a subframe 3, a subframe 4, a subframe 8, and a subframe 9 are the first subframes.

Alternatively:

Frame Structure 60:

The radio frame includes 10 subframes, where a subframe 5 is the downlink subframe, a subframe 2 and a subframe 7 are the uplink subframes, a subframe 1 and a subframe 6 are the special subframes, a subframe 0, a subframe 4, a subframe 8, and a subframe 9 are the first subframes, and a subframe 3 is the second subframe.

Alternatively:

Frame Structure 61:

The radio frame includes 10 subframes, where a subframe 5 is the downlink subframe, a subframe 2 and a subframe 7 are the uplink subframes, a subframe 1 and a subframe 6 are the special subframes, a subframe 0, a subframe 4, and a subframe 9 are the first subframes, and a subframe 3 and a subframe 8 are the second subframes.

Alternatively:

Frame Structure 62:

The radio frame includes 10 subframes, where a subframe 5 is the downlink subframe, a subframe 2 and a subframe 7 are the uplink subframes, a subframe 1 and a subframe 6 are the special subframes, a subframe 0 and a subframe 9 are the first subframes, and a subframe 3, a subframe 4, and a subframe 8 are the second subframes.

Alternatively:

Frame Structure 63:

The radio frame includes 10 subframes, where a subframe 5 is the downlink subframe, a subframe 2 and a subframe 7 are the uplink subframes, a subframe 1 and a subframe 6 are the special subframes, a subframe 0 is the first subframe, and a subframe 3, a subframe 4, a subframe 8, and a subframe 9 are the second subframes.

In the frame structure 59 to frame structure 63, three subframes including the subframe 1, the subframe 5, and the subframe 6 may be used to support downlink transmission of legacy (legacy) user equipment (for example, user equipment that supports only LTE Release 12 and an earlier release), and the subframe 2 and the subframe 7 may be used to support uplink transmission of the legacy user equipment. Therefore, the frame structure 59 to frame structure 63 are backward-compatible. In addition, uplink-downlink configurations corresponding to all frame structures in the frame structure 59 to frame structure 63 are inconsistent, and a corresponding frame structure can be used according to an actual status of an uplink and downlink service, to implement better adaptation to a service status.

In the foregoing frame structure 41 to frame structure 63, different frame structures support backward-compatibility to different extents (that is, support the legacy user equipment that supports only LTE Release 12 and an earlier release), and a corresponding frame structure may be used according to a quantity of legacy user equipments that support only LTE Release 12 and an earlier release.

Optionally, in this embodiment of the present invention, the determining, by user equipment, a frame structure of a serving cell may be: determining, by the user equipment, the frame structure of the serving cell according to received higher layer signaling.

For example, the higher layer signaling may indicate the frame structure of the serving cell in a bitmap form. For example, the higher layer signaling includes 20 bits, and every 5 bits respectively indicate types of several particular subframes in a radio frame. Specifically, the higher layer signaling may carry a description to indicate types of subframes that are indicated by bits, or the user equipment needs to learn in advance types of subframes that are indicated by bits. For example, the higher layer signaling may include 20 bits, which are used to indicate subframe types of some subframes in four radio frames, where every 5 bits are corresponding to one radio frame, and 5 bits are respectively used to indicate types of a subframe 0, a subframe 3, a subframe 4, a subframe 8, and a subframe 9 according to a sequence. For example, for the subframe 0, "0" indicates that a type of a subframe is a downlink subframe, and "1" is used to indicate that a type of a subframe is a first subframe; for the subframe 3, the subframe 4, the subframe 8, and the subframe 9, "0" indicates that a type of a subframe is a first subframe, and "1" is used to indicate that a type of a subframe is a second subframe.

In this embodiment of the present invention, if the user equipment is the legacy user equipment, the user equipment determines that the frame structure of the serving cell is as follows: A radio frame includes 10 subframes, where a subframe 0, a subframe 3, a subframe 4, a subframe 5, a subframe 8, and a subframe 9 are the downlink subframes, a subframe 2 and a subframe 7 are the uplink subframes, and a subframe 1 and a subframe 6 are the special subframes. The special subframe is a special subframe in a frame structure type 2 in LTE Release 8, that is, the user equipment considers that the determined frame structure of the serving cell is a frame structure corresponding to the uplink-downlink configuration 2 in the frame structure type 2 in LTE Release 8. It should be noted that the frame structure of the serving cell is actually the frame structure previously defined in the embodiments of the present invention and is inconsistent with the frame structure corresponding to the uplink-downlink configuration 2 in the frame structure type 2 in LTE Release 8. Herein, only the legacy user equipment is allowed to consider that the frame structure of the serving cell is the frame structure corresponding to the uplink-downlink configuration 2 in the frame structure type 2 in LTE Release 8, so that the method in this embodiment of the present invention can be applied to user equipment of each release.

In this embodiment of the present invention, in an aspect, an uplink-downlink configuration of a serving cell is configured to an existing uplink-downlink configuration, for example, an uplink-downlink configuration 2, for legacy user equipment, so that the user equipment transmits information according to a frame structure in LTE Release 8 and HARQ timing. In another aspect, in a frame structure of a serving cell, subframes of a particular order of magnitude are reserved, according to a quantity of users of legacy user equipments, for the legacy user equipment to transmit information, thereby ensuring desirable support for backward compatibility. In a third aspect, a subframe 0 is changed as much as possible to a first subframe; for example, the first 12 symbols in a first subframe are downlink transmission symbols, so that a physical layer measurement behavior, at the subframe 0, of corresponding user equipment that supports only LTE Release 12 and an earlier release is not affected. According to the foregoing several aspects, a new frame structure proposed in this embodiment of the present invention can maintain backward compatibility.

In addition, the first subframe and a second subframe are introduced in this embodiment of the present invention, so that delays of the some subframes are improved, and load of feeding back a HARQ-ACK at each subframe is alleviated, thereby simplifying a HARQ-ACK feedback mechanism, and improving HARQ-ACK performance.

Step 402: The user equipment transmits information in the serving cell based on the frame structure.

In this step, the user equipment sends and receives the information in the serving cell based on the frame structure determined in step 401. Specifically, the user equipment may send and receive the information in the serving cell based on the frame structure in step 401 according to the following uplink HARQ-ACK timing and downlink HARQ timing.

The uplink HARQ-ACK timing is as follows:

The user equipment receives, at a subframe n in the serving cell, a transmitted physical downlink shared channel, or a downlink control channel indicating downlink semi-persistent scheduling release, where n is an integer.

The user equipment sends, at a subframe n+k, a hybrid automatic repeat request-acknowledgment HARQ-ACK response that is corresponding to the transmitted physical downlink shared channel or the downlink control channel of the serving cell at the subframe n, where k is an integer; where when the subframe n corresponds to a subframe 1 or a subframe 6 in a radio frame, a value of k is 6; when the subframe n corresponds to a subframe other than a subframe 1 and a subframe 6, a value of k is 4.

It should be noted that in all embodiments of the present invention, the HARQ-ACK response that is corresponding to the transmitted physical downlink shared channel or the downlink control channel of the serving cell at the subframe n is the HARQ-ACK response that is corresponding to the transmitted physical downlink shared channel or the downlink control channel that is received by the user equipment in the serving cell at the subframe n. In all the embodiments of the present invention, the downlink control channel is a PDCCH or an EPDCCH (enhanced physical downlink control channel).

The downlink HARQ timing is as follows:

The user equipment receives, at a subframe i, a downlink control channel that schedules a physical uplink shared channel; and the user equipment sends, at a subframe i+4 in the serving cell, the physical uplink shared channel scheduled by the downlink control channel, where i is an integer.

The user equipment sends a physical uplink shared channel at a subframe j in the serving cell; and the user equipment receives, at a subframe j+6, a HARQ-ACK corresponding to the physical uplink shared channel, where j is an integer.

The user equipment receives, at a subframe h, a HARQ-ACK corresponding to a physical uplink shared channel; and the user equipment sends, at a subframe h+4 in the serving cell, a physical uplink shared channel corresponding to the HARQ-ACK, where h is an integer.

The downlink HARQ timing in all the embodiments of the present invention may be HARQ timing corresponding to a physical uplink shared channel PUSCH.

In step 402, if the user equipment is the legacy user equipment, the user equipment may send and receive the information according to HARQ timing in LTE Release 12 and an earlier release.

Timing in step 402 may be applicable to any frame structure in step 401, so that same HARQ timing is used for different uplink-downlink configurations. Compared with HARQ timing corresponding to a frame structure type 2 in existing LTE Release 12 and an earlier release, a HARQ-ACK feedback mechanism is simplified, and complexity is reduced. In another aspect, for uplink HARQ-ACK timing in step 402, except that a value of k corresponding to a subframe 1 and a subframe 6 is 6, values of k corresponding to other subframes are all 4; compared with existing LTE Release 12 and an earlier release, a feedback delay is reduced. In still another aspect, the legacy user equipment may send and receive information according to HARQ timing in existing LTE Release 12 and an earlier release at some subframes in the frame structure defined in step 401, and backward compatibility is met.

Figure 5:
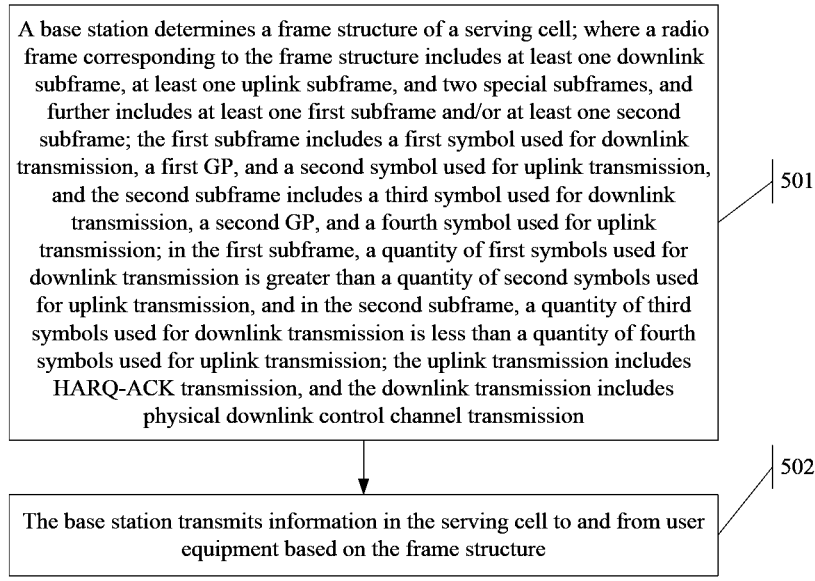
FIG. 5 is a main flowchart of a fourth method for sending and receiving information according to an embodiment of the present invention.

Referring to FIG. 5, an embodiment of the present invention further provides a method for sending and receiving information. The method is a method that is implemented on a base station side and that is corresponding to the method shown in FIG. 4. A main procedure of the method is described as follows.

Step 501: A base station determines a frame structure of a serving cell; where a radio frame corresponding to the frame structure includes at least one downlink subframe, at least one uplink subframe, and two special subframes, and further includes at least one first subframe and/or at least one second subframe; the first subframe includes a first symbol used for downlink transmission, a first GP, and a second symbol used for uplink transmission, and the second subframe includes a third symbol used for downlink transmission, a second GP, and a fourth symbol used for uplink transmission; in the first subframe, a quantity of first symbols used for downlink transmission is greater than a quantity of second symbols used for uplink transmission, and in the second subframe, a quantity of third symbols used for downlink transmission is less than a quantity of fourth symbols used for uplink transmission; the uplink transmission includes HARQ-ACK transmission, and the downlink transmission includes physical downlink control channel transmission.

In this embodiment of the present invention, the frame structure of the serving cell may be one of the frame structure 41 to frame structure 63 in the procedure shown in FIG. 4, and details are not described herein.

Step 502: The base station transmits information in the serving cell with user equipment based on the frame structure.

In step 502, the transmitting, by the base station, information in the serving cell with user equipment based on the frame structure may be: sending and receiving, by the base station, the information in the serving cell to and from the user equipment based on the frame structure, that is, sending, by the base station, the information in the serving cell to the user equipment based on the frame structure, and/or receiving, by the base station in the serving cell based on the frame structure, the information sent by the user equipment. Specifically, the base station may send and receive the information in the serving cell based on the frame structure in step 501 according to the following uplink HARQ-ACK timing and downlink HARQ timing.

The uplink HARQ-ACK timing is as follows:

The base station sends, to the user equipment at a subframe n in the serving cell, a transmitted physical downlink shared channel, or a downlink control channel indicating downlink semi-persistent scheduling release, where n is an integer.

The base station receives, at a subframe n+k, a HARQ-ACK response that is fed back by the user equipment and is corresponding to the transmitted physical downlink shared channel or the downlink control channel of the serving cell at the subframe n, where k is an integer.

When the subframe n corresponds to a subframe 1 or a subframe 6 in a radio frame, a value of k is 6; when the subframe n corresponds to a subframe other than a subframe 1 and a subframe 6, a value of k is 4.

The downlink HARQ timing is as follows:

The base station sends, to the user equipment at a subframe i, a downlink control channel that schedules a physical uplink shared channel; and the base station receives, at a subframe i+4 in the serving cell, the physical uplink shared channel scheduled by the downlink control channel, where i is an integer.

The base station receives, at a subframe j in the serving cell, a physical uplink shared channel sent by the user equipment; and the base station sends, at a subframe j+6, a HARQ-ACK corresponding to the physical uplink shared channel, where j is an integer.

The base station sends, at a subframe h, a HARQ-ACK corresponding to a physical uplink shared channel sent by the user equipment; and the base station receives, at a subframe h+4 in the serving cell, the retransmitted physical uplink shared channel, where h is an integer.

In step 502, if the base station sends and receives information to and from legacy user equipment, the base station may send and receive the information to and from the user equipment according to HARQ timing in LTE Release 12 and an earlier release.

Timing in step 502 may be applicable to any frame structure in step 501, so that same HARQ timing is used for different uplink-downlink configurations. Compared with HARQ timing corresponding to a frame structure type 2 in existing LTE Release 12 and an earlier release, a HARQ-ACK feedback mechanism is simplified, and complexity is reduced. In another aspect, for uplink HARQ-ACK timing in step 502, except that a value of k corresponding to a subframe 1 and a subframe 6 is 6, values of k corresponding to other subframes are all 4; compared with existing LTE Release 12 and an earlier release, a feedback delay is reduced. In still another aspect, the legacy user equipment may send and receive information according to HARQ timing in existing LTE Release 12 and an earlier release at some subframes in the frame structure defined in step 501, and backward compatibility is met.

In addition, in the embodiments of the present invention, in various method procedures, serial numbers of steps do not represent an actual execution sequence of the steps.

The following describes devices in the embodiments of the present invention with reference to the accompanying drawings.

Figure 6:
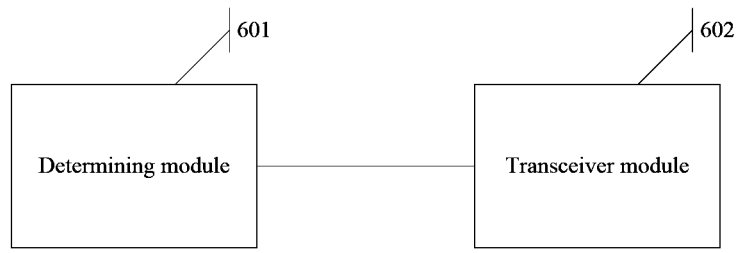
FIG. 6 is a structural block diagram of user equipment according to an embodiment of the present invention.

Referring to FIG. 6, based on a same invention conception, an embodiment of the present invention provides user equipment. The user equipment may include a determining module 601 and a transceiver module 602.

The determining module 601 is configured to determine a frame structure of a serving cell; where a radio frame corresponding to the frame structure includes at least one downlink subframe and at least one uplink subframe, and further includes at least one first subframe and/or at least one second subframe; the first subframe includes a first symbol used for downlink transmission, a first GP, and a second symbol used for uplink transmission, and the second subframe includes a third symbol used for downlink transmission, a second GP, and a fourth symbol used for uplink transmission; in the first subframe, a quantity of first symbols used for downlink transmission is greater than a quantity of second symbols used for uplink transmission, and in the second subframe, a quantity of third symbols used for downlink transmission is less than a quantity of fourth symbols used for uplink transmission; the uplink transmission includes HARQ-ACK transmission, and the downlink transmission includes physical downlink control channel transmission.

The transceiver module 602 is configured to send and receive information in the serving cell based on the frame structure.

Optionally, in this embodiment of the present invention, the radio frame includes 10 subframes, where a subframe 0, a subframe 4, a subframe 5, a subframe 8, and a subframe 9 are the downlink subframes, a subframe 2 and a subframe 7 are the uplink subframes, a subframe 1 and a subframe 6 are special subframes, and a subframe 3 is the first subframe; or the radio frame includes 10 subframes, where a subframe 0, a subframe 4, a subframe 5, and a subframe 9 are the downlink subframes, a subframe 2 and a subframe 7 are the uplink subframes, a subframe 1 and a subframe 6 are special subframes, and a subframe 3 and a subframe 8 are the first subframes; or the radio frame includes 10 subframes, where a subframe 0, a subframe 5, and a subframe 9 are the downlink subframes, a subframe 2 and a subframe 7 are the uplink subframes, a subframe 1 and a subframe 6 are special subframes, and a subframe 3, a subframe 4, and a subframe 8 are the first subframes; or the radio frame includes 10 subframes, where a subframe 0 and a subframe 5 are the downlink subframes, a subframe 2 and a subframe 7 are the uplink subframes, a subframe 1 and a subframe 6 are special subframes, and a subframe 3, a subframe 4, a subframe 8, and a subframe 9 are the first subframes; or the radio frame includes 10 subframes, where a subframe 5 is the downlink subframe, a subframe 2 and a subframe 7 are the uplink subframes, a subframe 1 and a subframe 6 are special subframes, and a subframe 0, a subframe 3, a subframe 4, a subframe 8, and a subframe 9 are the first subframes.

Optionally, in this embodiment of the present invention, the radio frame includes 10 subframes, where a subframe 3 and a subframe 5 are the downlink subframes, a subframe 2 and a subframe 9 are the uplink subframes, a subframe 1 and a subframe 6 are special subframes, and a subframe 0, a subframe 4, a subframe 7, and a subframe 8 are the first subframes; or the radio frame includes 10 subframes, where a subframe 5 is the downlink subframe, a subframe 2 is the uplink subframe, a subframe 6 is a special subframe, a subframe 0, a subframe 3, a subframe 4, a subframe 7, a subframe 8, and a subframe 9 are the first subframes, and a subframe 1 is the second subframe.

Optionally, in this embodiment of the present invention, the radio frame includes 10 subframes, where a subframe 5 is the downlink subframe, a subframe 2 and a subframe 9 are the uplink subframes, a subframe 1 and a subframe 6 are special subframes, and a subframe 0, a subframe 3, a subframe 4, a subframe 7, and a subframe 8 are the first subframes; or the radio frame includes 10 subframes, where a subframe 5 is the downlink subframe, a subframe 2 is the uplink subframe, a subframe 6 is a special subframe, a subframe 0, a subframe 3, a subframe 4, a subframe 7, a subframe 8, and a subframe 9 are the first subframes, and a subframe 1 is the second subframe.

Optionally, in this embodiment of the present invention, the radio frame includes 10 subframes, where a subframe 0, a subframe 4, a subframe 5, a subframe 8, and a subframe 9 are the downlink subframes, a subframe 2 and a subframe 7 are the uplink subframes, a subframe 1 and a subframe 6 are special subframes, and a subframe 3 is the first subframe; or the radio frame includes 10 subframes, where a subframe 0, a subframe 4, a subframe 5, and a subframe 9 are the downlink subframes, a subframe 2 and a subframe 7 are the uplink subframes, a subframe 1 and a subframe 6 are special subframes, and a subframe 3 and a subframe 8 are the first subframes; or the radio frame includes 10 subframes, where a subframe 4, a subframe 5, and a subframe 9 are the downlink subframes, a subframe 2 and a subframe 7 are the uplink subframes, a subframe 1 and a subframe 6 are special subframes, and a subframe 0, a subframe 3, and a subframe 8 are the first subframes.

Optionally, in this embodiment of the present invention, the radio frame includes 10 subframes, where a subframe 4, a subframe 5, and a subframe 8 are the downlink subframes, a subframe 2 and a subframe 3 are the uplink subframes, a subframe 1 and a subframe 6 are special subframes, and a subframe 0, a subframe 7, and a subframe 9 are the first subframes; or the radio frame includes 10 subframes, where a subframe 4 and a subframe 5 are the downlink subframes, a subframe 2 and a subframe 3 are the uplink subframes, a subframe 1 and a subframe 6 are special subframes, and a subframe 0, a subframe 7, a subframe 8, and a subframe 9 are the first subframes.

Optionally, in this embodiment of the present invention, the radio frame includes 10 subframes, where a subframe 0, a subframe 3, a subframe 5, a subframe 8, and a subframe 9 are the downlink subframes, a subframe 2 and a subframe 7 are the uplink subframes, a subframe 1 and a subframe 6 are special subframes, and a subframe 4 is the first subframe; or the radio frame includes 10 subframes, where a subframe 0, a subframe 3, a subframe 5, and a subframe 8 are the downlink subframes, a subframe 2 and a subframe 7 are the uplink subframes, a subframe 1 and a subframe 6 are special subframes, and a subframe 4 and a subframe 9 are the first subframes; or the radio frame includes 10 subframes, where a subframe 3, a subframe 5, and a subframe 8 are the downlink subframes, a subframe 2 and a subframe 7 are the uplink subframes, a subframe 1 and a subframe 6 are special subframes, and a subframe 0, a subframe 4, and a subframe 9 are the first subframes.

Optionally, in this embodiment of the present invention, the radio frame includes 10 subframes, where a subframe 3, a subframe 5, and a subframe 8 are the downlink subframes, a subframe 2 is the uplink subframe, a subframe 1 and a subframe 6 are special subframes, a subframe 0, a subframe 7, and a subframe 9 are the first subframes, and a subframe 4 is the second subframe; or the radio frame includes 10 subframes, where a subframe 3 and a subframe 5 are the downlink subframes, a subframe 2 is the uplink subframe, a subframe 1 and a subframe 6 are special subframes, a subframe 0, a subframe 4, a subframe 7, a subframe 8, and a subframe 9 are the first subframes, and a subframe 4 is the second subframe.

Optionally, in this embodiment of the present invention, the transceiver module 602 is specifically configured to:

receive, at a subframe n in the serving cell, a transmitted physical downlink shared channel, or a downlink control channel indicating downlink semi-persistent scheduling release, where n is an integer; and send, at a subframe n+k, a HARQ-ACK response that is corresponding to the transmitted physical downlink shared channel or the downlink control channel of the serving cell at the subframe n, where k is an integer; where when the subframe n is the first subframe or a subframe n+4 is the first subframe, k is 4.

Optionally, in this embodiment of the present invention, the transceiver module 602 is specifically configured to:

receive, at a subframe n in the serving cell, a transmitted physical downlink shared channel, or a downlink control channel indicating downlink semi-persistent scheduling release, where n is an integer; and send, at a subframe n+k, a HARQ-ACK response that is corresponding to the transmitted physical downlink shared channel or the downlink control channel of the serving cell at the subframe n, where k is an integer; where when the subframe n is the first subframe, k is 0.

Optionally, in this embodiment of the present invention, the transceiver module 602 is specifically configured to:

receive, at a subframe n in the serving cell, a transmitted physical downlink shared channel, or a downlink control channel indicating downlink semi-persistent scheduling release, where n is an integer; and send, at a subframe n+k, a HARQ-ACK response that is corresponding to the transmitted physical downlink shared channel or the downlink control channel of the serving cell at the subframe n, where k is an integer; where when a subframe n+2 is the first subframe, k is 2; when the subframe n is the first subframe and a subframe n+2 is not the downlink subframe, k is 2; or when the subframe n is the first subframe and a subframe n+2 is the downlink subframe, k is 3.

Optionally, in this embodiment of the present invention, the transceiver module 602 is specifically configured to:

receive, at a subframe n in the serving cell, a transmitted physical downlink shared channel, or a downlink control channel indicating downlink semi-persistent scheduling release, where n is an integer; and send, at a subframe n+k, a HARQ-ACK response that is corresponding to the transmitted physical downlink shared channel or the downlink control channel of the serving cell at the subframe n, where k is an integer; where when a subframe n+1 is the first subframe, k is 1; when the subframe n is the first subframe and a subframe n+1 is not the downlink subframe, k is 1; or when the subframe n is the first subframe and a subframe n+1 is the downlink subframe, k is 2.

Optionally, in this embodiment of the present invention, the transceiver module 602 is specifically configured to:

receive, at a subframe i, a downlink control channel that schedules a physical uplink shared channel; and send, at a subframe i+4 in the serving cell, the physical uplink shared channel scheduled by the downlink control channel, where i is an integer.

Optionally, in this embodiment of the present invention, the transceiver module 602 is specifically configured to:

send a physical uplink shared channel at a subframe j in the serving cell; and receive, at a subframe j+6, a HARQ-ACK corresponding to the physical uplink shared channel, where j is an integer.

Optionally, in this embodiment of the present invention, the transceiver module 602 is specifically configured to:

receive, at a subframe h, a HARQ-ACK corresponding to a physical uplink shared channel; and send, at a subframe h+4 in the serving cell, a physical uplink shared channel corresponding to the HARQ-ACK, where h is an integer.

Optionally, in this embodiment of the present invention, the transceiver module 602 is specifically configured to:

receive, at a subframe i, a downlink control channel that schedules a physical uplink shared channel; and send, at a subframe i+2 in the serving cell, the physical uplink shared channel scheduled by the downlink control channel, where i is an integer.

Optionally, in this embodiment of the present invention, the transceiver module 602 is specifically configured to:

send a physical uplink shared channel at a subframe j in the serving cell; and receive, at a subframe j+3, a HARQ-ACK corresponding to the physical uplink shared channel, where j is an integer.

Optionally, in this embodiment of the present invention, the transceiver module 602 is specifically configured to:

receive, at a subframe h, a HARQ-ACK corresponding to a physical uplink shared channel; and send, at a subframe h+2 in the serving cell, a physical uplink shared channel corresponding to the HARQ-ACK.

The user equipment in this embodiment of the present invention is user equipment corresponding to the method in the procedure shown in FIG. 2. For a specific implementation, refer to description of the method.

Figure 7:
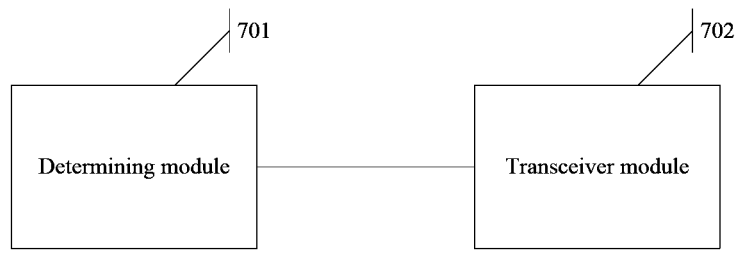
FIG. 7 is a structural block diagram of a base station according to an embodiment of the present invention.

Referring to FIG. 7, based on a same invention conception, an embodiment of the present invention provides a base station. The base station may include a determining module 701 and a transceiver module 702.

The determining module 701 is configured to determine a frame structure of a serving cell; where a radio frame corresponding to the frame structure includes at least one downlink subframe and at least one uplink subframe, and further includes at least one first subframe and/or at least one second subframe; the first subframe includes a first symbol used for downlink transmission, a first GP, and a second symbol used for uplink transmission, and the second subframe includes a third symbol used for downlink transmission, a second GP, and a fourth symbol used for uplink transmission; in the first subframe, a quantity of first symbols used for downlink transmission is greater than a quantity of second symbols used for uplink transmission, and in the second subframe, a quantity of third symbols used for downlink transmission is less than a quantity of fourth symbols used for uplink transmission; the uplink transmission includes HARQ-ACK transmission, and the downlink transmission includes physical downlink control channel transmission.

The transceiver module 702 is configured to send and receive information in the serving cell to and from user equipment based on the frame structure.

Optionally, in this embodiment of the present invention, the radio frame includes 10 subframes, where a subframe 0, a subframe 4, a subframe 5, a subframe 8, and a subframe 9 are the downlink subframes, a subframe 2 and a subframe 7 are the uplink subframes, a subframe 1 and a subframe 6 are special subframes, and a subframe 3 is the first subframe; or the radio frame includes 10 subframes, where a subframe 0, a subframe 4, a subframe 5, and a subframe 9 are the downlink subframes, a subframe 2 and a subframe 7 are the uplink subframes, a subframe 1 and a subframe 6 are special subframes, and a subframe 3 and a subframe 8 are the first subframes; or the radio frame includes 10 subframes, where a subframe 0, a subframe 5, and a subframe 9 are the downlink subframes, a subframe 2 and a subframe 7 are the uplink subframes, a subframe 1 and a subframe 6 are special subframes, and a subframe 3, a subframe 4, and a subframe 8 are the first subframes; or the radio frame includes 10 subframes, where a subframe 0 and a subframe 5 are the downlink subframes, a subframe 2 and a subframe 7 are the uplink subframes, a subframe 1 and a subframe 6 are special subframes, and a subframe 3, a subframe 4, a subframe 8, and a subframe 9 are the first subframes; or the radio frame includes 10 subframes, where a subframe 5 is the downlink subframe, a subframe 2 and a subframe 7 are the uplink subframes, a subframe 1 and a subframe 6 are special subframes, and a subframe 0, a subframe 3, a subframe 4, a subframe 8, and a subframe 9 are the first subframes.

Optionally, in this embodiment of the present invention, the radio frame includes 10 subframes, where a subframe 3 and a subframe 5 are the downlink subframes, a subframe 2 and a subframe 9 are the uplink subframes, a subframe 1 and a subframe 6 are special subframes, and a subframe 0, a subframe 4, a subframe 7, and a subframe 8 are the first subframes; or the radio frame includes 10 subframes, where a subframe 5 is the downlink subframe, a subframe 2 is the uplink subframe, a subframe 6 is a special subframe, a subframe 0, a subframe 3, a subframe 4, a subframe 7, a subframe 8, and a subframe 9 are the first subframes, and a subframe 1 is the second subframe.

Optionally, in this embodiment of the present invention, the radio frame includes 10 subframes, where a subframe 5 is the downlink subframe, a subframe 2 and a subframe 9 are the uplink subframes, a subframe 1 and a subframe 6 are special subframes, and a subframe 0, a subframe 3, a subframe 4, a subframe 7, and a subframe 8 are the first subframes; or the radio frame includes 10 subframes, where a subframe 5 is the downlink subframe, a subframe 2 is the uplink subframe, a subframe 6 is a special subframe, a subframe 0, a subframe 3, a subframe 4, a subframe 7, a subframe 8, and a subframe 9 are the first subframes, and a subframe 1 is the second subframe.

Optionally, in this embodiment of the present invention, the radio frame includes 10 subframes, where a subframe 0, a subframe 4, a subframe 5, a subframe 8, and a subframe 9 are the downlink subframes, a subframe 2 and a subframe 7 are the uplink subframes, a subframe 1 and a subframe 6 are special subframes, and a subframe 3 is the first subframe; or the radio frame includes 10 subframes, where a subframe 0, a subframe 4, a subframe 5, and a subframe 9 are the downlink subframes, a subframe 2 and a subframe 7 are the uplink subframes, a subframe 1 and a subframe 6 are special subframes, and a subframe 3 and a subframe 8 are the first subframes; or the radio frame includes 10 subframes, where a subframe 4, a subframe 5, and a subframe 9 are the downlink subframes, a subframe 2 and a subframe 7 are the uplink subframes, a subframe 1 and a subframe 6 are special subframes, and a subframe 0, a subframe 3, and a subframe 8 are the first subframes.

Optionally, in this embodiment of the present invention, the radio frame includes 10 subframes, where a subframe 4, a subframe 5, and a subframe 8 are the downlink subframes, a subframe 2 and a subframe 3 are the uplink subframes, a subframe 1 and a subframe 6 are special subframes, and a subframe 0, a subframe 7, and a subframe 9 are the first subframes; or the radio frame includes 10 subframes, where a subframe 4 and a subframe 5 are the downlink subframes, a subframe 2 and a subframe 3 are the uplink subframes, a subframe 1 and a subframe 6 are special subframes, and a subframe 0, a subframe 7, a subframe 8, and a subframe 9 are the first subframes.

Optionally, in this embodiment of the present invention, the radio frame includes 10 subframes, where a subframe 0, a subframe 3, a subframe 5, a subframe 8, and a subframe 9 are the downlink subframes, a subframe 2 and a subframe 7 are the uplink subframes, a subframe 1 and a subframe 6 are special subframes, and a subframe 4 is the first subframe; or the radio frame includes 10 subframes, where a subframe 0, a subframe 3, a subframe 5, and a subframe 8 are the downlink subframes, a subframe 2 and a subframe 7 are the uplink subframes, a subframe 1 and a subframe 6 are special subframes, and a subframe 4 and a subframe 9 are the first subframes; or the radio frame includes 10 subframes, where a subframe 3, a subframe 5, and a subframe 8 are the downlink subframes, a subframe 2 and a subframe 7 are the uplink subframes, a subframe 1 and a subframe 6 are special subframes, and a subframe 0, a subframe 4, and a subframe 9 are the first subframes.

Optionally, in this embodiment of the present invention, the radio frame includes 10 subframes, where a subframe 3, a subframe 5, and a subframe 8 are the downlink subframes, a subframe 2 is the uplink subframe, a subframe 1 and a subframe 6 are special subframes, a subframe 0, a subframe 7, and a subframe 9 are the first subframes, and a subframe 4 is the second subframe; or the radio frame includes 10 subframes, where a subframe 3 and a subframe 5 are the downlink subframes, a subframe 2 is the uplink subframe, a subframe 1 and a subframe 6 are special subframes, a subframe 0, a subframe 4, a subframe 7, a subframe 8, and a subframe 9 are the first subframes, and a subframe 4 is the second subframe.

Optionally, in this embodiment of the present invention, the transceiver module 702 is specifically configured to:

send, to the user equipment at a subframe n in the serving cell, a transmitted physical downlink shared channel, or a downlink control channel indicating downlink semi-persistent scheduling release, where n is an integer; and receive, at a subframe n+k, a HARQ-ACK response that is fed back by the user equipment and is corresponding to the transmitted physical downlink shared channel or the downlink control channel of the serving cell at the subframe n, where k is an integer; where when the subframe n is the first subframe or a subframe n+4 is the first subframe, k is 4.

Optionally, in this embodiment of the present invention, the transceiver module 702 is specifically configured to:

send, to the user equipment at a subframe n in the serving cell, a transmitted physical downlink shared channel, or a downlink control channel indicating downlink semi-persistent scheduling release, where n is an integer; and receive, at a subframe n+k, a HARQ-ACK response that is fed back by the user equipment and is corresponding to the transmitted physical downlink shared channel or the downlink control channel of the serving cell at the subframe n, where k is an integer; where when the subframe n is the first subframe, k is 0.

Optionally, in this embodiment of the present invention, the transceiver module 702 is specifically configured to:

send, to the user equipment at a subframe n in the serving cell, a transmitted physical downlink shared channel, or a downlink control channel indicating downlink semi-persistent scheduling release, where n is an integer; and receive, at a subframe n+k, a HARQ-ACK response that is fed back by the user equipment and is corresponding to the transmitted physical downlink shared channel or the downlink control channel of the serving cell at the subframe n, where k is an integer; where when a subframe n+2 is the first subframe, k is 2; when the subframe n is the first subframe and a subframe n+2 is not the downlink subframe, k is 2; or when the subframe n is the first subframe and a subframe n+2 is the downlink subframe, k is 3.

Optionally, in this embodiment of the present invention, the transceiver module 702 is specifically configured to:

send, to the user equipment at a subframe n in the serving cell, a transmitted physical downlink shared channel, or a downlink control channel indicating downlink semi-persistent scheduling release, where n is an integer; and receive, at a subframe n+k, a HARQ-ACK response that is fed back by the user equipment and is corresponding to the transmitted physical downlink shared channel or the downlink control channel of the serving cell at the subframe n, where k is an integer; where when a subframe n+1 is the first subframe, k is 1; when the subframe n is the first subframe and a subframe n+1 is not the downlink subframe, k is 1; or when the subframe n is the first subframe and a subframe n+1 is the downlink subframe, k is 2.

Optionally, in this embodiment of the present invention, the transceiver module 702 is specifically configured to:

send, to the user equipment at a subframe i, a downlink control channel that schedules a physical uplink shared channel; and receive, at a subframe i+4 in the serving cell, the physical uplink shared channel scheduled by the downlink control channel, where i is an integer.

Optionally, in this embodiment of the present invention, the transceiver module 702 is specifically configured to:

receive, at a subframe j in the serving cell, a physical uplink shared channel sent by the user equipment; and send, at a subframe j+6, a HARQ-ACK corresponding to the physical uplink shared channel, where j is an integer.

Optionally, in this embodiment of the present invention, the transceiver module 702 is specifically configured to:

send, at a subframe h, a HARQ-ACK corresponding to a physical uplink shared channel sent by the user equipment; and receive, at a subframe h+4 in the serving cell, the retransmitted physical uplink shared channel, where h is an integer.

Optionally, in this embodiment of the present invention, the transceiver module 702 is specifically configured to:

send, to the user equipment at a subframe i, a downlink control channel that schedules a physical uplink shared channel; and receive, at a subframe i+2 in the serving cell, the physical uplink shared channel scheduled by the downlink control channel, where i is an integer.

Optionally, in this embodiment of the present invention, the transceiver module 702 is specifically configured to:

receive, at a subframe j in the serving cell, a physical uplink shared channel sent by the user equipment; and send, at a subframe j+3, a HARQ-ACK corresponding to the physical uplink shared channel, where j is an integer.

Optionally, in this embodiment of the present invention, the transceiver module 702 is specifically configured to:

send, at a subframe h, a HARQ-ACK corresponding to a physical uplink shared channel sent by the user equipment; and receive, at a subframe h+2 in the serving cell, the retransmitted physical uplink shared channel, where h is an integer.

The base station in this embodiment of the present invention is a base station corresponding to the method in the procedure shown in FIG. 3. For a specific implementation, refer to description of the method.

Figure 8:
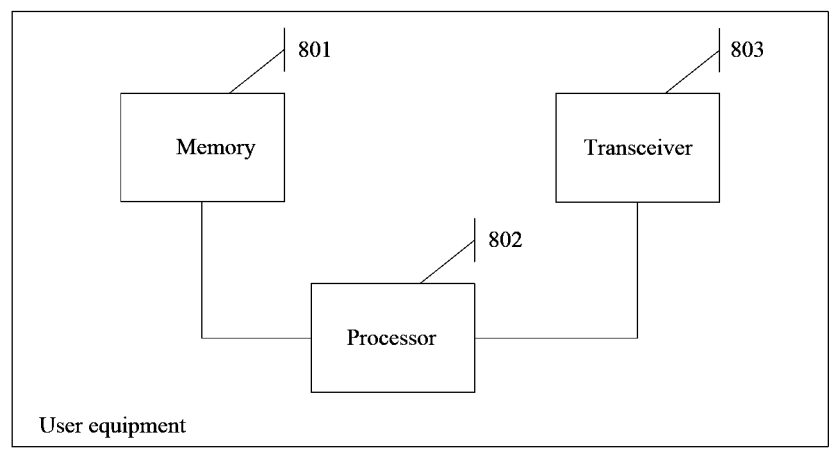
FIG. 8 is a schematic structural diagram of user equipment according to an embodiment of the present invention.

Referring to FIG. 8, based on a same invention conception, an embodiment of the present invention provides user equipment. The user equipment may include a memory 801, a processor 802, and a transceiver 803, where the memory 801 and the transceiver 803 are separately connected to the processor 802.

The memory 801 is configured to store an instruction required for executing a task by the processor 802.

The processor 802 is configured to execute the instruction stored by the memory 801, to determine a frame structure of a serving cell; where a radio frame corresponding to the frame structure includes at least one downlink subframe and at least one uplink subframe, and further includes at least one first subframe and/or at least one second subframe; the first subframe includes a first symbol used for downlink transmission, a first GP, and a second symbol used for uplink transmission, and the second subframe includes a third symbol used for downlink transmission, a second GP, and a fourth symbol used for uplink transmission; in the first subframe, a quantity of first symbols used for downlink transmission is greater than a quantity of second symbols used for uplink transmission, and in the second subframe, a quantity of third symbols used for downlink transmission is less than a quantity of fourth symbols used for uplink transmission; the uplink transmission includes HARQ-ACK transmission, and the downlink transmission includes physical downlink control channel transmission.

The transceiver module 803 is configured to send and receive information in the serving cell based on the frame structure.

Optionally, in this embodiment of the present invention, the radio frame includes 10 subframes, where a subframe 0, a subframe 4, a subframe 5, a subframe 8, and a subframe 9 are the downlink subframes, a subframe 2 and a subframe 7 are the uplink subframes, a subframe 1 and a subframe 6 are special subframes, and a subframe 3 is the first subframe; or the radio frame includes 10 subframes, where a subframe 0, a subframe 4, a subframe 5, and a subframe 9 are the downlink subframes, a subframe 2 and a subframe 7 are the uplink subframes, a subframe 1 and a subframe 6 are special subframes, and a subframe 3 and a subframe 8 are the first subframes; or the radio frame includes 10 subframes, where a subframe 0, a subframe 5, and a subframe 9 are the downlink subframes, a subframe 2 and a subframe 7 are the uplink subframes, a subframe 1 and a subframe 6 are special subframes, and a subframe 3, a subframe 4, and a subframe 8 are the first subframes; or the radio frame includes 10 subframes, where a subframe 0 and a subframe 5 are the downlink subframes, a subframe 2 and a subframe 7 are the uplink subframes, a subframe 1 and a subframe 6 are special subframes, and a subframe 3, a subframe 4, a subframe 8, and a subframe 9 are the first subframes; or the radio frame includes 10 subframes, where a subframe 5 is the downlink subframe, a subframe 2 and a subframe 7 are the uplink subframes, a subframe 1 and a subframe 6 are special subframes, and a subframe 0, a subframe 3, a subframe 4, a subframe 8, and a subframe 9 are the first subframes.

Optionally, in this embodiment of the present invention, the radio frame includes 10 subframes, where a subframe 3 and a subframe 5 are the downlink subframes, a subframe 2 and a subframe 9 are the uplink subframes, a subframe 1 and a subframe 6 are special subframes, and a subframe 0, a subframe 4, a subframe 7, and a subframe 8 are the first subframes; or the radio frame includes 10 subframes, where a subframe 5 is the downlink subframe, a subframe 2 is the uplink subframe, a subframe 6 is a special subframe, a subframe 0, a subframe 3, a subframe 4, a subframe 7, a subframe 8, and a subframe 9 are the first subframes, and a subframe 1 is the second subframe.

Optionally, in this embodiment of the present invention, the radio frame includes 10 subframes, where a subframe 5 is the downlink subframe, a subframe 2 and a subframe 9 are the uplink subframes, a subframe 1 and a subframe 6 are special subframes, and a subframe 0, a subframe 3, a subframe 4, a subframe 7, and a subframe 8 are the first subframes; or the radio frame includes 10 subframes, where a subframe 5 is the downlink subframe, a subframe 2 is the uplink subframe, a subframe 6 is a special subframe, a subframe 0, a subframe 3, a subframe 4, a subframe 7, a subframe 8, and a subframe 9 are the first subframes, and a subframe 1 is the second subframe.

Optionally, in this embodiment of the present invention, the radio frame includes 10 subframes, where a subframe 0, a subframe 4, a subframe 5, a subframe 8, and a subframe 9 are the downlink subframes, a subframe 2 and a subframe 7 are the uplink subframes, a subframe 1 and a subframe 6 are special subframes, and a subframe 3 is the first subframe; or the radio frame includes 10 subframes, where a subframe 0, a subframe 4, a subframe 5, and a subframe 9 are the downlink subframes, a subframe 2 and a subframe 7 are the uplink subframes, a subframe 1 and a subframe 6 are special subframes, and a subframe 3 and a subframe 8 are the first subframes; or the radio frame includes 10 subframes, where a subframe 4, a subframe 5, and a subframe 9 are the downlink subframes, a subframe 2 and a subframe 7 are the uplink subframes, a subframe 1 and a subframe 6 are special subframes, and a subframe 0, a subframe 3, and a subframe 8 are the first subframes.

Optionally, in this embodiment of the present invention, the radio frame includes 10 subframes, where a subframe 4, a subframe 5, and a subframe 8 are the downlink subframes, a subframe 2 and a subframe 3 are the uplink subframes, a subframe 1 and a subframe 6 are special subframes, and a subframe 0, a subframe 7, and a subframe 9 are the first subframes; or the radio frame includes 10 subframes, where a subframe 4 and a subframe 5 are the downlink subframes, a subframe 2 and a subframe 3 are the uplink subframes, a subframe 1 and a subframe 6 are special subframes, and a subframe 0, a subframe 7, a subframe 8, and a subframe 9 are the first subframes.

Optionally, in this embodiment of the present invention, the radio frame includes 10 subframes, where a subframe 0, a subframe 3, a subframe 5, a subframe 8, and a subframe 9 are the downlink subframes, a subframe 2 and a subframe 7 are the uplink subframes, a subframe 1 and a subframe 6 are special subframes, and a subframe 4 is the first subframe; or the radio frame includes 10 subframes, where a subframe 0, a subframe 3, a subframe 5, and a subframe 8 are the downlink subframes, a subframe 2 and a subframe 7 are the uplink subframes, a subframe 1 and a subframe 6 are special subframes, and a subframe 4 and a subframe 9 are the first subframes; or the radio frame includes 10 subframes, where a subframe 3, a subframe 5, and a subframe 8 are the downlink subframes, a subframe 2 and a subframe 7 are the uplink subframes, a subframe 1 and a subframe 6 are special subframes, and a subframe 0, a subframe 4, and a subframe 9 are the first subframes.

Optionally, in this embodiment of the present invention, the radio frame includes 10 subframes, where a subframe 3, a subframe 5, and a subframe 8 are the downlink subframes, a subframe 2 is the uplink subframe, a subframe 1 and a subframe 6 are special subframes, a subframe 0, a subframe 4, a subframe 7, and a subframe 9 are the first subframes, and a subframe 4 is the second subframe; or the radio frame includes 10 subframes, where a subframe 3 and a subframe 5 are the downlink subframes, a subframe 2 is the uplink subframe, a subframe 1 and a subframe 6 are special subframes, a subframe 0, a subframe 4, a subframe 7, a subframe 8, and a subframe 9 are the first subframes, and a subframe 4 is the second subframe.

Optionally, in this embodiment of the present invention, the transceiver 803 is specifically configured to:

receive, at a subframe n in the serving cell, a transmitted physical downlink shared channel, or a downlink control channel indicating downlink semi-persistent scheduling release, where n is an integer; and send, at a subframe n+k, a HARQ-ACK response that is corresponding to the transmitted physical downlink shared channel or the downlink control channel of the serving cell at the subframe n, where k is an integer; where when the subframe n is the first subframe or a subframe n+4 is the first subframe, k is 4.

Optionally, in this embodiment of the present invention, the transceiver 803 is specifically configured to:

receive, at a subframe n in the serving cell, a transmitted physical downlink shared channel, or a downlink control channel indicating downlink semi-persistent scheduling release, where n is an integer; and send, at a subframe n+k, a HARQ-ACK response that is corresponding to the transmitted physical downlink shared channel or the downlink control channel of the serving cell at the subframe n, where k is an integer; where when the subframe n is the first subframe, k is 0.

Optionally, in this embodiment of the present invention, the transceiver 803 is specifically configured to:

receive, at a subframe n in the serving cell, a transmitted physical downlink shared channel, or a downlink control channel indicating downlink semi-persistent scheduling release, where n is an integer; and send, at a subframe n+k, a HARQ-ACK response that is corresponding to the transmitted physical downlink shared channel or the downlink control channel of the serving cell at the subframe n, where k is an integer; where when a subframe n+2 is the first subframe, k is 2; when the subframe n is the first subframe and a subframe n+2 is not the downlink subframe, k is 2; or when the subframe n is the first subframe and a subframe n+2 is the downlink subframe, k is 3.

Optionally, in this embodiment of the present invention, the transceiver 803 is specifically configured to:

receive, at a subframe n in the serving cell, a transmitted physical downlink shared channel, or a downlink control channel indicating downlink semi-persistent scheduling release, where n is an integer; and send, at a subframe n+k, a HARQ-ACK response that is corresponding to the transmitted physical downlink shared channel or the downlink control channel of the serving cell at the subframe n, where k is an integer; where when a subframe n+1 is the first subframe, k is 1; when the subframe n is the first subframe and a subframe n+1 is not the downlink subframe, k is 1; or when the subframe n is the first subframe and a subframe n+1 is the downlink subframe, k is 2.

Optionally, in this embodiment of the present invention, the transceiver 803 is specifically configured to:

receive, at a subframe i, a downlink control channel that schedules a physical uplink shared channel; and send, at a subframe i+4 in the serving cell, the physical uplink shared channel scheduled by the downlink control channel, where i is an integer.

Optionally, in this embodiment of the present invention, the transceiver 803 is specifically configured to:

send a physical uplink shared channel at a subframe j in the serving cell; and receive, at a subframe j+6, a HARQ-ACK corresponding to the physical uplink shared channel, where j is an integer.

Optionally, in this embodiment of the present invention, the transceiver 803 is specifically configured to:

receive, at a subframe h, a HARQ-ACK corresponding to a physical uplink shared channel; and send, at a subframe h+4 in the serving cell, a physical uplink shared channel corresponding to the HARQ-ACK, where h is an integer.

Optionally, in this embodiment of the present invention, the transceiver 803 is specifically configured to:

receive, at a subframe i, a downlink control channel that schedules a physical uplink shared channel; and send, at a subframe i+2 in the serving cell, the physical uplink shared channel scheduled by the downlink control channel, where i is an integer.

Optionally, in this embodiment of the present invention, the transceiver 803 is specifically configured to:

send a physical uplink shared channel at a subframe j in the serving cell; and receive, at a subframe j+3, a HARQ-ACK corresponding to the physical uplink shared channel, where j is an integer.

Optionally, in this embodiment of the present invention, the transceiver 803 is specifically configured to:

receive, at a subframe h, a HARQ-ACK corresponding to a physical uplink shared channel; and send, at a subframe h+2 in the serving cell, a physical uplink shared channel corresponding to the HARQ-ACK.

The user equipment in this embodiment of the present invention is user equipment corresponding to the method in the procedure shown in FIG. 2. For a specific implementation, refer to description of the method.

Figure 9:
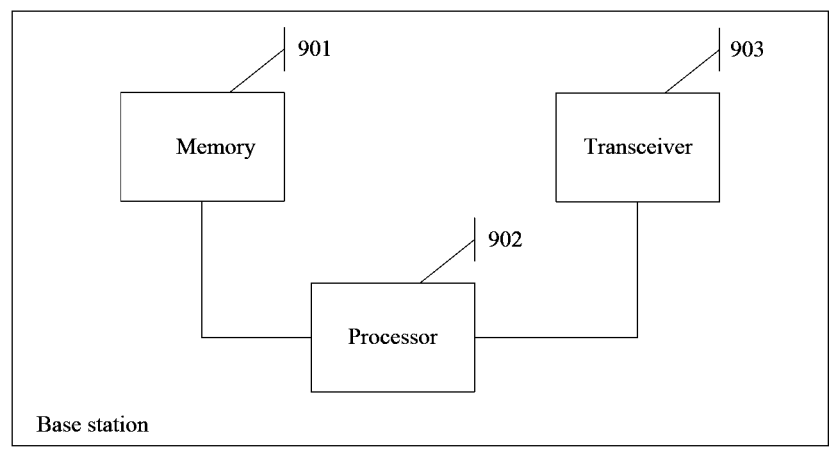
FIG. 9 is a schematic structural diagram of a base station according to an embodiment in the present invention.

Referring to FIG. 9, based on a same invention conception, an embodiment of the present invention provides a base station. The base station may include a memory 901, a processor 902, and a transceiver 903, where the memory 901 and the transceiver 903 are separately connected to the processor 902.

The memory 901 is configured to store an instruction required for executing a task by the processor 902.

The processor 902 is configured to execute the instruction stored by the memory 901, to determine a frame structure of a serving cell; where a radio frame corresponding to the frame structure includes at least one downlink subframe and at least one uplink subframe, and further includes at least one first subframe and/or at least one second subframe; the first subframe includes a first symbol used for downlink transmission, a first GP, and a second symbol used for uplink transmission, and the second subframe includes a third symbol used for downlink transmission, a second GP, and a fourth symbol used for uplink transmission; in the first subframe, a quantity of first symbols used for downlink transmission is greater than a quantity of second symbols used for uplink transmission, and in the second subframe, a quantity of third symbols used for downlink transmission is less than a quantity of fourth symbols used for uplink transmission; the uplink transmission includes HARQ-ACK transmission, and the downlink transmission includes physical downlink control channel transmission.

The transceiver 903 is configured to send and receive information in the serving cell to and from user equipment based on the frame structure.

Optionally, in this embodiment of the present invention, the radio frame includes 10 subframes, where a subframe 0, a subframe 4, a subframe 5, a subframe 8, and a subframe 9 are the downlink subframes, a subframe 2 and a subframe 7 are the uplink subframes, a subframe 1 and a subframe 6 are special subframes, and a subframe 3 is the first subframe; or the radio frame includes 10 subframes, where a subframe 0, a subframe 4, a subframe 5, and a subframe 9 are the downlink subframes, a subframe 2 and a subframe 7 are the uplink subframes, a subframe 1 and a subframe 6 are special subframes, and a subframe 3 and a subframe 8 are the first subframes; or the radio frame includes 10 subframes, where a subframe 0, a subframe 5, and a subframe 9 are the downlink subframes, a subframe 2 and a subframe 7 are the uplink subframes, a subframe 1 and a subframe 6 are special subframes, and a subframe 3, a subframe 4, and a subframe 8 are the first subframes; or the radio frame includes 10 subframes, where a subframe 0 and a subframe 5 are the downlink subframes, a subframe 2 and a subframe 7 are the uplink subframes, a subframe 1 and a subframe 6 are special subframes, and a subframe 3, a subframe 4, a subframe 8, and a subframe 9 are the first subframes; or the radio frame includes 10 subframes, where a subframe 5 is the downlink subframe, a subframe 2 and a subframe 7 are the uplink subframes, a subframe 1 and a subframe 6 are special subframes, and a subframe 0, a subframe 3, a subframe 4, a subframe 8, and a subframe 9 are the first subframes.

Optionally, in this embodiment of the present invention, the radio frame includes 10 subframes, where a subframe 3 and a subframe 5 are the downlink subframes, a subframe 2 and a subframe 9 are the uplink subframes, a subframe 1 and a subframe 6 are special subframes, and a subframe 0, a subframe 4, a subframe 7, and a subframe 8 are the first subframes; or the radio frame includes 10 subframes, where a subframe 5 is the downlink subframe, a subframe 2 is the uplink subframe, a subframe 6 is a special subframe, a subframe 0, a subframe 3, a subframe 4, a subframe 7, a subframe 8, and a subframe 9 are the first subframes, and a subframe 1 is the second subframe.

Optionally, in this embodiment of the present invention, the radio frame includes 10 subframes, where a subframe 5 is the downlink subframe, a subframe 2 and a subframe 9 are the uplink subframes, a subframe 1 and a subframe 6 are special subframes, and a subframe 0, a subframe 3, a subframe 4, a subframe 7, and a subframe 8 are the first subframes; or the radio frame includes 10 subframes, where a subframe 5 is the downlink subframe, a subframe 2 is the uplink subframe, a subframe 6 is a special subframe, a subframe 0, a subframe 3, a subframe 4, a subframe 7, a subframe 8, and a subframe 9 are the first subframes, and a subframe 1 is the second subframe.

Optionally, in this embodiment of the present invention, the radio frame includes 10 subframes, where a subframe 0, a subframe 4, a subframe 5, a subframe 8, and a subframe 9 are the downlink subframes, a subframe 2 and a subframe 7 are the uplink subframes, a subframe 1 and a subframe 6 are special subframes, and a subframe 3 is the first subframe; or the radio frame includes 10 subframes, where a subframe 0, a subframe 4, a subframe 5, and a subframe 9 are the downlink subframes, a subframe 2 and a subframe 7 are the uplink subframes, a subframe 1 and a subframe 6 are special subframes, and a subframe 3 and a subframe 8 are the first subframes; or the radio frame includes 10 subframes, where a subframe 4, a subframe 5, and a subframe 9 are the downlink subframes, a subframe 2 and a subframe 7 are the uplink subframes, a subframe 1 and a subframe 6 are special subframes, and a subframe 0, a subframe 3, and a subframe 8 are the first subframes.

Optionally, in this embodiment of the present invention, the radio frame includes 10 subframes, where a subframe 4, a subframe 5, and a subframe 8 are the downlink subframes, a subframe 2 and a subframe 3 are the uplink subframes, a subframe 1 and a subframe 6 are special subframes, and a subframe 0, a subframe 7, and a subframe 9 are the first subframes; or the radio frame includes 10 subframes, where a subframe 4 and a subframe 5 are the downlink subframes, a subframe 2 and a subframe 3 are the uplink subframes, a subframe 1 and a subframe 6 are special subframes, and a subframe 0, a subframe 7, a subframe 8, and a subframe 9 are the first subframes.

Optionally, in this embodiment of the present invention, the radio frame includes 10 subframes, where a subframe 0, a subframe 3, a subframe 5, a subframe 8, and a subframe 9 are the downlink subframes, a subframe 2 and a subframe 7 are the uplink subframes, a subframe 1 and a subframe 6 are special subframes, and a subframe 4 is the first subframe; or the radio frame includes 10 subframes, where a subframe 0, a subframe 3, a subframe 5, and a subframe 8 are the downlink subframes, a subframe 2 and a subframe 7 are the uplink subframes, a subframe 1 and a subframe 6 are special subframes, and a subframe 4 and a subframe 9 are the first subframes; or the radio frame includes 10 subframes, where a subframe 3, a subframe 5, and a subframe 8 are the downlink subframes, a subframe 2 and a subframe 7 are the uplink subframes, a subframe 1 and a subframe 6 are special subframes, and a subframe 0, a subframe 4, and a subframe 9 are the first subframes.

Optionally, in this embodiment of the present invention, the radio frame includes 10 subframes, where a subframe 3, a subframe 5, and a subframe 8 are the downlink subframes, a subframe 2 is the uplink subframe, a subframe 1 and a subframe 6 are special subframes, a subframe 0, a subframe 4, a subframe 7, and a subframe 9 are the first subframes, and a subframe 4 is the second subframe; or the radio frame includes 10 subframes, where a subframe 3 and a subframe 5 are the downlink subframes, a subframe 2 is the uplink subframe, a subframe 1 and a subframe 6 are special subframes, a subframe 0, a subframe 4, a subframe 7, a subframe 8, and a subframe 9 are the first subframes, and a subframe 4 is the second subframe.

Optionally, in this embodiment of the present invention, the transceiver 903 is specifically configured to:

send, to the user equipment at a subframe n in the serving cell, a transmitted physical downlink shared channel, or a downlink control channel indicating downlink semi-persistent scheduling release, where n is an integer; and receive, at a subframe n+k, a HARQ-ACK response that is fed back by the user equipment and is corresponding to the transmitted physical downlink shared channel or the downlink control channel of the serving cell at the subframe n, where k is an integer; where when the subframe n is the first subframe or a subframe n+4 is the first subframe, k is 4.

Optionally, in this embodiment of the present invention, the transceiver 903 is specifically configured to:

send, to the user equipment at a subframe n in the serving cell, a transmitted physical downlink shared channel, or a downlink control channel indicating downlink semi-persistent scheduling release, where n is an integer; and receive, at a subframe n+k, a HARQ-ACK response that is fed back by the user equipment and is corresponding to the transmitted physical downlink shared channel or the downlink control channel of the serving cell at the subframe n, where k is an integer; where when the subframe n is the first subframe, k is 0.

Optionally, in this embodiment of the present invention, the transceiver 903 is specifically configured to:

send, to the user equipment at a subframe n in the serving cell, a transmitted physical downlink shared channel, or a downlink control channel indicating downlink semi-persistent scheduling release, where n is an integer; and receive, at a subframe n+k, a HARQ-ACK response that is fed back by the user equipment and is corresponding to the transmitted physical downlink shared channel or the downlink control channel of the serving cell at the subframe n, where k is an integer; where when a subframe n+2 is the first subframe, k is 2; when the subframe n is the first subframe and a subframe n+2 is not the downlink subframe, k is 2; or when the subframe n is the first subframe and a subframe n+2 is the downlink subframe, k is 3.

Optionally, in this embodiment of the present invention, the transceiver 903 is specifically configured to:

send, to the user equipment at a subframe n in the serving cell, a transmitted physical downlink shared channel, or a downlink control channel indicating downlink semi-persistent scheduling release, where n is an integer; and receive, at a subframe n+k, a HARQ-ACK response that is fed back by the user equipment and is corresponding to the transmitted physical downlink shared channel or the downlink control channel of the serving cell at the subframe n, where k is an integer; where when a subframe n+1 is the first subframe, k is 1; when the subframe n is the first subframe and a subframe n+1 is not the downlink subframe, k is 1; or when the subframe n is the first subframe and a subframe n+1 is the downlink subframe, k is 2.

Optionally, in this embodiment of the present invention, the transceiver 903 is specifically configured to:

send, to the user equipment at a subframe i, a downlink control channel that schedules a physical uplink shared channel; and receive, at a subframe i+4 in the serving cell, the physical uplink shared channel scheduled by the downlink control channel, where i is an integer.

Optionally, in this embodiment of the present invention, the transceiver 903 is specifically configured to:

receive, at a subframe j in the serving cell, a physical uplink shared channel sent by the user equipment; and send, at a subframe j+6, a HARQ-ACK corresponding to the physical uplink shared channel, where j is an integer.

Optionally, in this embodiment of the present invention, the transceiver 903 is specifically configured to:

send, at a subframe h, a HARQ-ACK corresponding to a physical uplink shared channel sent by the user equipment; and receive, at a subframe h+4 in the serving cell, the retransmitted physical uplink shared channel, where h is an integer.

Optionally, in this embodiment of the present invention, the transceiver 903 is specifically configured to:

send, to the user equipment at a subframe i, a downlink control channel that schedules a physical uplink shared channel; and receive, at a subframe i+2 in the serving cell, the physical uplink shared channel scheduled by the downlink control channel, where i is an integer.

Optionally, in this embodiment of the present invention, the transceiver 903 is specifically configured to:

receive, at a subframe j in the serving cell, a physical uplink shared channel sent by the user equipment; and send, at a subframe j+3, a HARQ-ACK corresponding to the physical uplink shared channel, where j is an integer.

Optionally, in this embodiment of the present invention, the transceiver 903 is specifically configured to:

send, at a subframe h, a HARQ-ACK corresponding to a physical uplink shared channel sent by the user equipment; and receive, at a subframe h+2 in the serving cell, the retransmitted physical uplink shared channel, where h is an integer.

The base station in this embodiment of the present invention is a base station corresponding to the method in the procedure shown in FIG. 2. For a specific implementation, refer to description of the method.

In the embodiments of the present invention, user equipment may determine a frame structure of a serving cell, where in addition to an uplink subframe and a downlink subframe, the frame structure in the embodiments of the present invention further includes a first subframe, and the first subframe includes a first symbol used for downlink transmission, a first GP, and a second symbol used for uplink transmission. More symbols used for uplink transmission than those in a frame structure in the prior art are introduced by introducing the first subframe, and the symbols used for uplink transmission may be used for a HARQ-ACK feedback, thereby improving downlink transmission and effectively reducing a value of k, that is, reducing a service delay.

In addition, the first subframe introduced in the embodiments of the present invention may be used to transmit a HARQ-ACK, and the first subframe replaces some existing subframes in Table 1, and it is possible that the some existing subframes cannot be used to transmit the HARQ-ACK. Therefore, after the technical solutions in the embodiments of the present invention are used, more subframes can be used to transmit the HARQ-ACK, so as to minimize a quantity of HARQ-ACKs that need to be fed back at one uplink subframe, thereby simplifying a HARQ-ACK feedback mechanism and improving HARQ-ACK feedback performance.

It may be clearly understood by a person skilled in the art that, for the purpose of convenient and brief description, division of the foregoing function units is taken as an example for illustration. In actual application, the foregoing functions can be allocated to different function units and implemented according to a requirement, that is, an inner structure of an apparatus is divided into different function units to implement all or part of the functions described above. For a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present application essentially, or the part contributing to the prior art, or all or a part of the technical solutions may be implemented in the form of a software product. The software product is stored in a storage medium and includes several instructions for instructing a computer device (which may be a personal computer, a server, or a network device) or a processor to perform all or a part of the steps of the methods described in the embodiments of the present application. The foregoing storage medium includes: any medium that can store program code, such as a USB flash drive, a removable hard disk, a ROM (read-only memory), a RAM (random access memory), a magnetic disk, or an optical disc.

The foregoing embodiments are merely used to describe the technical solutions of the present application. The foregoing embodiments are merely intended to help understand the method and core idea of the present invention, and shall not be construed as a limitation on the present invention. Any variation or replacement readily figured out by a person skilled in the art within the technical scope disclosed in the present invention shall fall within the protection scope of the present invention.

What is claimed is:

1. A method for sending and receiving information in a time division duplex (TDD) system, comprising:

determining, by user equipment of the TDD system, a radio frame structure of a serving cell; wherein a radio frame corresponding to the radio frame structure comprises:
　at least one downlink subframe;
　at least one uplink subframe;
　at least one of: at least one first subframe, and at least one second subframe;
　　wherein the first subframe comprises a first symbol used for downlink transmission, a first guard period (GP), and a second symbol used for uplink transmission, and
　　wherein the second subframe comprises a third symbol used for downlink transmission, a second GP, and a fourth symbol used for uplink transmission,
　　wherein in the first subframe, a quantity of first symbols used for downlink transmission is greater than a quantity of second symbols used for uplink transmission, and in the second subframe, a quantity of third symbols used for downlink transmission is less than a quantity of fourth symbols used for uplink transmission and the uplink transmission comprises a hybrid automatic repeat request-acknowledgment (HARQ-ACK) transmission, and the downlink transmission comprises a physical downlink control channel transmission;
sending, by the user equipment, information in the serving cell based on the frame structure; and
receiving, by the user equipment, information in the serving cell based on the frame structure, wherein information in the serving cell is sent and received based on the frame structure according to a HARQ uplink timing in LTE Release 12 and an earlier release to provide backward compatibility.

2. The method according to claim 1, wherein the radio frame structure comprises one of:
　ten subframes, wherein a subframe 0, a subframe 4, a subframe 5, a subframe 8, and a subframe 9 are the downlink subframes, a subframe 2 and a subframe 7 are the uplink subframes, a subframe 1 and a subframe 6 are special subframes, and a subframe 3 is the first subframe;
　ten subframes, wherein a subframe 0, a subframe 4, a subframe 5, and a subframe 9 are the downlink subframes, a subframe 2 and a subframe 7 are the uplink subframes, a subframe 1 and a subframe 6 are special subframes, and a subframe 3 and a subframe 8 are the first subframes;
　ten subframes, wherein a subframe 0, a subframe 5, and a subframe 9 are the downlink subframes, a subframe 2 and a subframe 7 are the uplink subframes, a subframe 1 and a subframe 6 are special subframes, and a subframe 3, a subframe 4, and a subframe 8 are the first subframes;
　ten subframes, wherein a subframe 0 and a subframe 5 are the downlink subframes, a subframe 2 and a subframe 7 are the uplink subframes, a subframe 1 and a subframe 6 are special subframes, and a subframe 3, a subframe 4, a subframe 8, and a subframe 9 are the first subframes; and
　ten subframes, wherein a subframe 5 is the downlink subframe, a subframe 2 and a subframe 7 are the uplink subframes, a subframe 1 and a subframe 6 are special subframes, and a subframe 0, a subframe 3, a subframe 4, a subframe 8, and a subframe 9 are the first subframes.

3. A method for sending and receiving information in a time division duplex (TDD) system, comprising:
determining, by a base station of the TDD system, a radio frame structure of a serving cell; wherein a radio frame corresponding to the radio frame structure comprises:
　at least one downlink subframe;
　at least one uplink subframe;
　at least one of: at least one first subframe, and at least one second subframe;
　　wherein the first subframe comprises a first symbol used for downlink transmission, a first guard period (GP), and a second symbol used for uplink transmission, and
　　wherein the second subframe comprises a third symbol used for downlink transmission, a second GP, and a fourth symbol used for uplink transmission,
　　wherein in the first subframe, a quantity of first symbols used for downlink transmission is greater than a quantity of second symbols used for uplink transmission, and in the second subframe, a quantity of third symbols used for downlink transmission is less than a quantity of fourth symbols used for uplink transmission and the uplink transmission comprises a hybrid automatic repeat request-acknowledgment (HARQ-ACK) transmission, and the downlink transmission comprises a physical downlink control channel transmission;
sending, by the base station, information in the serving cell based on the frame structure; and
receiving, by the base station, information in the serving cell based on the frame structure, wherein information in the serving cell is sent and received based on the frame structure according to a HARQ uplink timing in LTE Release 12 and an earlier release to provide backward compatibility.

4. The method according to claim 3, wherein the radio frame structure comprises one of:
　ten subframes, wherein a subframe 0, a subframe 4, a subframe 5, a subframe 8, and a subframe 9 are the downlink subframes, a subframe 2 and a subframe 7 are the uplink subframes, a subframe 1 and a subframe 6 are special subframes, and a subframe 3 is the first subframe;
　ten subframes, wherein a subframe 0, a subframe 4, a subframe 5, and a subframe 9 are the downlink subframes, a subframe 2 and a subframe 7 are the uplink subframes, a subframe 1 and a subframe 6 are special subframes, and a subframe 3 and a subframe 8 are the first subframes;
　ten subframes, wherein a subframe 0, a subframe 5, and a subframe 9 are the downlink subframes, a subframe 2 and a subframe 7 are the uplink subframes, a subframe 1 and a subframe 6 are special subframes, and a subframe 3, a subframe 4, and a subframe 8 are the first subframes;
　ten subframes, wherein a subframe 0 and a subframe 5 are the downlink subframes, a subframe 2 and a subframe 7 are the uplink subframes, a subframe 1 and a subframe 6 are special subframes, and a subframe 3, a subframe 4, a subframe 8, and a subframe 9 are the first subframes; and
　ten subframes, wherein a subframe 5 is the downlink subframe, a subframe 2 and a subframe 7 are the uplink subframes, a subframe 1 and a subframe 6 are special subframes, and a subframe 0, a subframe 3, a subframe 4, a subframe 8, and a subframe 9 are the first subframes.

5. A user equipment for sending and receiving information in a time division duplex (TDD) system, comprising:
a processor;
a nontransitory computer-readable medium storing computer executable instructions, that when executed by the processor, determine a radio frame structure of a serving cell of the TDD system; wherein a radio frame corresponding to the radio frame structure comprises
at least one downlink subframe;
at least one uplink subframe;
at least one of: at least one first subframe, and at least one second subframe;
wherein the first subframe comprises a first symbol used for downlink transmission, a first guard period (GP), and a second symbol used for uplink transmission, and
wherein the second subframe comprises a third symbol used for downlink transmission, a second GP, and a fourth symbol used for uplink transmission,
wherein in the first subframe, a quantity of first symbols used for downlink transmission is greater than a quantity of second symbols used for uplink transmission, and in the second subframe, a quantity of third symbols used for downlink transmission is less than a quantity of fourth symbols used for uplink transmission and the uplink transmission comprises a hybrid automatic repeat request-acknowledgment (HARQ-ACK) transmission, and the downlink transmission comprises a physical downlink control channel transmission; and
a transceiver, configured to send information in the serving cell based on the frame structure and configured to receive information in the serving cell based on the frame structure, wherein information in the serving cell is sent and received based on the frame structure according to a HARQ uplink timing in LTE Release 12 and an earlier release to provide backward compatibility.

6. The user equipment according to claim 5, wherein the radio frame structure comprises one of:
ten subframes, wherein a subframe 0, a subframe 4, a subframe 5, a subframe 8, and a subframe 9 are the downlink subframes, a subframe 2 and a subframe 7 are the uplink subframes, a subframe 1 and a subframe 6 are special subframes, and a subframe 3 is the first subframe;
ten subframes, wherein a subframe 0, a subframe 4, a subframe 5, and a subframe 9 are the downlink subframes, a subframe 2 and a subframe 7 are the uplink subframes, a subframe 1 and a subframe 6 are special subframes, and a subframe 3 and a subframe 8 are the first subframes;
ten subframes, wherein a subframe 0, a subframe 5, and a subframe 9 are the downlink subframes, a subframe 2 and a subframe 7 are the uplink subframes, a subframe 1 and a subframe 6 are special subframes, and a subframe 3, a subframe 4, and a subframe 8 are the first subframes;
ten subframes, wherein a subframe 0 and a subframe 5 are the downlink subframes, a subframe 2 and a subframe 7 are the uplink subframes, a subframe 1 and a subframe 6 are special subframes, and a subframe 3, a subframe 4, a subframe 8, and a subframe 9 are the first subframes; and
ten subframes, wherein a subframe 5 is the downlink subframe, a subframe 2 and a subframe 7 are the uplink subframes, a subframe 1 and a subframe 6 are special subframes, and a subframe 0, a subframe 3, a subframe 4, a subframe 8, and a subframe 9 are the first subframes.

7. The user equipment according to claim 5, wherein the radio frame structure comprises one of:
ten subframes, wherein a subframe 3 and a subframe 5 are the downlink subframes, a subframe 2 and a subframe 9 are the uplink subframes, a subframe 1 and a subframe 6 are special subframes, and a subframe 0, a subframe 4, a subframe 7, and a subframe 8 are the first subframes; and
ten subframes, wherein a subframe 5 is the downlink subframe, a subframe 2 is the uplink subframe, a subframe 6 is a special subframe, a subframe 0, a subframe 3, a subframe 4, a subframe 7, a subframe 8, and a subframe 9 are the first subframes, and a subframe 1 is the second subframe.

8. The user equipment according to claim 5, wherein the radio frame structure comprises one of:
the radio frame comprises ten subframes, wherein a subframe 5 is the downlink subframe, a subframe 2 and a subframe 9 are the uplink subframes, a subframe 1 and a subframe 6 are special subframes, and a subframe 0, a subframe 3, a subframe 4, a subframe 7, and a subframe 8 are the first subframes; and
the radio frame comprises ten subframes, wherein a subframe 5 is the downlink subframe, a subframe 2 is the uplink subframe, a subframe 6 is a special subframe, a subframe 0, a subframe 3, a subframe 4, a subframe 7, a subframe 8, and a subframe 9 are the first subframes, and a subframe 1 is the second subframe.

9. The user equipment according to claim 5, wherein the radio frame structure comprises one of:
ten subframes, wherein a subframe 0, a subframe 4, a subframe 5, a subframe 8, and a subframe 9 are the downlink subframes, a subframe 2 and a subframe 7 are the uplink subframes, a subframe 1 and a subframe 6 are special subframes, and a subframe 3 is the first subframe;
ten subframes, wherein a subframe 0, a subframe 4, a subframe 5, and a subframe 9 are the downlink subframes, a subframe 2 and a subframe 7 are the uplink subframes, a subframe 1 and a subframe 6 are special subframes, and a subframe 3 and a subframe 8 are the first subframes; and
ten subframes, wherein a subframe 4, a subframe 5, and a subframe 9 are the downlink subframes, a subframe 2 and a subframe 7 are the uplink subframes, a subframe 1 and a subframe 6 are special subframes, and a subframe 0, a subframe 3, and a subframe 8 are the first subframes.

10. The user equipment according to claim 5, wherein the radio frame structure comprises one of:
ten subframes, wherein a subframe 4, a subframe 5, and a subframe 8 are the downlink subframes, a subframe 2 and a subframe 3 are the uplink subframes, a subframe 1 and a subframe 6 are special subframes, and a subframe 0, a subframe 7, and a subframe 9 are the first subframes; and
ten subframes, wherein a subframe 4 and a subframe 5 are the downlink subframes, a subframe 2 and a subframe 3 are the uplink subframes, a subframe 1 and a subframe 6 are special subframes, and a subframe 0, a subframe 7, a subframe 8, and a subframe 9 are the first subframes.

11. The user equipment according to claim 5, wherein the radio frame structure comprises one of:

ten subframes, wherein a subframe 0, a subframe 3, a subframe 5, a subframe 8, and a subframe 9 are the downlink subframes, a subframe 2 and a subframe 7 are the uplink subframes, a subframe 1 and a subframe 6 are special subframes, and a subframe 4 is the first subframe;

ten subframes, wherein a subframe 0, a subframe 3, a subframe 5, and a subframe 8 are the downlink subframes, a subframe 2 and a subframe 7 are the uplink subframes, a subframe 1 and a subframe 6 are special subframes, and a subframe 4 and a subframe 9 are the first subframes; and ten subframes, wherein a subframe 3, a subframe 5, and a subframe 8 are the downlink subframes, a subframe 2 and a subframe 7 are the uplink subframes, a subframe 1 and a subframe 6 are special subframes, and a subframe 0, a subframe 4, and a subframe 9 are the first subframes.

12. The user equipment according to claim 5, wherein the radio frame structure comprises one of:
ten subframes, wherein:
  a subframe 3, a subframe 5, and a subframe 8 are the downlink subframes;
  a subframe 2 is the uplink subframe;
  a subframe 1 and a subframe 6 are special subframes;
  a subframe 0, a subframe 7, and a subframe 9 are the first subframes; and
  a subframe 4 is the second subframe; and
ten subframes, wherein:
  a subframe 0 and a subframe 5 are the downlink subframes;
  a subframe 2, a subframe 3, a subframe 7, a subframe 8, and a subframe 9 are the uplink subframes;
  a subframe 1 and a subframe 6 are special subframes; and
  a subframe 4 is the second subframe.

13. A base station for sending and receiving information in a time division duplex (TDD) system, comprising:
a processor;
a nontransitory computer-readable medium storing computer executable instructions, that when executed by the processor, determine a radio frame structure of a serving cell of the TDD system; wherein a radio frame corresponding to the radio frame structure comprises
  at least one downlink subframe;
  at least one uplink subframe;
  at least one of: at least one first subframe, and at least one second subframe;
    wherein the first subframe comprises a first symbol used for downlink transmission, a first guard period (GP), and a second symbol used for uplink transmission, and
    wherein the second subframe comprises a third symbol used for downlink transmission, a second GP, and a fourth symbol used for uplink transmission,
wherein in the first subframe, a quantity of first symbols used for downlink transmission is greater than a quantity of second symbols used for uplink transmission, and in the second subframe, a quantity of third symbols used for downlink transmission is less than a quantity of fourth symbols used for uplink transmission and the uplink transmission comprises a hybrid automatic repeat request-acknowledgment (HARQ-ACK) transmission, and the downlink transmission comprises a physical downlink control channel transmission; and
a transceiver, configured to send information in the serving cell based on the frame structure and configured to receive information in the serving cell based on the frame structure, wherein information in the serving cell is sent and received based on the frame structure according to a HARQ uplink timing in LTE Release 12 and an earlier release to provide backward compatibility.

14. The base station according to claim 13, wherein the radio frame structure comprises one of:
ten subframes, wherein a subframe 0, a subframe 4, a subframe 5, a subframe 8, and a subframe 9 are the downlink subframes, a subframe 2 and a subframe 7 are the uplink subframes, a subframe 1 and a subframe 6 are special subframes, and a subframe 3 is the first subframe;

ten subframes, wherein a subframe 0, a subframe 4, a subframe 5, and a subframe 9 are the downlink subframes, a subframe 2 and a subframe 7 are the uplink subframes, a subframe 1 and a subframe 6 are special subframes, and a subframe 3 and a subframe 8 are the first subframes;

ten subframes, wherein a subframe 0, a subframe 5, and a subframe 9 are the downlink subframes, a subframe 2 and a subframe 7 are the uplink subframes, a subframe 1 and a subframe 6 are special subframes, and a subframe 3, a subframe 4, and a subframe 8 are the first subframes;

ten subframes, wherein a subframe 0 and a subframe 5 are the downlink subframes, a subframe 2 and a subframe 7 are the uplink subframes, a subframe 1 and a subframe 6 are special subframes, and a subframe 3, a subframe 4, a subframe 8, and a subframe 9 are the first subframes; and ten subframes, wherein a subframe 5 is the downlink subframe, a subframe 2 and a subframe 7 are the uplink subframes, a subframe 1 and a subframe 6 are special subframes, and a subframe 0, a subframe 3, a subframe 4, a subframe 8, and a subframe 9 are the first subframes.

15. The base station according to claim 13, wherein the radio frame structure comprises one of:
ten subframes, wherein a subframe 3 and a subframe 5 are the downlink subframes, a subframe 2 and a subframe 9 are the uplink subframes, a subframe 1 and a subframe 6 are special subframes, and a subframe 0, a subframe 4, a subframe 7, and a subframe 8 are the first subframes; and ten subframes, wherein a subframe 5 is the downlink subframe, a subframe 2 is the uplink subframe, a subframe 6 is a special subframe, a subframe 0, a subframe 3, a subframe 4, a subframe 7, a subframe 8, and a subframe 9 are the first subframes, and a subframe 1 is the second subframe.

16. The base station according to claim 13, wherein the radio frame structure comprises one of:
ten subframes, wherein a subframe 5 is the downlink subframe, a subframe 2 and a subframe 9 are the uplink subframes, a subframe 1 and a subframe 6 are special subframes, and a subframe 0, a subframe 3, a subframe 4, a subframe 7, and a subframe 8 are the first subframes; and ten subframes, wherein a subframe 5 is the downlink subframe, a subframe 2 is the uplink subframe, a subframe 6 is a special subframe, a subframe 0, a subframe 3, a subframe 4, a subframe 7, a subframe 8, and a subframe 9 are the first subframes, and a subframe 1 is the second subframe.

17. The base station according to claim 13, wherein the radio frame structure comprises one of:
- ten subframes, wherein a subframe 0, a subframe 4, a subframe 5, a subframe 8, and a subframe 9 are the downlink subframes, a subframe 2 and a subframe 7 are the uplink subframes, a subframe 1 and a subframe 6 are special subframes, and a subframe 3 is the first subframe;
- ten subframes, wherein a subframe 0, a subframe 4, a subframe 5, and a subframe 9 are the downlink subframes, a subframe 2 and a subframe 7 are the uplink subframes, a subframe 1 and a subframe 6 are special subframes, and a subframe 3 and a subframe 8 are the first subframes; and
- ten subframes, wherein a subframe 4, a subframe 5, and a subframe 9 are the downlink subframes, a subframe 2 and a subframe 7 are the uplink subframes, a subframe 1 and a subframe 6 are special subframes, and a subframe 0, a subframe 3, and a subframe 8 are the first subframes.

18. The base station according to claim 13, wherein the radio frame structure comprises one of:
- ten subframes, wherein a subframe 4, a subframe 5, and a subframe 8 are the downlink subframes, a subframe 2 and a subframe 3 are the uplink subframes, a subframe 1 and a subframe 6 are special subframes, and a subframe 0, a subframe 7, and a subframe 9 are the first subframes; and
- ten subframes, wherein a subframe 4 and a subframe 5 are the downlink subframes, a subframe 2 and a subframe 3 are the uplink subframes, a subframe 1 and a subframe 6 are special subframes, and a subframe 0, a subframe 7, a subframe 8, and a subframe 9 are the first subframes.

19. The base station according to claim 13, wherein the radio frame structure comprises one of:
- ten subframes, wherein a subframe 0, a subframe 3, a subframe 5, a subframe 8, and a subframe 9 are the downlink subframes, a subframe 2 and a subframe 7 are the uplink subframes, a subframe 1 and a subframe 6 are special subframes, and a subframe 4 is the first subframe;
- ten subframes, wherein a subframe 0, a subframe 3, a subframe 5, and a subframe 8 are the downlink subframes, a subframe 2 and a subframe 7 are the uplink subframes, a subframe 1 and a subframe 6 are special subframes, and a subframe 4 and a subframe 9 are the first subframes; and
- ten subframes, wherein a subframe 3, a subframe 5, and a subframe 8 are the downlink subframes, a subframe 2 and a subframe 7 are the uplink subframes, a subframe 1 and a subframe 6 are special subframes, and a subframe 0, a subframe 4, and a subframe 9 are the first subframes.

20. The base station according to claim 13, wherein the radio frame structure comprises one of:
- ten subframes, wherein:
  - a subframe 3, a subframe 5, and a subframe 8 are the downlink subframes;
  - a subframe 2 is the uplink subframe;
  - a subframe 1 and a subframe 6 are special subframes;
  - a subframe 0, a subframe 4, a subframe 7, and a subframe 9 are the first subframes; and
  - a subframe 4 is the second subframe; and
- ten subframes, wherein:
  - a subframe 0 and a subframe 5 are the downlink subframes;
  - a subframe 2, a subframe 3, a subframe 7, a subframe 8, and a subframe 9 are the uplink subframes;
  - a subframe 1 and a subframe 6 are special subframes; and
  - a subframe 0, a subframe 4, a subframe 7, a subframe 8, and a subframe 9 are the first subframes, and
  - a subframe 4 is the second subframe.

* * * * *